US012380859B2

(12) United States Patent
Shin et al.

(10) Patent No.: US 12,380,859 B2
(45) Date of Patent: Aug. 5, 2025

(54) GATE DRIVER, DISPLAY DEVICE INCLUDING THE SAME, AND DRIVING METHOD OF DISPLAY DEVICE

(71) Applicant: LG Display Co., Ltd., Seoul (KR)

(72) Inventors: Seung Hwan Shin, Paju-si (KR); Jong Wook Jang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/774,456

(22) Filed: Jul. 16, 2024

(65) Prior Publication Data

US 2025/0218387 A1 Jul. 3, 2025

(30) Foreign Application Priority Data

Dec. 28, 2023 (KR) ........................ 10-2023-0195400

(51) Int. Cl.
*G09G 3/3266* (2016.01)

(52) U.S. Cl.
CPC ... *G09G 3/3266* (2013.01); *G09G 2300/0452* (2013.01); *G09G 2300/0819* (2013.01); *G09G 2300/0842* (2013.01); *G09G 2310/0286* (2013.01); *G09G 2310/08* (2013.01); *G09G 2320/0233* (2013.01)

(58) Field of Classification Search
CPC ......... G09G 3/3266; G09G 2300/0452; G09G 2300/0819; G09G 2300/0842; G09G 2310/0286; G09G 2310/08; G09G 2320/0233
See application file for complete search history.

(56) References Cited

FOREIGN PATENT DOCUMENTS

| | | | | | |
|---|---|---|---|---|---|
| KR | 10-2022-0088602 A | | 6/2022 | | |
| KR | 1020220095921 A | * | 7/2022 | ........... | G09G 3/3266 |
| KR | 10-2023-0095552 A | | 6/2023 | | |

* cited by examiner

*Primary Examiner* — Adam J Snyder
(74) *Attorney, Agent, or Firm* — Seed IP Law Group LLP

(57) ABSTRACT

The present specification discloses a gate driver, a display device including the same, and a method of driving the display device. When a gate-on voltage of a $J^{th}$ clock signal differs from a gate-on voltage of the first clock signal, the gate driver applies a compensation gate-on voltage that is a gate-on voltage at a changed voltage level to a gate-on voltage node. The display device includes a sensing unit for sensing a clock signal, and a compensation unit for applying the compensation gate-on voltage to the gate driver from the sensed clock signal. According to the present specification, a gate-source voltage of a transistor disposed on an output unit may be maintained at a previous voltage. In addition, it is possible to prevent driving failures caused by a load received by the clock signal supplied to a stage disposed relatively far away.

24 Claims, 35 Drawing Sheets

| SECTION | A | B | C | D | E | F |
|---|---|---|---|---|---|---|
| EVST | LOW | HIGH | HIGH | HIGH | LOW | LOW |
| T2 | ON | OFF | OFF | OFF | ON | ON |
| ECLK1 | HIGH | HIGH | LOW | HIGH | HIGH | LOW |
| T1 | OFF | OFF | ON | OFF | OFF | ON |
| QC | LOW | LOW | HIGH | HIGH(FLOATING) | HIGH(FLOATING) | LOW |
| Q | VERY LOW | VERY LOW | HIGH | HIGH | HIGH | VERY LOW (BOOTSTRAPPING) |
| T6 | ON | ON | OFF | OFF | OFF | ON |
| QB | HIGH | HIGH | LOW | LOW(FLOATING) | LOW(FLOATING) | HIGH |
| T7 | OFF | OFF | ON | ON | ON | OFF |
| QD | HIGH | HIGH | LOW | HIGH(COUPLING) | HIGH | HIGH |
| T3 | OFF | OFF | ON | OFF | OFF | OFF |
| EM | LOW | LOW | HIGH | HIGH | HIGH | LOW |
| T4 | ON | ON | OFF | OFF | OFF | ON |
| T5 | OFF | OFF | ON | ON | ON | OFF |

*Fig. 14*

GATE DRIVER, DISPLAY DEVICE INCLUDING THE SAME, AND DRIVING METHOD OF DISPLAY DEVICE

CROSS-REFERENCE TO RELATED APPLICATION

This application claims priority to and the benefit of Korean Patent Application No. 10-2023-0195400, filed on Dec. 28, 2023, the disclosure of which is incorporated herein by reference in its entirety.

BACKGROUND

Technical Field

The present specification relates to a gate driver, a display device including the same, and a method of driving the display device.

Description of the Related Art

Organic light emitting diode (OLED) display devices include OLEDs that emit light by itself and have advantages of a fast response time, high luminous efficiency and brightness, and a wide viewing angle. An OLED display device has an excellent contrast ratio and color gamut because they may express a black grayscale in perfect black.

Display devices may include a display panel which displays an image and on which pixels are disposed and a driver for supplying a plurality of signals to the display panel. Each of the pixels may include a thin film transistor (TFT) that supplies a voltage of a data line to a pixel electrode in response to a gate pulse. The gate pulse of the driver may be applied to a pixel TFT, and a data signal of the driver may be supplied to the pixel through the pixel TFT to display an image.

Gate drivers may be disposed outside the display panel or disposed to be distributed in a pixel array. Recently, a technology of embedding a gate driver and a pixel array in a display panel has been applied. The gate driver includes a shift register, and the shift register may include a plurality of stages cascade-connected to each other.

The shift register may receive a clock signal swinging between a gate high voltage (VGH) and a gate low voltage (VGL) from a printed circuit board (PCB) electrically connected to a display panel board under the control of a timing controller. The shift register sequentially shifts the clock signal to supply a gate pulse (or a scan pulse) to a gate line.

BRIEF SUMMARY

A clock signal (also referred to as a "shift clock") should be supplied to a stage with actual constant gate high and gate low voltages. However, a voltage of the clock supplied to the stage disposed far from the printed circuit board may be changed by the influence of a load connected to the stage due to an increase in length of a clock line. As the length of the clock line increases, the clock signal having a constant voltage may not be supplied due to the load caused by the resistance of the clock line and a parasitic capacitor connected to the clock line, thereby causing defects in output of the gate pulse.

The present specification is directed to achieving the above-described necessity and/or solving the problems of the related art.

The objects of the present specification are not limited to the above-described objects, and other objects that are not mentioned will be clearly understood by those skilled in the art from the following description.

A gate driver according to the present specification includes a plurality of stages cascade-connected to each other through a carry signal line and configured to receive a clock signal through a clock line, wherein the plurality of stages may include a first stage configured to receive a first clock signal and a start signal and output a first gate signal and a first carry signal, a $J^{th}$ stage configured to receive a $J^{th}$ clock signal and a $J-1^{th}$ carry signal and output a $J^{th}$ gate signal and a JP carry signal, wherein J is a positive integer that is greater than or equal to 2 and less than or equal to N, and an $N^{th}$ stage configured to receive an $N^{th}$ clock signal and an $N-1^{th}$ carry signal and output an $N^{th}$ gate signal and an $N^{th}$ carry signal, wherein N is a natural number that is greater than or equal to 2, each of the first stage, the $J^{th}$ stage, and the $N^{th}$ stage may include clock node to which the clock signal is input, a gate-on voltage node to which a gate-on voltage is applied, and a gate-off voltage node to which a gate-off voltage is applied, wherein each of the first clock signal and the $J^{th}$ clock signal may swing between the gate-on voltage and the gate-off voltage, and wherein, when the gate-on voltage of the $J^{th}$ clock signal differs from the gate-on voltage of the first clock signal, a compensation gate-on voltage at a changed voltage level may be applied to the gate-on voltage node of the $J^{th}$ stage.

The $J^{th}$ stage may include a first output node which outputs a $J^{th}$ gate signal including a scan signal and an emission control signal, a second output node which outputs the $J^{th}$ carry signal, a start node to which the $J-1^{th}$ carry signal is input, a first transistor that activates a QC node by applying any one of the compensation gate-on voltage and the gate-off voltage to the QC node according to the $J^{th}$ clock signal, a sixth transistor that supplies the $J^{th}$ gate signal at the gate-on voltage to the first output node from when a first control node is bootstrapped in synchronization with an activated timing of the QC node, a QB control unit configured to activate a QB node opposite to the QC node according to potentials of the clock node, the start node, and the QC node, and a seventh transistor that supplies the $J^{th}$ gate signal at the gate off voltage to the first output node while the QB node is activated before the QC node is activated, wherein the compensation gate-on voltage may be applied to the second output node.

The $J^{th}$ stage may include an output node which outputs a $J^{th}$ gate signal including a scan signal and an emission control signal, a start node to which the $J-1^{th}$ carry signal is input, a first transistor that activates a QC node by applying any one of the compensation gate-on voltage and the gate-off voltage to the QC node according to the $J^{th}$ clock signal, a sixth transistor that supplies the $J^{th}$ gate signal at the gate-on voltage to the output node from when a first control node is bootstrapped in synchronization with an activated timing of the QC node, a QB control unit configured to activate a QB node opposite to the QC node according to potentials of the clock node, the start node, and the QC node, a seventh transistor that supplies the $J^{th}$ gate signal at the gate-off voltage to the output node while the QB node is activated before the QC node is activated, and a tenth transistor that applies the compensation gate-on voltage to the first transistor according to the $J-1^{th}$ carry signal, and the gate-off voltage node may include a first gate-off voltage node to which a first gate-off voltage is applied, and a second gate-off voltage node to which a second gate-off voltage is applied.

A display device according to the present specification includes a display panel on which a plurality of gate lines, a plurality of power lines, and a gate driver configured to supply gate signals to the plurality of gate lines are disposed, wherein the gate driver is configured to receive a clock signal from a clock generation circuit and supply the gate signal swinging between a gate-on voltage and a gate-off voltage to the plurality of gate lines, a power supply unit configured to generate power input to the display panel and the gate driver through the plurality of power lines, a sensing unit configured to sense the clock signal input to the gate driver, and a compensation unit configured to apply a compensation gate-on voltage to the gate driver based on the sensed clock signal.

A method of driving a display device according to the present specification is a method of driving a display device including a plurality of stages cascade-connected to each other through a carry signal line, wherein the plurality of stages includes a first stage configured to receive a first clock signal and a start signal and output a first gate signal and a first carry signal, a $J^{th}$ stage configured to receive a $J^{th}$ clock signal and a $J-1^{th}$ carry signal and output a $J^{th}$ gate signal and a $J^{th}$ carry signal, wherein J is a positive integer that is greater than or equal to 2 and less than or equal to N, and an $N^{th}$ stage configured to receive an $N^{th}$ clock signal and an $N-1^{th}$ carry signal and output an $N^{th}$ gate signal and an $N^{th}$ carry signal, wherein N is a natural number that is greater than or equal to 2, and each of the first stage, the $J^{th}$ stage, and the $N^{th}$ stage includes a clock node to which the first clock signal, the $J^{th}$ clock signal, or the $N^{th}$ clock signal is input, a gate-on voltage node to which a gate-on voltage is applied, and a gate-off voltage node to which a gate-off voltage is applied, wherein the method includes sensing the gate-on voltage of the $J^{th}$ clock signal input to the $J^{th}$ stage, causing a difference between the gate-on voltage of the $J^{th}$ clock signal sensed by the sensing and the gate-on voltage of the first clock signal, and applying a compensation gate-on voltage to the gate-on voltage node of the $J^{th}$ stage, wherein a voltage level of the compensation gate-on voltage is changed based on the gate-on voltage of the $J^{th}$ clock signal and the gate-on voltage of a clock signal input from a clock generation circuit.

BRIEF DESCRIPTION OF THE SEVERAL VIEWS OF THE DRAWINGS

FIG. 14 is a table showing an operation of a stage corresponding to sections A to F of FIG. 13.

DETAILED DESCRIPTION

Figure 1A:
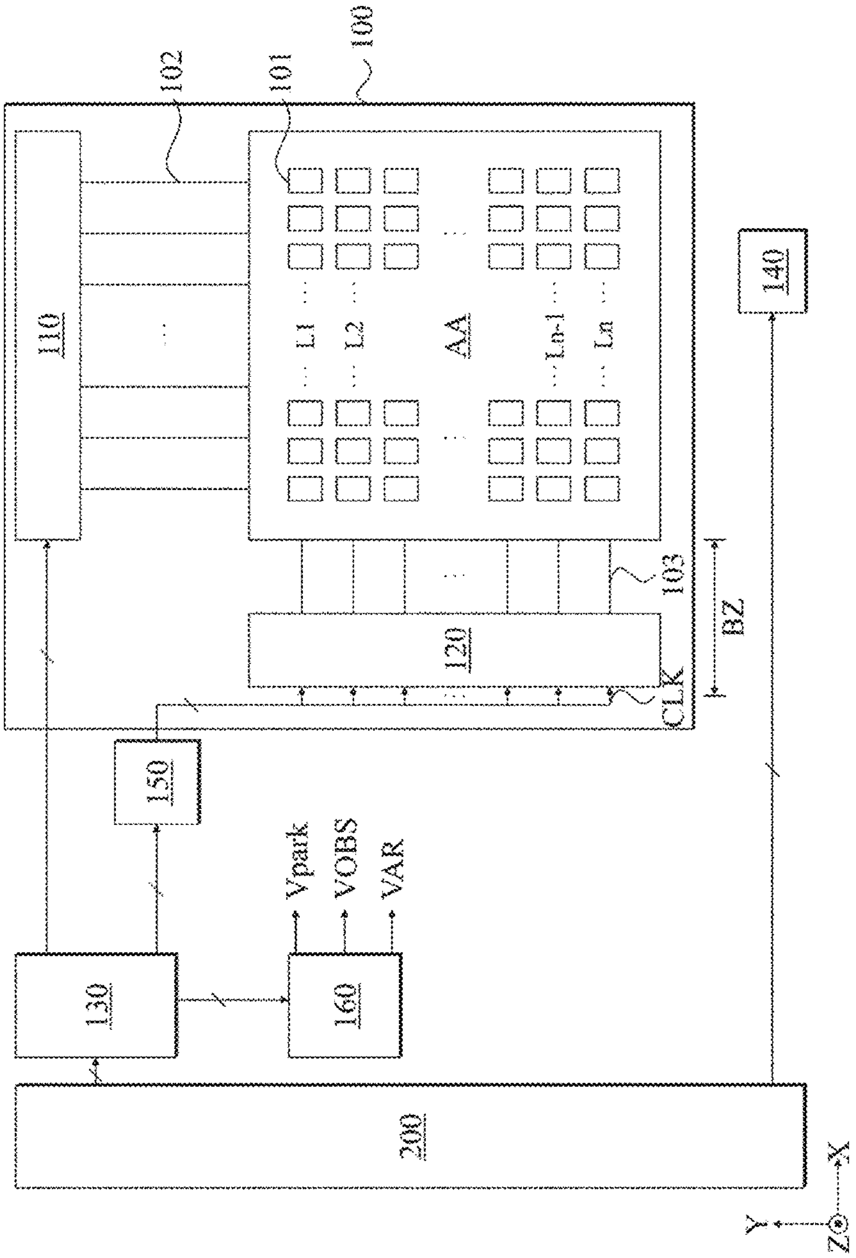
FIGS. 1A, 1B, and 1C are block diagrams showing a display device according to embodiments of the present specification.

Advantages and features of the present specification and methods for achieving them will become clear with reference to embodiments described below in detail in conjunction with the accompanying drawings. The present disclosure is not limited to the embodiments disclosed below but can be implemented in various different forms, these embodiments are merely provided to make the disclosure of the present disclosure complete and fully inform those skilled in the art to which the present disclosure pertains of the scope of the present disclosure, and the present disclosure is only defined by the scope of the appended claims.

In describing the present disclosure, when it is determined that the detailed description of a related known technology may unnecessarily obscure the gist of the present disclosure, detailed description thereof will be omitted.

When the terms "comprise," "include," "have," and "consist of" described in the present specification are used, other parts may be added unless "only" is used. When a component is expressed in the singular, it can be construed as a plurality of components unless specifically stated otherwise.

When the position relationship and interconnection relationship between two components, such as "on," "above," "under," "next to," "connected or coupled," "crossing or intersecting," or the like described, one or more other components may be interposed between the components unless the term "immediately" or "directly" is described.

When the temporal relationship is described using the term "after," "subsequently," "then," "before," or the like, it may include a non-consecutive case unless the term "immediately" or "directly" is used.

Although the term "first," "second," or the like may be used to distinguish components, functions or structures of the components are not limited by the ordinal number or component name added to the front of the component.

The following embodiments may be partially or fully coupled or combined, and various technological interworking and driving are possible. The embodiments may be implemented independently of each other and implemented together in the associated relationship.

In addition, terms (including technical and scientific terms) used in embodiments of the present specification may be construed as meaning that may be generally understood by those skilled in the art to which the present specification pertains unless explicitly specifically defined and described, and the meanings of the commonly used terms, such as terms defined in a dictionary, may be construed in consideration of contextual meanings of related technologies.

In a display device according to the present specification, a pixel circuit and a gate driving circuit may include a plurality of transistors. The transistor may be an oxide thin film transistor (TFT) containing an oxide semiconductor or a low temperature poly silicon (LTPS) TFT containing an LTPS.

The transistor is a three-electrode element including a gate, a source, and a drain. The source is an electrode for supplying carriers to the transistor. The carriers start to flow from the source in the transistor. The drain is an electrode through which the carriers move from the transistor to the outside. In the transistor, the carriers flow from the source to the drain.

In the case of an n-channel transistor, since the carriers are electrons, a source voltage is lower than a drain voltage so that the electrons may flow from the source to the drain. In the n-channel transistor, a current flows from the drain to the source. In the case of a p-channel transistor, since the carriers are holes, the source voltage is higher than the drain voltage so that the holes may flow from the source to the drain. In the p-channel transistor, a current flows from the source to the drain because the holes flow from the source to the drain. It should be noted that the source and drain of the transistor are not fixed. For example, the source and the drain may be changed depending on an applied voltage. Therefore, the disclosure is not limited by the source and drain of the transistor. In the following description, the source and drain of the transistor are referred to as "first and second electrodes."

A gate signal may swing between a gate-on voltage and a gate-off voltage. The transistor is turned on in response to the gate-on voltage, whereas the transistor is turned off in response to the gate-off voltage. In the case of the n-channel transistor, the gate-on voltage may be a gate high voltage (VGH), and the gate-off voltage may be a gate low voltage (VGL). In the case of the p-channel transistor, the gate-on voltage may be the gate low voltage (VGL), and the gate-off voltage may be the gate high voltage (VGH).

Hereinafter, embodiments of the present disclosure will be described in detail with reference to the accompanying drawings.

Figure 1B:
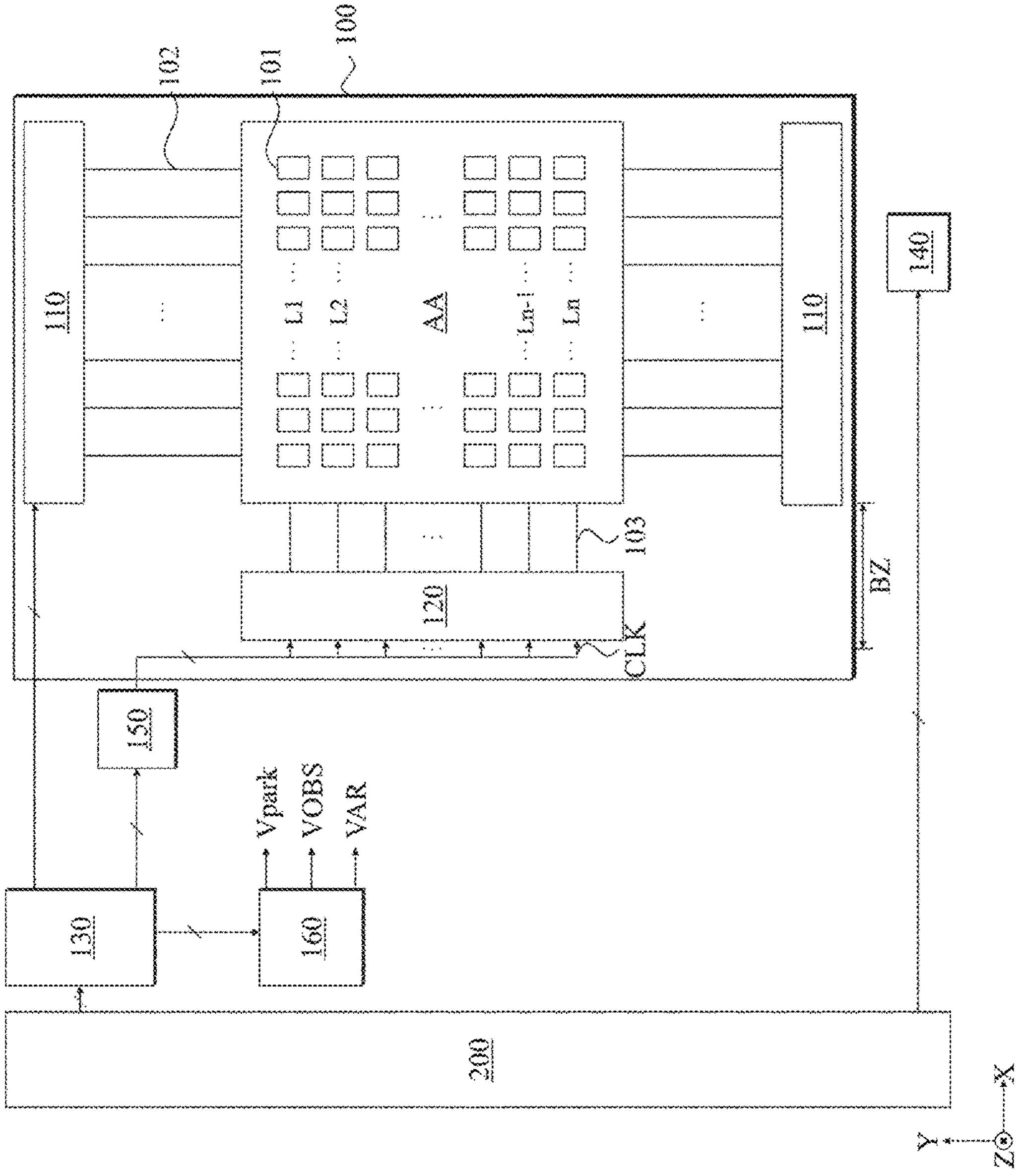
Figure 1C:
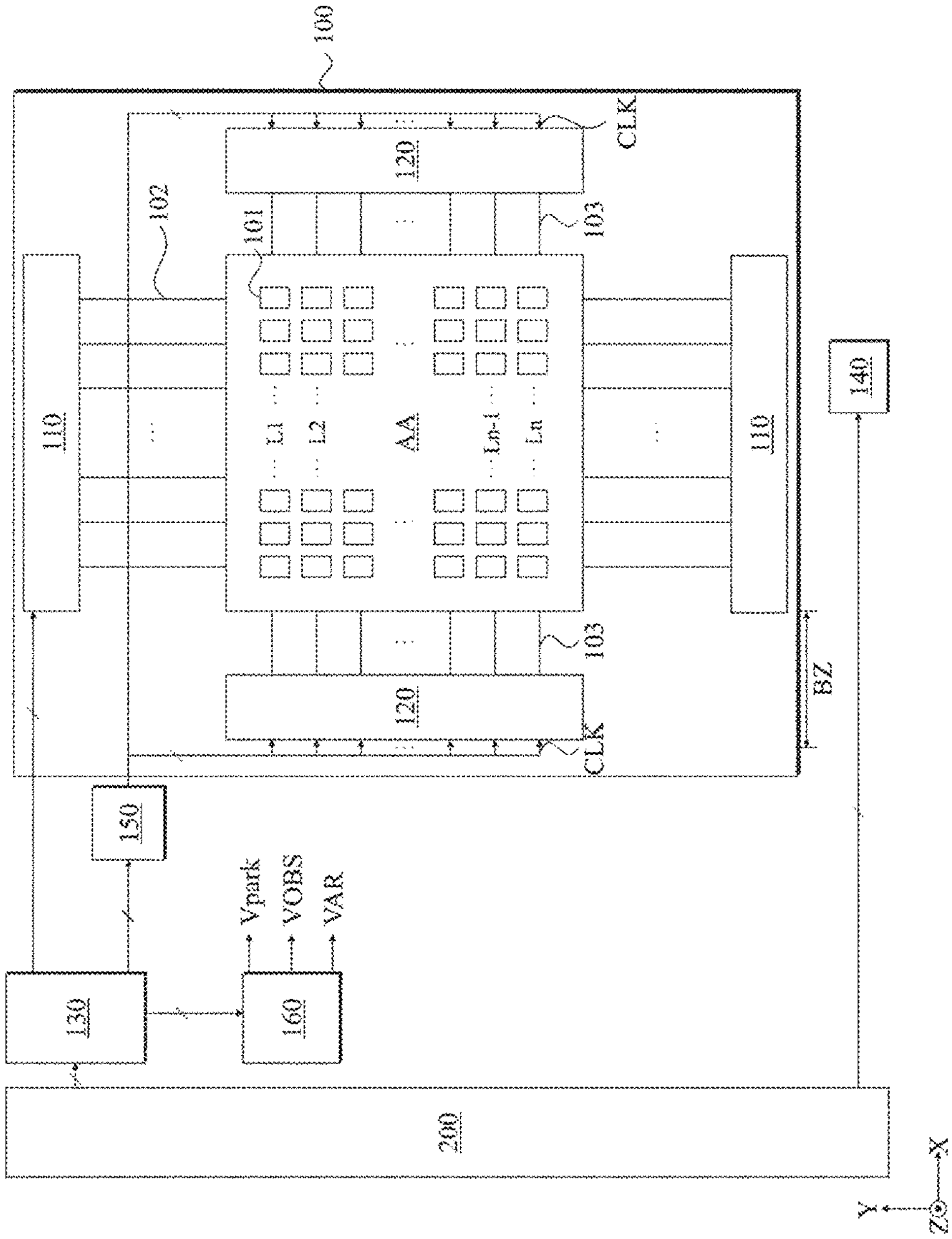
Figure 2:
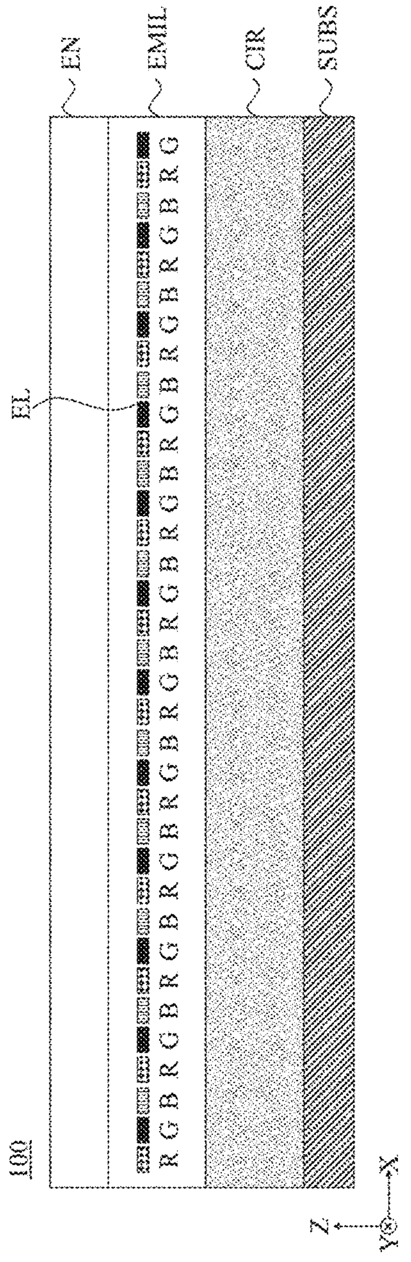
FIG. 2 is a cross-sectional view showing a cross-sectional structure of a display panel shown in FIGS. 1A to 1C.

FIGS. 1A, 1B, and 1C are block diagrams showing a display device according to embodiments of the present specification. FIG. 2 is a cross-sectional view showing a cross-sectional structure of a display panel shown in FIG. 1.

Referring to FIGS. 1A, 1B, 1C, and 2, the display device according to the present specification may include a display panel 100, a display panel driving circuit for writing pixel data on pixels of the display panel 100, and a power supply unit 140 for generating power required for driving the pixels and the display panel driving circuit. The display device according to the present specification may include the display panel 100, the power supply unit 140, and a plurality of display panel driving circuits.

The display panel 100 may be formed of a plastic substrate, a thin glass substrate, a metal substrate, etc. Pixels 101 may be implemented on the display panel 100.

The display panel 100 may be a rectangular panel having a length in an X-axis direction, a width in a Y-axis direction, and a thickness in a Z-axis direction, but is not limited thereto. A display area AA of the display panel 100 may include a pixel array in which an input image is displayed. The pixel array may include a plurality of data lines 102, a plurality of gate lines 103 that intersect the data lines 102, and a plurality of pixels 101 disposed in a matrix form. The display panel 100 may further include power lines commonly connected to the pixels 101. The power lines may be connected to constant voltage nodes of the pixel circuits to supply the pixels 101 with a constant voltage required for driving the pixels 101.

Each of the pixels 101 may be divided into a red sub-pixel, a green sub-pixel, and a blue sub-pixel to implement colors. Each of the pixels may further include a white sub-pixel. Each sub-pixel may include a pixel circuit for driving a light emitting element. Each pixel circuit may be connected to the data lines, the gate lines, and the power lines. Hereinafter, "pixel" may be construed as "sub-pixel."

The pixels may be disposed as real color pixels and pentile pixels. The pentile pixel may implement a higher resolution than the real color pixel by driving two sub-pixels of different colors as one pixel 101 using a preset pixel rendering algorithm. The pixel rendering algorithm may compensate insufficient color expression in each pixel with colors of light emitted from adjacent pixels.

The pixel array may include a plurality of pixel lines L1 to Ln. Each of the pixel lines L1 to Ln may include pixels of one line disposed in a line direction (X-axis direction) in the pixel array of the display panel 100. In the first pixel line L1 to the $n^{th}$ pixel line Ln, pixels disposed on the same pixel line may share the same gate lines 103. Sub-pixels disposed in a column direction Y in the data line direction may share the same data line 102. One horizontal section may be the time obtained by dividing one frame section by the total number of pixel lines L1 to Ln.

The display panel 100 may be implemented as a non-transmissive display panel or a transmissive display panel. The transmissive display panel may be applied to a transparent display apparatus in which images are displayed on a screen and a real object in the background is visible. The display panel 100 may be manufactured as a flexible display panel.

As shown in FIG. 2, the display panel 100 may include a circuit layer CIR, a light emitting element layer EMIL, and an encapsulation layer EN that are stacked on a substrate SUBS.

The circuit layer CIR may include a TFT array including a pixel circuit connected to lines such as a data line, a gate line, and a power line, a gate driver 120, etc. The circuit layer CIR may include a plurality of metal layers insulated with insulating layers interposed therebetween, and a semiconductor material layer.

The light emitting element layer EMIL may include a light emitting element driven by the pixel circuit. The light emitting element may include a light emitting element of the red sub-pixel, a light emitting element of the green sub-pixel, and a light emitting element of the blue sub-pixel. The light emitting element layer EMIL may further include a light emitting element of the white sub-pixel. The light emitting element layer EMIL in each sub-pixel may have a structure in which a light emitting element and a color filter are stacked. The light emitting elements EL of the light emitting element layer EMIL may be covered with multiple protective layers including an organic layer and an inorganic layer.

The encapsulation layer EN may cover the light emitting element layer EMIL to seal the circuit layer CIR and the light emitting element layer EMIL. The encapsulation layer EN may have a multi-insulating film structure in which the organic film and the inorganic film are stacked alternately. The inorganic film can block permeation of moisture or oxygen. The organic film may planarize a surface of the inorganic film. When the organic film and the inorganic film are stacked in multiple layers, a movement path of moisture or oxygen may be longer than that of a single layer, thereby effectively blocking the permeation of moisture and oxygen affecting the light emitting layer EMIL.

A touch sensor layer (omitted from the drawing) may be formed on the encapsulation layer EN, and a polarizer or a color filter layer may be disposed on the touch sensor layer. The touch sensor layer may include capacitive type touch sensors for sensing touch input based on a change in capacitance before and after touch input. The touch sensor layer may include metal lines patterns and insulating films that generate the capacitance of the touch sensors. The insulating films may insulate intersections of the metal line patterns and planarize a surface of the touch sensor layer. The polarizer can increase visibility and contrast ratio by converting the polarization of external light reflected by the metal of the touch sensor layer and the circuit layer. The polarizer may be implemented as a polarizer or circular polarizer in which a linear polarizer and a phase retardation film are bonded. A cover glass may be bonded onto the polarizer. The color filter layer may include red, green, and blue color filters. The color filter layer may further include a black matrix pattern. The color filter layer may absorb a portion of a wavelength of light reflected from the circuit layer and the touch sensor layer to serve as a polarizer and increase the color purity of the image displayed in the pixel array.

The power supply unit 140 may use a DC-DC converter to generate a constant voltage (or a DC voltage) required for driving the pixel array of the display panel 100 and the display panel driving circuit. The DC-DC converter may include a charge pump, a regulator, a buck converter, a boost converter, etc. The power supply unit 140 may adjust a level of the DC input voltage applied from the host system 200 and output constant voltages such as a gamma reference voltage, a gate high voltage, a gate low voltage, a pixel driving voltage, a cathode voltage, and an initialization voltage.

The gamma reference voltage may be supplied to the data driver 110. A dynamic range of the data voltage output from the data driver 110 may be determined according to a voltage range of the gamma reference voltage. The dynamic range of the data voltage may be a voltage range between the highest grayscale voltage and the lowest grayscale voltage.

The gate high voltage and the gate low voltage may be supplied to a level shifter 150 and the gate driver 120.

The constant voltages such as the pixel driving voltage, the cathode voltage, and the initialization voltage may be supplied to the pixels 101 through the power lines commonly connected to the pixels 101. The pixel driving voltage may be output from a main power supply of the host system 200 and supplied to the display panel 100. In this case, the power supply unit 140 does not need to output a pixel driving voltage.

The display panel driving circuit may write pixel data of an input image on the pixels of the display panel 100 under the control of a timing controller 130. The display panel driving circuit may include the data driver 110 and the gate driver 120.

The display panel driving circuit may further include a touch sensor driver for driving the touch sensors. The touch sensor driver is omitted from FIG. 1. The data driver 110 and the touch sensor driver may be integrated into one drive IC.

The data driver 110 may receive the pixel data of the input image received as a digital signal from the timing controller 130 and output a data voltage. The data driver 110 may convert the pixel data of the input image into a gamma compensation voltage using a digital to analog converter (DAC) and output the data voltage. The gamma reference voltage VGMA may be divided into gamma compensation voltage for each grayscale through a voltage dividing circuit of the data driver 110 and provided to the DAC. The DAC may generate the data voltage with the gamma compensation voltage corresponding to the grayscale value of the pixel data. The data voltage output from the DAC may be output to the data line 102 through an output buffer in each channel of the data driver 110.

The gate driver 120 may be formed on the circuit layer CIR on the display panel 100 together with the TFT array and lines of the pixel array. The gate driver 120 may be disposed in a non-display area BZ outside the display area AA of the display panel 100, or at least some of the gate drivers 120 may be disposed to be distributed in the display area AA.

The gate driver 120 may include a plurality of shift registers for sequentially shift pulses of gate signals. The gate driver 120 may be disposed at any one side of left or right non-display area BZ outside the display area AA on the display panel 100 to supply a gate signal to the gate lines 103 in a single feeding method. In the single feeding method, the gate signal may be applied at one end of the gate line 103.

The gate driver 120 may be disposed in the left non-display area BZ and the right non-display area BZ of the display panel 100 to apply the gate signal to the gate lines 103 in a double feeding method. In the double feeding method, the gate signal may be applied simultaneously at both ends of the gate line 103.

At least some circuits of the gate driver 120 may be disposed in the display area AA.

The gate driver 120 may sequentially output the pulses of the gate signals to the gate lines under the control of the timing controller 130. The gate driver 120 may sequentially supply the signals to the gate line 103 by shifting the pulse of the gate signal using the shift register. The gate driver 120 may output a plurality of gate signals with different phases and pulse widths using a plurality of shift registers. The gate signal may be divided into a scan signal and an emission control signal (hereinafter referred to as an "EM signal").

The timing controller 130 may receive digital video data of the input image and a timing signal synchronized with the data from the host system 200. The timing signal may include a vertical synchronization signal Vsync, a horizontal synchronization signal Hsync, a data enable signal DE, etc. Since the vertical section and horizontal section can be known in a method of counting the data enable signal DE, the vertical synchronization signal Vsync and the horizontal synchronization signal Hsync can be omitted. The data enable signal DE may have a section of 1 horizontal section (1H), but is not limited thereto.

The timing controller 130 may provide a data timing control signal for controlling the operation timing of the data driver 110 based on the timing signals Vsync, Hsync, and DE received from the host system 200 and a gate timing control signal for controlling the operation timing of the gate driver 120. The timing controller 130 may synchronize the data driver 110, the touch sensor driver, and the gate driver 120 by controlling the operation timing of the display panel driving circuit.

The gate timing control signal generated from the timing controller 130 may be input to the shift register of the gate driver 120 through the level shifter 150. The gate timing control signal may include a start pulse, a clock, etc. The level shifter 150 may receive the gate timing control signal, generate the start pulse and a shift clock, and provide the start pulse and the shift clock to the gate driver 120 through clock lines.

The input signal of the level shifter 150 may be a digital voltage signal, and the output signal thereof may be an analog voltage signal swinging between the gate high voltage VGH and the gate low voltage VGL.

The host system 200 may include a main board of any one of a TV system, a set-top box, a navigation system, a personal computer (PC), a vehicle system, a mobile terminal, and a wearable terminal. The host system may scale the image signal from the video source according to the resolution of the display panel 100 and transmit the scaled image signal to the timing controller 130 together with the timing signal.

In a mobile system, the host system 200 may be implemented as an application processor (AP). The host system 200 may transmit the pixel data of the input image to the drive IC through a mobile industry processor interface (MIPI). The host system 200 may be electrically connected to the drive IC through a flexible printed circuit such as a flexible printed circuit (FPC). The drive IC may be bonded onto the display panel 100 in a chip on glass (COG) process. The drive IC may have a chip on film (COF) structure mounted on the flexible circuit film and may be electrically connected to the lines on the display panel 100.

The timing controller 130 or the host system 200 can reduce consumed power of the display device by entering a low power mode when receiving a still image or always on display (AOD) data. In a normal mode, a refresh rate of the pixels 101 may be 60 Hz, 144 Hz, 240 Hz, etc. The refresh rate may be a frequency at which the pixel data is written on the pixels 101. In a low power mode, the refresh rate of the pixels 101 may be reduced to a frequency lower than 60 Hz, such as 1 Hz to 30 Hz. When the refresh rate is 1 Hz, a first frame among 60 frames per second may be a refresh frame and the subsequent 59 frames may be hold frames. After a data voltage Vdata of the pixel data is charged to the pixels 101 during the refresh frame section, during the consecutive hold frame section, the pixels 101 may be maintained at the data voltage charged during the previous refresh frame without charging a new data voltage Vdata to maintain a light emitting state.

The display panel driving circuit may include a compensation voltage generator 160 for outputting compensation voltages Vpark, VOBS, and VAR. At least a portion of the compensation voltage generator 160 may use resources of other components, such as the power supply unit 140, the data driver 110, and the display panel 100. The compensation voltage generator 160 may change a voltage level of each of the compensation voltages Vpar, VOBS, and VAR under the control of the timing controller 130. The power supply unit 140 may be implemented as a single power IC together with the compensation voltage generator 160.

Each sub-pixel may include a pixel circuit including a driving element for driving a light emitting element and a capacitor connected to the driving element. The pixel circuit of each sub-pixel may include an internal compensation circuit to compensate the data voltage as much as a threshold voltage of the driving element.

Figure 3:
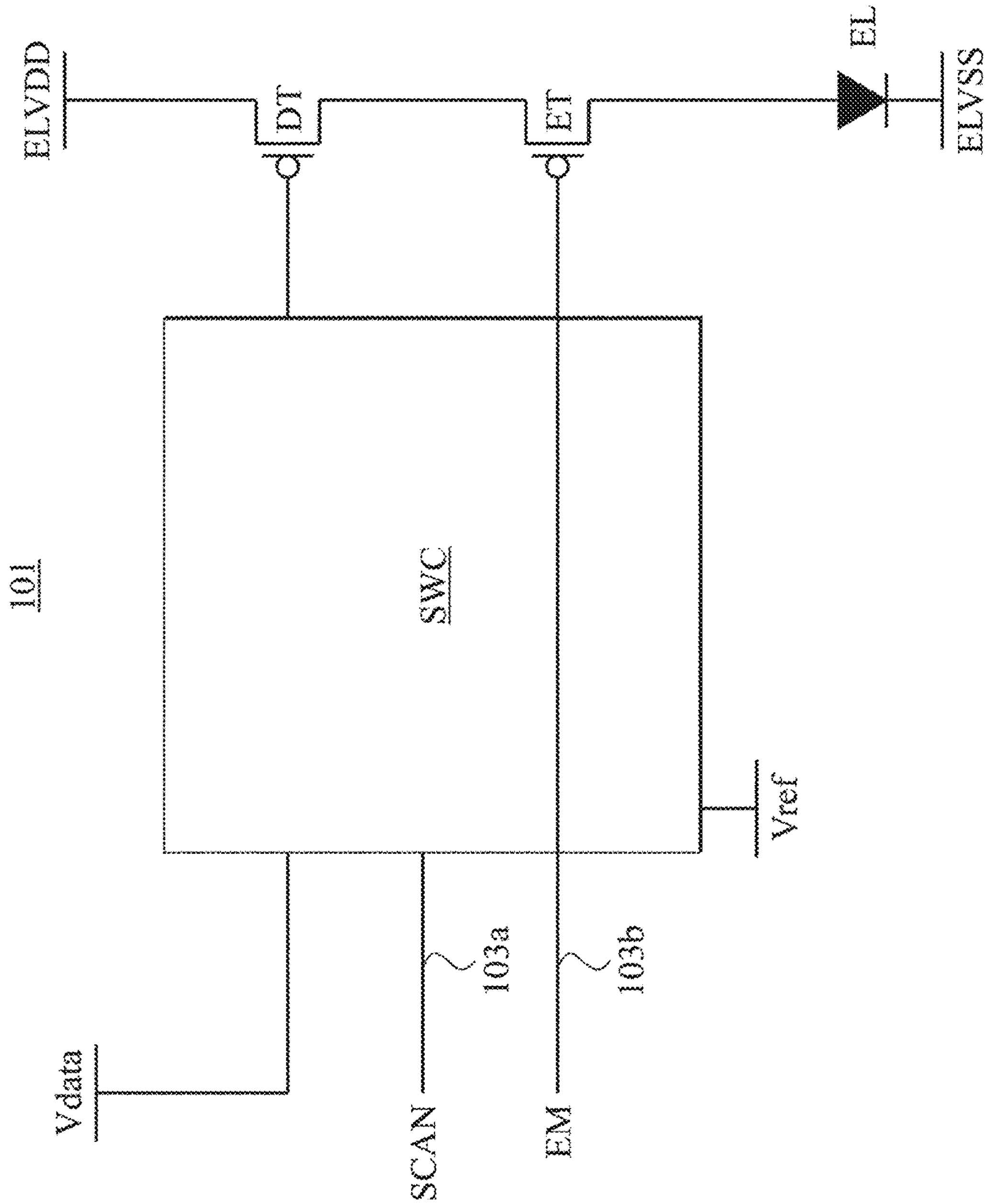
FIG. 3 is a circuit diagram schematically showing a pixel circuit of a display device according to one embodiment of the present specification.
Figure 4:
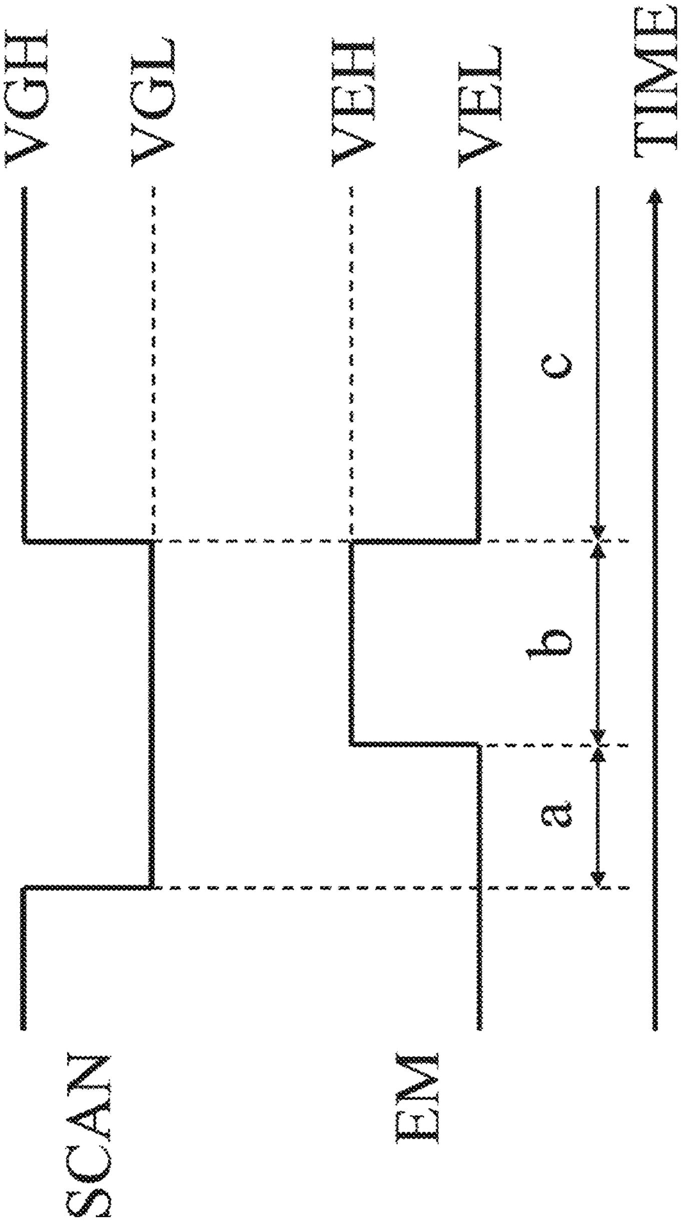
FIG. 4 is a waveform diagram schematically showing a gate signal applied to a pixel circuit according to one embodiment of the present specification.
Figure 5:
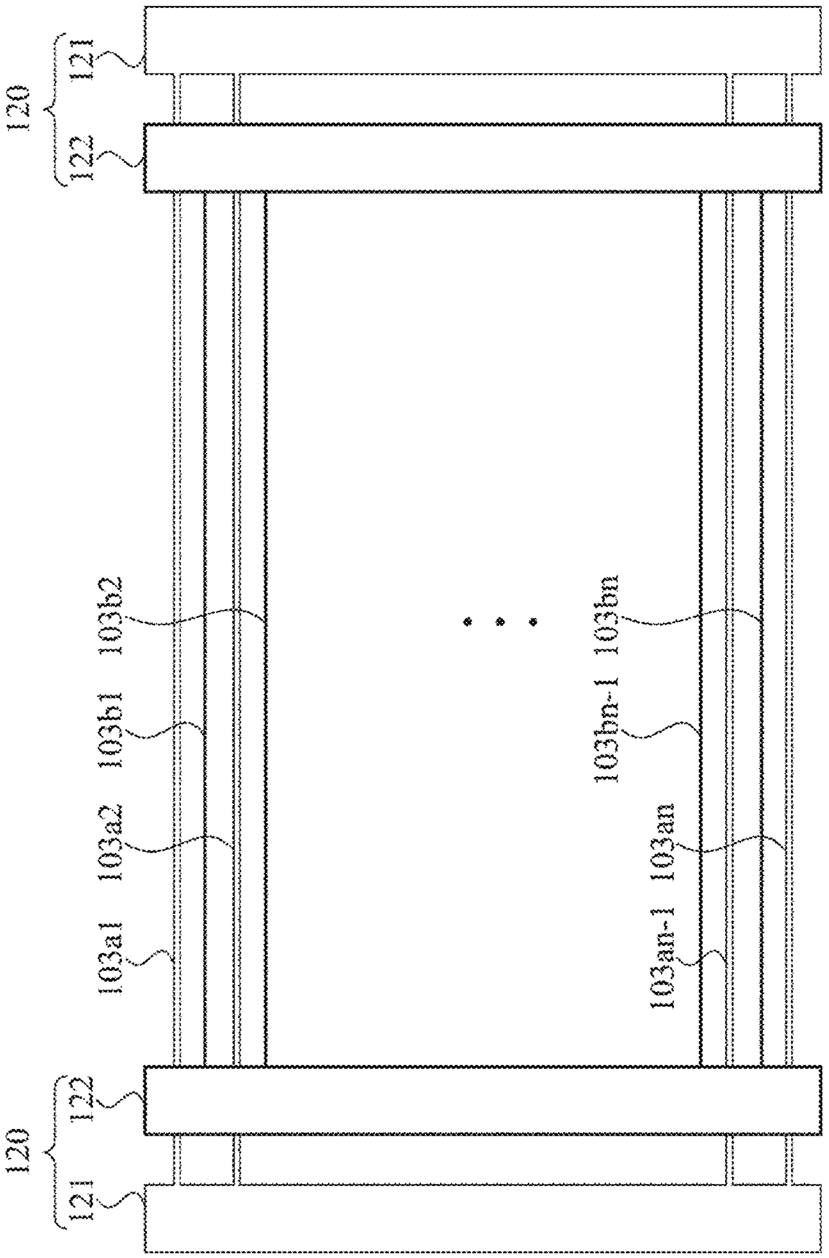
FIG. 5 is a plan view schematically showing a scan driver and an EM driver according to one embodiment of the present specification.

FIG. 3 is a circuit diagram schematically showing a pixel circuit of a display device according to one embodiment of the present specification. FIG. 4 is a waveform diagram schematically showing a gate signal applied to a pixel circuit according to one embodiment of the present specification. FIG. 5 is a plan view schematically showing a scan driver and an EM driver according to one embodiment of the present specification.

Referring to FIGS. 3 to 5, the pixel circuit may include a light emitting element EL, a switch circuit SWC for programming a gate-source voltage of a driving element DT, the driving element DT for controlling a driving current flowing through the light emitting element EL according to a gate-source voltage, and an emission transistor ET turned on/off by the emission control signal EM to determine the emission timing of the light emitting element EL.

The switch circuit SWC may include a plurality of switch TFTs, one or more capacitors, etc., and various modifications are possible depending on product models and specifications.

Each of the pixels 101 may be driven according to the gate signal. Each of the pixels 101 may perform an initialization operation, a programming operation, and an emission operation according to the scan signal SCAN and the emission control signal EM. During an initialization section a, the switch circuit SWC may initialize specific nodes in the pixel circuit to a reference voltage Vref. During a programming section b, the switch circuit SWC may program the gate-source voltage of the driving element DT based on the data voltage Vdata. During the programming section b, a change in threshold voltage of the driving element DT may be sampled and compensated. During an emission section c, a driving current corresponding to the gate-source voltage may flow between the source and drain of the driving element DT, and the light emitting element EL may emit light by the driving current.

The emission transistor ET may be turned on during the initialization section a and the emission section c and turned off during the programming section b according to the emission control signal EM. However, the emission control signal EM may be modified in any of various ways according to a pixel structure, and in this case, the emission transistor ET may be turned on during the emission section c and turned off during other sections.

The gate driver 120 may be provided in the double feeding (double bank) method at both facing sides of the display panel, thereby minimizing signal distortion due to a load difference for each location. The gate driver 120 may include a scan driver 121 for generating the scan signal SCAN and an EM driver 122 for generating the emission control signal EM.

The scan driver 121 may supply the scan signal SCAN to first gate lines 103*a*1 to 103*an* connected to the pixels 101 in a line sequential manner.

The EM driver 122 may supply the emission control signal EM to second gate lines 103*b*1 to 103*bn* connected to the pixels 101 in the line sequential manner. The EM driver 122 may be implemented as a shift register including a plurality of stages. Each stage of the EM driver 122 may be disposed to minimize a bezel area of the display panel. Each stage of the EM driver 122 may be implemented to minimize the bezel area of the display panel and implemented to secure the stability and reliability of an operation even when the display panel has portions having different shapes such as a partially curved surface or a notch.

Figure 6A:
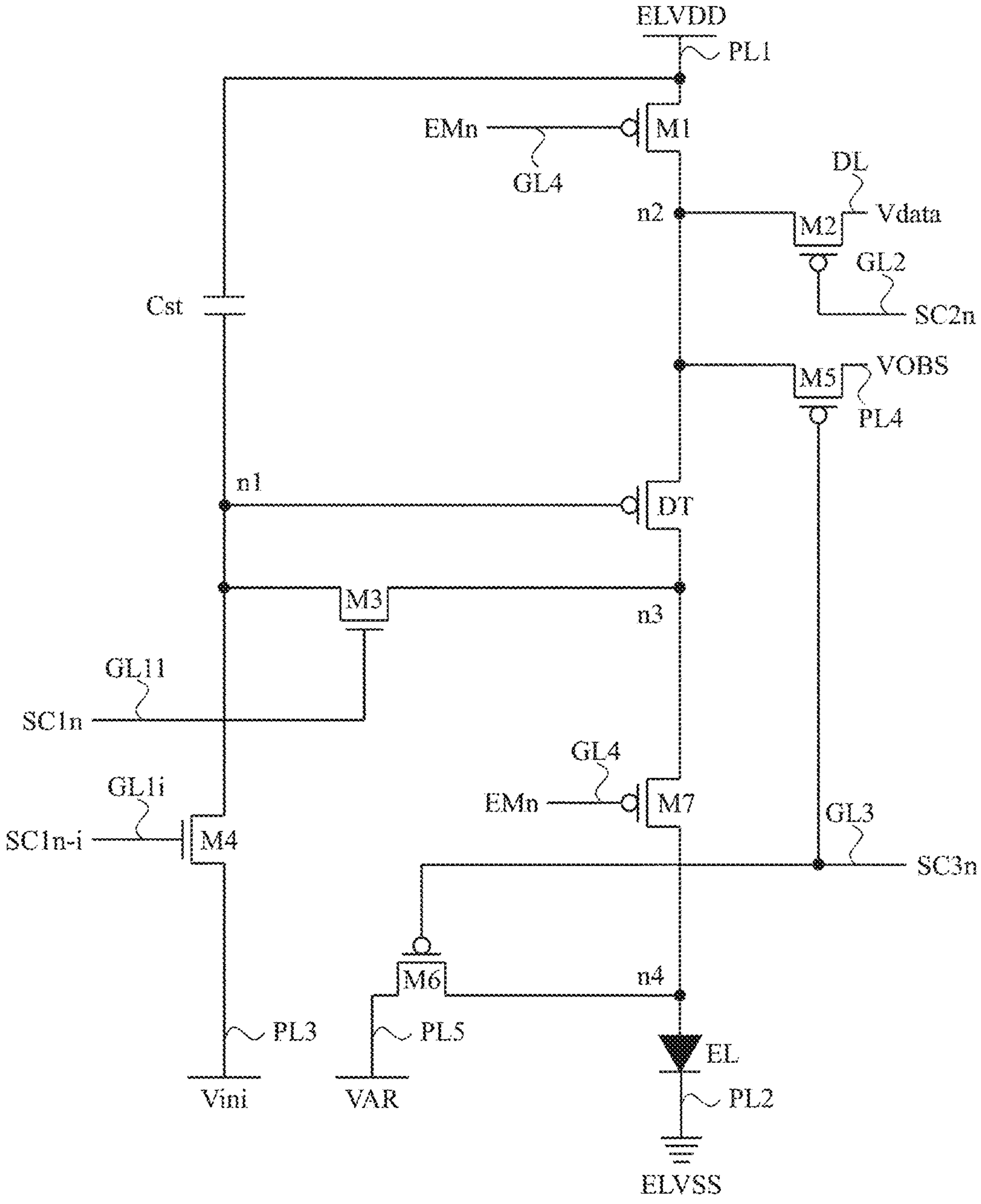
FIGS. 6A and 6B are circuit diagrams showing a pixel circuit included in the display device according to one embodiment of the present specification.
Figure 6B:
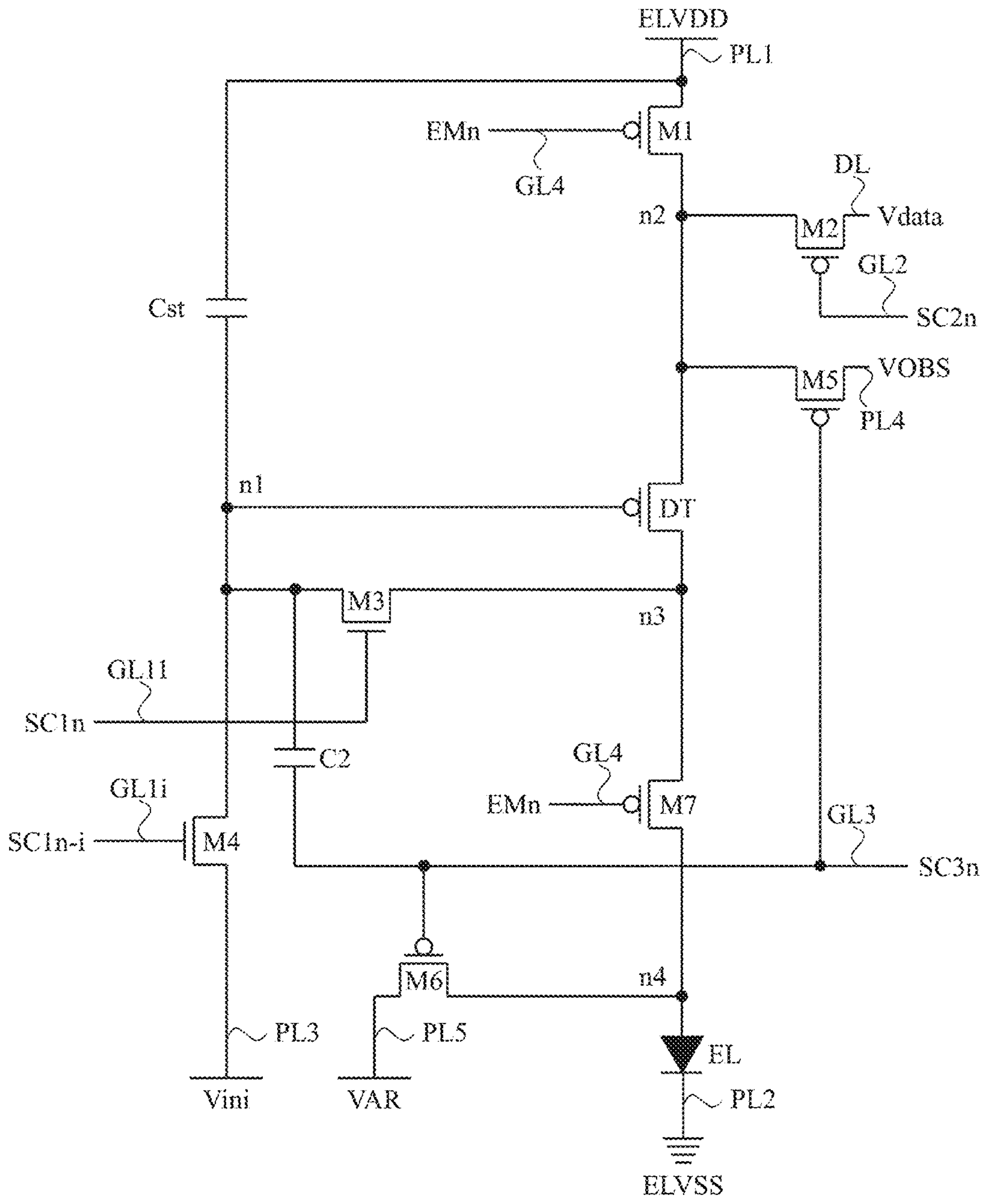

FIGS. 6A and 6B are circuit diagrams showing a pixel circuit included in the display device according to one embodiment of the present specification.

Referring to FIGS. 6A and 6B, the pixel circuit may include the light emitting element EL, the driving element DT for driving the light emitting element EL, a plurality of switch elements M1 to M7, and a storage capacitor Cst. The pixel circuit may further include a second capacitor C2.

Each of the third and fourth switch elements M3 and M4 may be implemented as an n-channel oxide TFT. Each of the driving element DT and the first, second, fifth, sixth, and seventh switch elements M1, M2, M5, M6, and M7 may be implemented as a p-channel LTPS TFT. While the n-channel oxide TFT may be turned on in response to the gate high voltage VGH, the n-channel oxide TFT may be turned off in response to the gate low voltage VGL. While the p-channel LTPS TFT may be turned on in response to the gate low voltage VGL, the p-channel LTPS TFT may be turned off in response to the gate high voltage VGH.

The pixel circuit may include the data lines DL to which the data voltage Vdata of the pixel data and the first compensation voltage Vpark are applied, and gate lines GL11, GL1*i*, GL2, GL3, and GL4 to which gate signals SC1*n*, SC1*n-i*, SC2*n*, SC3*n*, and EMn are applied.

In the low power mode, the data driver supplies the data voltage Vdata to the data line DL during the sampling section of the refresh frame section and does not output the data voltage Vdata during the hold frame section. During the hold frame section, the first compensation voltage Vpark may be supplied to the data lines DL. The first compensation voltage Vpark may be applied from the above-described compensation voltage generator.

The pixel circuit may be connected to a first power line PL1 to which a pixel driving voltage ELVDD is applied, a second power line PL2 to which a cathode voltage ELVSS is applied, a third power line PL3 to which an initialization voltage Vini is applied, a fourth power line PL4 to which the second compensation voltage VOBS is applied, and a fifth power line PL5 to which a third compensation voltage VAR is applied. On the display panel 100, the power lines PL1 to PL5 may be commonly connected to all pixels.

The pixel driving voltage ELVDD and the cathode voltage ELVSS may be set to voltages that allow the driving element DT to operate in a saturation region. The pixel driving voltage ELVDD may be set to a voltage between 2 V and 3 V, and the cathode voltage ELVSS may be set to a voltage between −8 V and −10 V, but the present specification is not limited thereto. The gate high voltage VGH may be set to a voltage higher than the pixel driving voltage ELVDD, and the gate low voltage VGL may be set to a voltage lower than the cathode voltage ELVSS, but the present specification is not limited thereto.

The data voltage Vdata may have a dynamic range between 2 V and 6 V. Within the dynamic range, the voltage level of the data voltage Vdata may be selected according to the grayscale value of the pixel data.

The initialization voltage Vini may be set to a voltage lower than a lower limit voltage of the data voltage Vdata and higher than the cathode voltage ELVSS. For example, when the lower limit voltage of the data voltage Vdata is 2 V and the cathode voltage ELVSS is −9 V, the initialization voltage Vini may be set to a voltage between −5 V and −7 V or changed within the voltage range.

The first compensation voltage Vpark may be set within a voltage range smaller than the dynamic range of the data voltage Vdata. For example, when the dynamic range of the data voltage Vdata is between 2 V and 6 V, the first compensation voltage Vpark may be set to a voltage between 4 V and 6 V or changed within the voltage range.

The second compensation voltage VOBS may be lower than the pixel driving voltage ELVDD and set within a voltage range that partially overlaps the dynamic range of the data voltage Vdata. For example, when the dynamic range of the data voltage Vdata is between 2 V and 6 V, the second compensation voltage VOBS may be set to a specific voltage between 4 V and 8 V or changed within the voltage range.

The third compensation voltage VAR may be set to a specific voltage or changed. For example, when the dynamic range of the data voltage Vdata is between 2 V and 6 V, the third compensation voltage VAR may be set to a specific voltage between −4 V and −8 V or changed within the voltage range.

The compensation voltages Vpark, VOBS, and VAR applied to one sub-pixel present at a specific location in the display area AA may be set to different voltages.

The gate signals SC1*n*, SC1*n-i*, SC2*n*, SC3*n*, and EMn may include pulses swinging between the gate high voltage VGH and the gate low voltage VGL. The gate driver for applying the gate signal to the shown pixel circuit may include a first shift register for outputting the first scan signal SC1*n* and SC1*n-i*, a second shift register for outputting the second scan signal SC2*n*, a third shift register for outputting the third scan signal SC3*n*, and a fourth shift register for outputting the EM signal (EMn). Each of the first to fourth shift registers may output a pulse during the refresh frame and sequentially shift the pulse. Since the first and second shift registers do not output the pulses during the hold frame HF, little consumed power may occur.

The first scan signals SC1*n* and SC1*n-i* may include the 1-1 scan signal SC1*n-i* and the 1-2 scan signal SC1*n* that are sequentially output from the first shift register. The 1-2 scan signal SC1*n* may be output after the 1-1 scan signal SC1*n-i* is output from the first shift register. Some sections of the 1-1 scan signal SC1*n-i* pulse may overlap some sections of the 1-2 scan signal SC1*n* pulse. The 1-2 scan signal SC1*n* may have a phase later than a phase of the 1-1 scan signal SC1*n-i* and have the same pulse width W.

The driving element DT may include a gate electrode connected to a first node n1, a first electrode connected to a second node n2, and a second electrode connected to a third node n3.

The storage capacitor Cst may be connected between a node on the first power line PL1 to which the pixel driving voltage ELVDD is applied and the first node n1. The storage capacitor Cst can suppress the fluctuation of the gate-source voltage Vgs of the driving element DT for driving the light emitting element EL by charging the pixel driving voltage ELVDD and a voltage at the first node n1.

The second capacitor C2 may be connected between the first node n1 and the third gate line GL3 to which the third scan signal SC3*n* is applied. The second capacitor C2 can suppress fluctuation in the gate voltage of the driving element DT at a falling edge of the 1-2 scan signal SC1*n* and compensate the fluctuation. A voltage of the 1-2 scan signal SC1*n* may drop from the gate high voltage VGH to the gate low voltage VGL. In this case, due to a kickback voltage generated due to a parasitic capacitance between the gate line GL11 to which the voltage of the 1-2 scan signal SC1*n* is applied and the first node n1, the gate voltage of the driving element DT may drop momentarily. The second capacitor C2 can suppress the kickback voltage with the gate high voltage VGH applied to the gate line GL3 when a voltage of the gate line GL11 to which the voltage of the 1-2 scan signal SC1*n* is applied is reduced to the gate low voltage VGL. The second capacitor C2 may compensate the fluctuation of the gate voltage of the driving element DT reduced as much as the kickback voltage when a voltage of the gate line GL3 to which a voltage of the third scan line SC3*n* is applied increases to the gate high voltage VGH.

The light emitting element EL may include an anode connected to a fourth node n4 and a cathode connected to the second power line PL2 to which the cathode voltage ELVSS is applied.

The first switch element M1 may be connected between the first power line PL1 to which the pixel driving voltage ELVDD is applied and the second node n2. The first switch element M1 may be turned on in response to the gate low voltage VGL of the EM signal (EMn). When the first switch element M1 is turned on, the pixel driving voltage ELVDD may be applied to the second node n2. The first switch element M1 may include a gate electrode connected to the fourth gate line GL4 to which the EM signal (EMn) is applied, a first electrode connected to the first power line PL1, and a second electrode connected to the second node n2.

The second switch element M2 may be connected between the data line DL and the second node n2. The second switch element M2 may be turned on in response to the gate low voltage VGL of the second scan signal SC2*n*. When the second switch element M2 is turned on, the data line DL to which the data voltage Vdata of the pixel data is applied may be connected to the second node n2. The second switch element M2 may include a gate electrode connected to the second gate line GL2 to which the second scan signal SC2*n* is applied, a first electrode connected to the data line DL, and a second electrode connected to the second node n2.

The third switch element M3 may be connected between the first node n1 and the third node n3. The third switch element M3 may be turned on in response to the gate high voltage VGH of the 1-2 scan signal SC1*n*. When the third switch element M3 is turned on, the first node n1 may be connected to the third node n3. Therefore, when the third switch element M3 is turned on, a gate electrode of the driving element DT may be connected to a second electrode so that the driving element DT operates as a diode. The third switch element M3 may include the gate electrode connected to the 1-2 gate line GL11 to which the 1-2 scan signal SC1*n* is applied, a first electrode connected to the first node n1, and the second electrode connected to the third node n3.

The fourth switch element M4 may be connected between the first node n1 and the third power line PL3 to which the initialization voltage Vini is applied. The fourth switch element M4 may be turned on in response to the gate high voltage VGH of the 1-1 scan signal SC1*n-i*. When the fourth switch element M4 is turned on, the initialization voltage Vini may be applied to the capacitor Cst connected to the first node n1 and the gate electrode of the driving element DT. The fourth switch element M4 may include a gate electrode connected to the 1-1 gate line GL1*i* to which the 1-1 scan signal SC1*n-i* is applied, a first electrode connected to the first node n1, and a second electrode connected to the third power line PL3.

The fifth switch element M5 may be connected between the second node n2 and the fourth power line PL4 to which the second compensation voltage VOBS is applied. The fifth switch element M5 may be turned on in response to the gate low voltage VGL of the third scan signal SC3*n*. When the fifth switch element M5 is turned on, the second compensation voltage VOBS may be applied to the second node n2. The fifth switch element M5 may include a gate electrode connected to the third gate line GL3 to which the third scan signal SC3*n* is applied, a first electrode connected to the second node n2, and a second electrode connected to the fourth power line PL4.

The sixth switch element M6 may be connected between the fourth node n4 and the fifth power line PL5 to which the third compensation voltage VAR is applied. The sixth switch element M6 may be turned on in response to the gate low voltage VGL of the third scan signal SC3*n*. When the sixth switch element M6 is turned on, the third compensation voltage VAR may be applied to the anode of the light emitting element EL connected to the fourth node n4. The sixth switch element M6 may include a gate electrode connected to the third gate line GL3, a first electrode connected to the fourth node n4, and a second electrode connected to the fifth power line PL5.

The seventh switch element M7 may be connected between the third node n3 and the fourth node n4. The seventh switch element M7 may be turned on in response to the gate low voltage VGL of the EM signal EMn to connect the third node n3 to the fourth node n4. The seventh switch element M7 may include a gate electrode connected to the fourth gate line GL4, a first electrode connected to the third node n3, and a second electrode connected to the fourth node n4.

The data voltage Vdata of the pixel data may be applied to the data lines DL during the refresh frame section in which the pixel data is written on the pixels. The first compensation voltage Vpark may be set to a voltage for compensating for a change in luminance of pixels and applied to the data lines DL during the hold frame section in which the pixel data is not written on the pixels. During the hold frame, the pixels may be driven with the data voltage Vdata charged in the storage capacitor Cst during the previous refresh frame.

The data voltage Vdata may be applied to the second node n2 when the data line DL and the second node n2 are electrically connected through the turned-on second switch element M2. The first compensation voltage Vpark may be applied to the second node n2 as a leakage current of the second switch element M2 in a turn-off state of the second switch element M2, that is, a state in which the data line DL and the second node n2 are electrically separated, and applied to the first node n1 through the parasitic capacitance. Here, the parasitic capacitance may include a parasitic capacitance present between the first node n1 and the second node n2 and a parasitic capacitance present between the first node n1 and the data line DL. The gate-source voltage Vgs of the driving element DT may be finely adjusted by the first compensation voltage Vpark.

The compensation voltages Vpark, VOBS, and VAR can improve the image quality of the image displayed in the pixels by compensating differences in luminance characteristics of the pixels 101 between the refresh frame and the hold frame in the low power mode.

Figure 7:
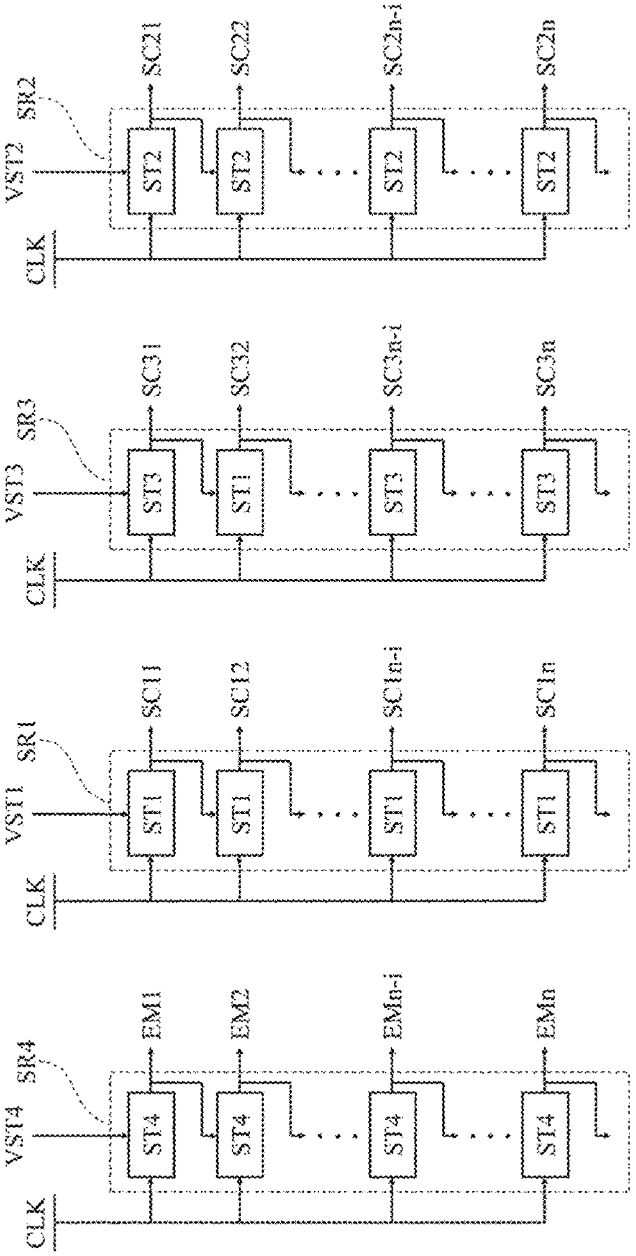
FIG. 7 is a view schematically showing a gate driver for outputting gate signals applied to the pixel circuits shown in FIGS. 6A and 6B.

FIG. 7 is a view schematically showing a gate driver for outputting gate signals applied to the pixel circuit shown in FIGS. 6A and 6B.

Referring to FIG. 7, the gate driver may include a first shift register SR1 for sequentially outputting pulses of the first scan signals SC1*n-i* and SC1*n*, a second shift register SR2 for sequentially outputting a pulse of the second scan signal SC2*n*, a third shift register SR3 for sequentially outputting a pulse of the third scan signal SC3*n*, and a fourth shift register SR4 for outputting a pulse of the EM signal EMn.

The first shift register SR1 may include a plurality of stages ST1 cascade-connected to each other. The first shift register SR1 may receive a start pulse VST1 and the clock CLK and sequentially output the pulses of the first scan signal in the order of SC11, SC12 . . . SC1*n-i*, . . . and SC1*n*.

The second shift register SR2 may include a plurality of stages ST2 cascade-connected to each other. The second shift register SR2 may receive a start pulse VST2 and the clock CLK and sequentially output the pulses of the second scan signal in the order of SC21, SC22 . . . SC2*n-i*, . . . and SC2*n*.

The third shift register SR3 may include a plurality of stages ST3 cascade-connected to each other. The third shift register SR3 may receive a start pulse VST3 and the clock CLK and sequentially output the pulses of the third scan signal in the order of SC31, SC32 . . . SC3*n-i*, . . . and SC3*n*.

The fourth shift register SR4 may include a plurality of stages ST4 cascade-connected to each other. The fourth shift register SR4 may receive a start pulse VST4 and the clock CLK and sequentially output the pulses of the EM signal in the order of EM1, EM2 . . . EM*n-i*, . . . and EMn.

The clock CLK input to the shift registers SR1, SR2, SR3, and SR4 may be two or more clocks having different phases. One or more of phases, frequencies, and duty ratios of the start pulses and clocks input from the shift registers SR1, SR2, SR3, and SR4 may be different.

Figure 8:
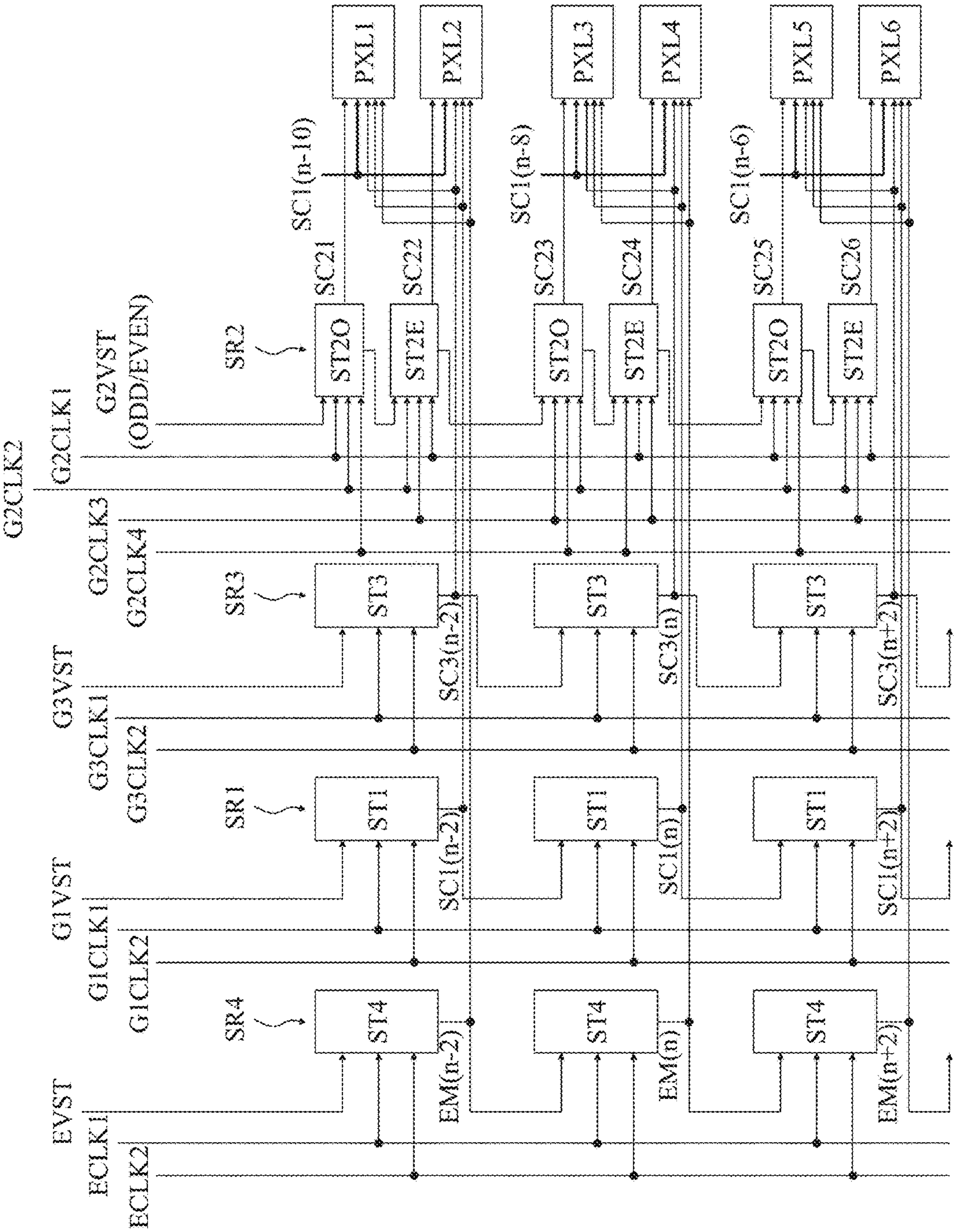
FIG. 8 is a view showing the gate driver for outputting the gate signals applied to the pixel circuit.
Figure 9:
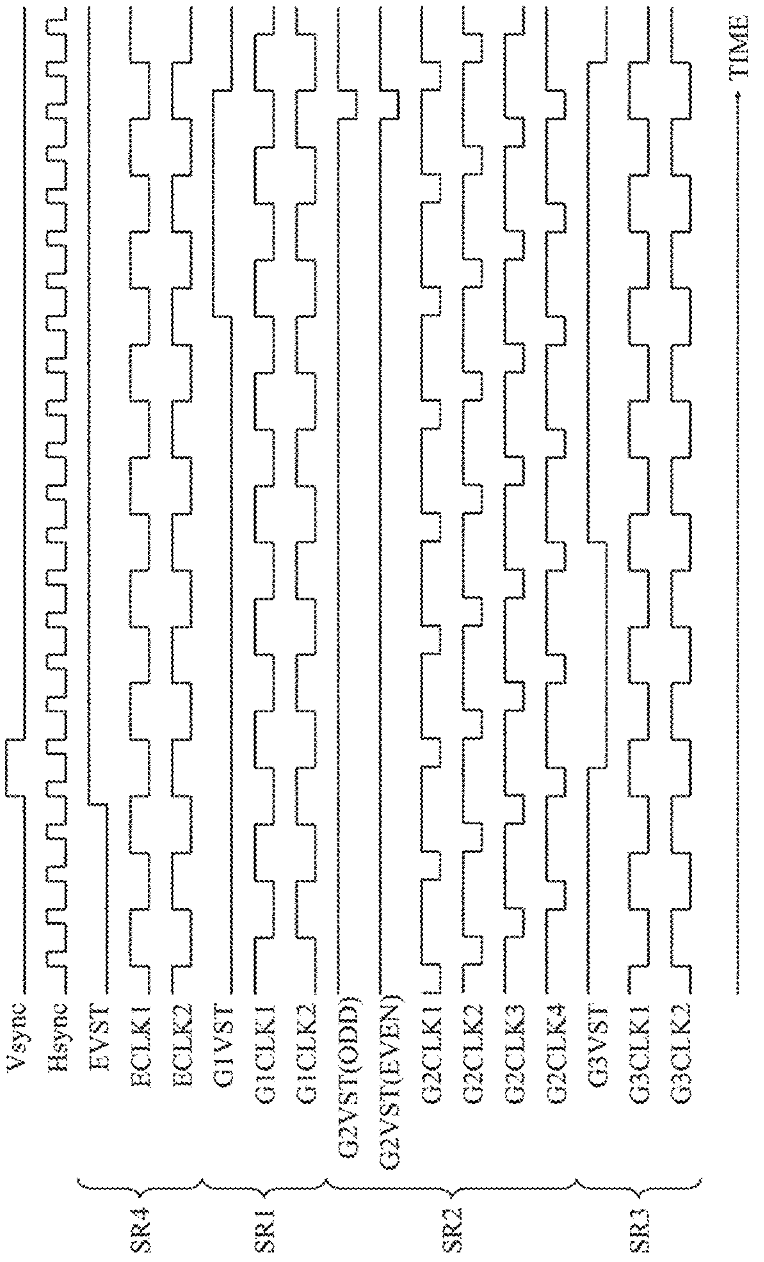
FIG. 9 is a waveform diagram showing a clock and a start pulse that are input to a shift register shown in FIG. 8.

FIG. 8 is a view showing the gate driver for outputting the gate signals applied to the pixel circuit. FIG. 9 is a waveform diagram showing a clock and a start pulse that are input to a shift register shown in FIG. 8.

Referring to FIGS. 6A, 6B, 8, and 9, the gate driver may include the first shift register SR1 for sequentially outputting the pulses of the first scan signals SC1*n-i* and SC1*n*, the second shift register SR2 for sequentially outputting the pulse of the second scan signal SC2*n*, the third shift register SR3 for sequentially outputting the pulse of the third scan signal SC3*n*, and the fourth shift register SR4 for outputting the pulse of the EM signal EMn.

The first shift register SR1 may include a plurality of stages ST1 cascade-connected to each other. The first shift register SR1 may receive a start pulse G1VST and clocks G1CLK1 and G1CLK2 and sequentially output the pulses of the first scan signals SC1*n-i* and SC1*n*. The clocks G1CLK1 and G1CLK2 may include two or more shift clocks having different phases. Pulse widths of the first scan signals SC1*n-i* and SC1*n* may be set to be longer than one horizontal section and simultaneously applied to pixels disposed in a plurality of pixel lines. For example, a 1-1 scan signal SC1(n−10) and a 1-2 scan signal SC1(n−2) may be simultaneously applied to vertically adjacent first and second pixels PXL1 and PXL2. Subsequently, the 1-1 scan signal SC1(n−8) and the 1-2 scan signal SC1(*n*) may be simultaneously applied to the vertically adjacent third and fourth pixels PXL3 and PXL4. Subsequently, the 1-1 scan signal SC1(n−6) and the 1-2 scan signal SC1(*n*+2) are simultaneously applied to the vertically adjacent fifth and sixth pixels PXL5 and PXL6.

To adjust a luminance difference between pixel lines, timings of phases, pulse widths, etc., of the pulses of the second scan signals SC21, SC23, and SC25 applied to the odd-numbered pixel lines and the pulses of the second scan signals SC22, SC24, and SC26 applied to the even-numbered pixel lines may be adjusted differently.

The second shift register SR2 may include a plurality of odd-numbered shift registers ST20 for receiving a first start pulse G2VST(ODD) and first clocks G2CLK1 and G2CLK2 and sequentially outputting the pulses of the odd-numbered second scan signals SC21, SC23, and SC25, and a plurality of even-numbered shift registers ST2E for receiving a second start pulse G2VST(EVEN) and second clocks G2CLK3 and G2CLK4 and sequentially outputting the pluses of the even-numbered second scan signals SC22, SC24, and SC26. The pulse widths of the second scan signal SC21 to SC26 may be one horizontal section.

The first clocks G2CLK1 and G2CLK2 may include two or more shift clocks having different phases. The second clocks G2CLK3 and G2CLK4 may include two or more shift clocks having different phases. A carry signal may be transmitted between the neighboring odd-numbered stage ST20 and even-numbered stage ST2E.

After a pulse of a 2-1 scan signal SC21 is applied to the first pixel PXL1, a pulse of a 2-2 scan signal SC22 may be applied to the second pixel PXL2. Subsequently, after a pulse of a 2-3 scan signal SC23 is applied to the third pixel PXL3, a pulse of a 2-4 scan signal SC24 may be applied to the fourth pixel PXL4. Subsequently, after a pulse of a 2-5 scan signal SC25 is applied to the fifth pixel PXL5, a pulse of a 2-6 scan signal SC26 may be applied to the sixth pixel PXL6.

The third shift register SR3 may include a plurality of stages ST3 cascade-connected to each other. The third shift register SR3 may receive a start pulse G3VST and clocks G3CLK1 and G3CLK2 and sequentially output the pulses of the third scan signal SC3*n*. The clocks G3CLK1 and G3CLK2 may include two or more shift clocks having different phases. The pulse width of the third scan signal SC3*n* may be set to be longer than one horizontal section and simultaneously applied to the pixels disposed in the plurality of pixel lines. For example, the pulses of the third scan signal SC3(n−2) may be simultaneously applied to the vertically adjacent first and second pixels PXL1 and PXL2. Subsequently, the pulses of the third scan signal SC3(*n*) may be simultaneously applied to the vertically adjacent third and fourth pixels PXL3 and PXL4. Subsequently, the pulse of the third scan signal SC3(*n*+2) may be simultaneously applied to the vertically adjacent fifth and sixth pixels PXL5 and PXL6.

The fourth shift register SR4 may include a plurality of stages ST4 cascade-connected to each other. The fourth shift register SR4 may receive a start pulse EVST and clocks ECLK1 and ECLK2 and sequentially output the pulses of the EM signal EMn. The clocks ECLK1 and ECLK2 may include two or more shift clocks having different phases. The pulse width of the EM signal EMn may be set to be longer than one horizontal section and simultaneously applied to the pixels disposed in the plurality of pixel lines. For example, the pulse of the EM signal EM(n−2) may be simultaneously applied to the vertically adjacent first and second pixels PXL1 and PXL2. Subsequently, the pulse of the EM signal EM(n) may be simultaneously applied to the vertically adjacent third and fourth pixels PXL3 and PXL4. Subsequently, the pulse of the EM signal EM(n+2) may be simultaneously applied to the vertically adjacent fifth and sixth pixels PXL5 and PXL6.

The pixel circuit shown in FIGS. 6A and 6B requires the five gate signals SC1*n*, SC1*n-i*, SC2*n*, SC3*n*, and EMn. Since the present disclosure outputs the gate signals SC1*n*, SC1*n-i*, SC2*n*, SC3*n*, and EMn using the four shift registers SR1, SR2, SR3, and SR4 as shown in FIG. 8, it is possible to reduce the size of the circuit of the gate driver.

Figure 10:
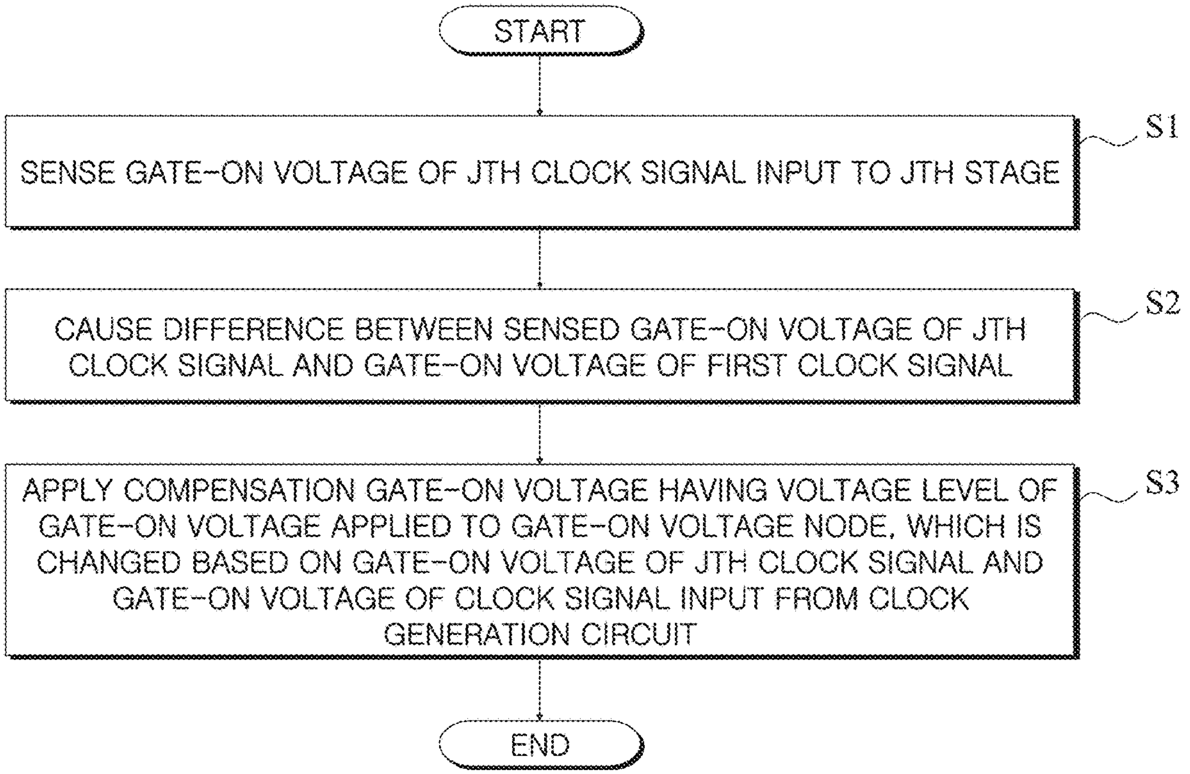
FIG. 10 is a flowchart showing a method of driving a display device according to an embodiment of the present specification.

FIG. 10 is a flowchart showing a method of driving a display device according to an embodiment of the present specification.

Referring to FIG. 10, a method of driving a display device may include sensing a gate-on voltage of a $J^{th}$ clock signal input to a $J^{th}$ stage (e.g., operation S1).

The method of driving the display device may include an operation in which a difference occurs between the sensed gate-on voltage of the $J^{th}$ clock signal and a gate-on voltage of a first clock signal (e.g., operation S2).

The method of driving the display device may include applying a compensation gate-on voltage that is a gate-on voltage applied to the gate-on voltage node, of which a voltage level is changed based on the gate-on voltage of the $J^{th}$ clock signal and a gate-on voltage of a clock signal input from a clock generation circuit (e.g., operation S3).

Figure 11:
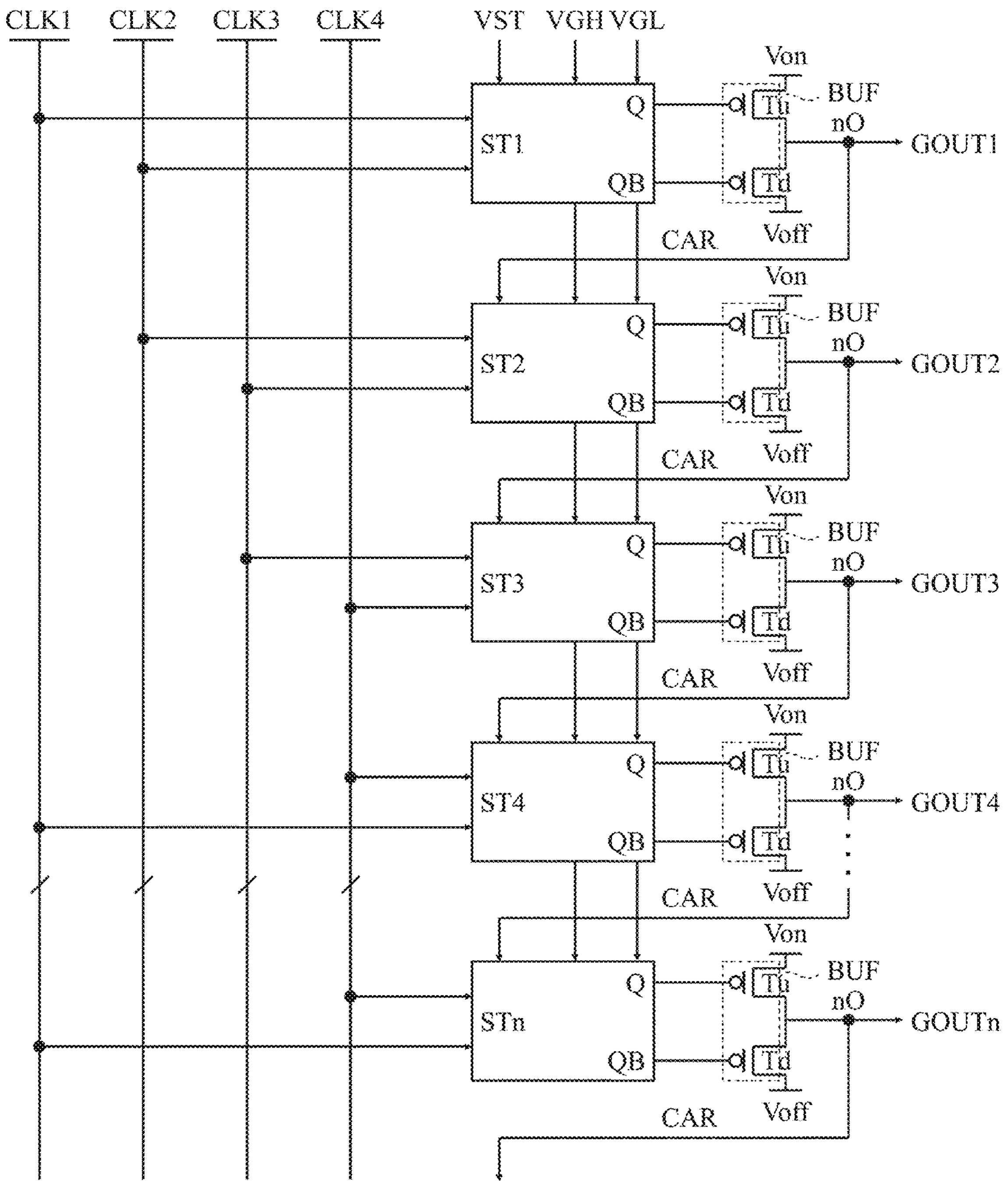
FIG. 11 is a view schematically showing a shift register of a gate driver according to one embodiment of the present specification.

FIG. 11 is a view schematically showing a shift register of a gate driver according to one embodiment of the present specification.

Referring to FIG. 11, the gate driver may include one or more shift registers. The shift register may be implemented as a known shift register circuit for driving the display panel. The shift register may include a plurality of stages ST1 to STn cascade-connected to each other. The stages ST1 to STn may be gate in panel (GIP) elements formed using a GIP method. The stage may be construed as a signal transmission part of a shift register.

The remaining stages ST2 to STn excluding the uppermost stage ST1 are substantially the same configuration and connection relationship as the uppermost stage ST1, except for receiving a carry signal CAR instead of an external start signal VST and outputting gate signals GOUT1 to GOUTn having different phases. The remaining stages ST2 to STn excluding the uppermost stage ST1 are substantially the same configuration and connection relationship as each other, except for receiving clock signals having different phases and outputting the gate signals GOUT2 to GOUTn having different phases.

Each of the stages may include a CLK node to which clocks CLK1 to CLK4 are input, a VST node to which the start pulse VST or the carry signal CAR from the previous stage is input, a first control node Q, a second control node QB, an output node nO, and a buffer BUF for outputting pulses of a gate signal by charging/discharging an output node nO in response to voltages at control nodes Q and QB.

An operation of the uppermost stage ST1 may be activated according to the external start signal, and operations of the second uppermost stage ST2 to the lowermost stage STn may be activated according to the carry signal CAR of the previous stage. The carry signal CAR may become an interval start signal as the gate signal GOUT of the previous stage.

Phases of the clocks CLK1 to CLK4 may be shifted sequentially. Stages ST may receive one or more clocks. As shown, each of the stages ST receives two clocks, but is not limited thereto.

In the shown embodiment, the CLK nodes of each of the stages ST may be connected to clock lines disposed in a non-display area of the display panel to receive the clocks CLK1 to CLK4. However, each of the stages ST is not limited to the shown embodiment and may receive the clocks CLK1 to CLK4 through the clock lines disposed in the display area.

The first stage ST may receive the first and second clocks CLK1 and CLK2 and the start pulse and output the pulse of the gate signal GOUT1 and the pulse of the carry signal CAR. The second stage ST may receive the pulses of the second and third clocks CLK2 and CLK3 and the first carry signal CAR and output the pulse of the second gate signal GOUT2 and the pulse of the second carry signal CAR.

The n1 stage ST may receive the pulses of the first and fourth clocks CLK1 and CLK4 and the $n-1^{th}$ carry signal CAR from the $n-1^{th}$ stage and output the pulse of the $n^{th}$ gate signal GOUTn and the pulse of the $n^{th}$ carry signal CAR (n is a natural number).

The buffer BUF may include a first buffer transistor Tu controlled according to a voltage at the first control node Q and a second buffer transistor Td controlled according to a voltage at the second control node QB.

The first buffer transistor Tu may be turned on according to the voltage at the first control node Q to charge a voltage at the output node nO to a gate-on voltage Von. The first buffer transistor Tu may include a gate electrode connected to the first control node Q, a first electrode to which the gate-on voltage Von is applied, and a second electrode connected to the output node nO.

The second buffer transistor Td may be turned on according to a voltage at the second control node QB to supply a gate-off voltage Voff to the output node nO. The second buffer transistor Td may include a gate electrode connected to the second control node QB, a first electrode connected to the output node nO, and a second electrode to which the gate-off voltage Voff is applied.

As will be described below, the output node nO may include a first output node which outputs the pulses of the gate signals GOUT1 to GOUTn and a second output node which outputs the pulses of the carry signal CAR.

Figure 12:
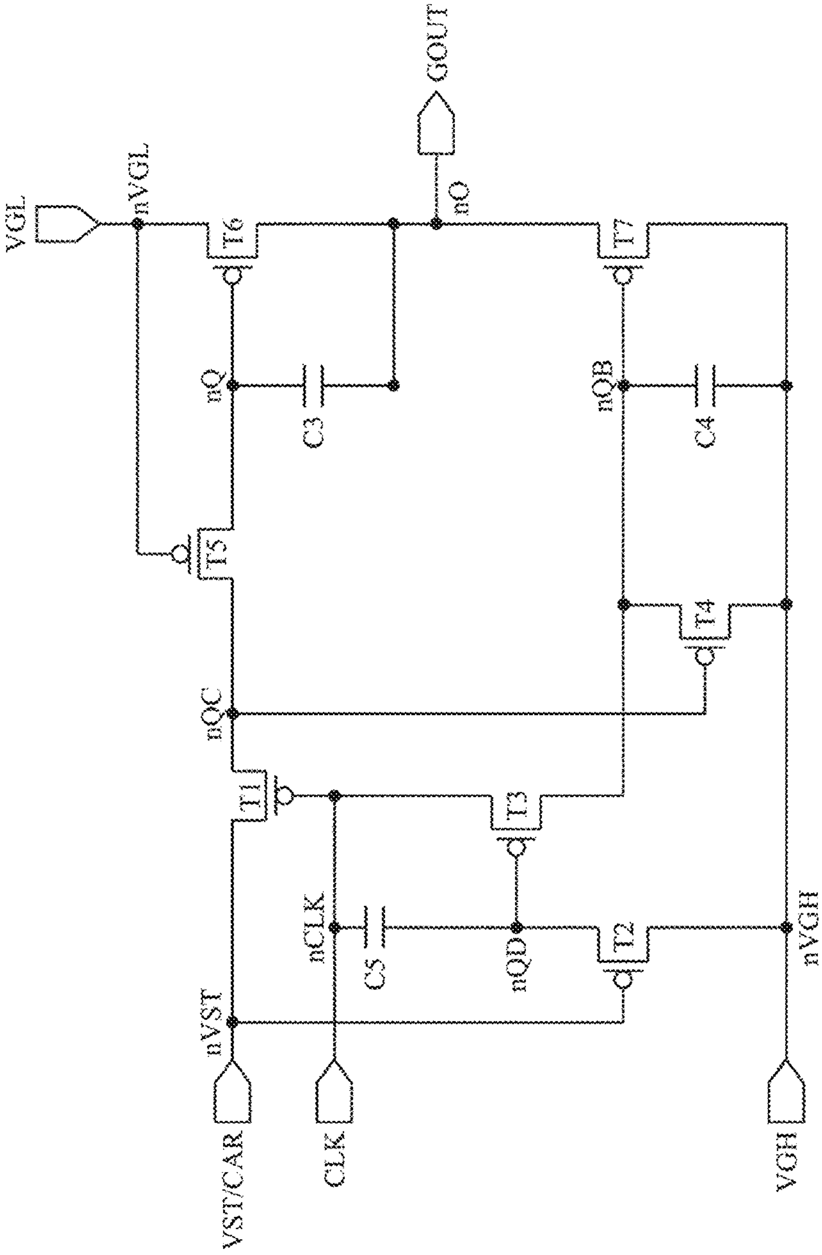
FIG. 12 is a circuit diagram showing one stage circuit included in the gate driver according to one embodiment of the present specification.

FIG. 12 is a circuit diagram specifically showing the circuit of the $n^{th}$ stage shown in FIG. 11. Each of the stages ST1 to STn shown in FIG. 11 is substantially the same circuit as the $n^{th}$ stage STn shown in FIG. 12.

Referring to FIG. 12, the $n^{th}$ stage circuit may include a plurality of transistors T1 to T7, a plurality of capacitors C3 to C5, and nodes connecting the transistors and capacitors.

Each of the first to seventh transistors T1 to T7 may include a p-channel TFT. The p-channel TFT may be turned on in response to the gate low voltage VGL shown in FIG. 13 and turned off in response to the gate high voltage VGH. In the case of the p-channel transistor, the gate-on voltage may be the gate low voltage VGL, and the gate-off voltage may be the gate high voltage VGH.

The stage circuit may include a CLK node nCLK into which the clock signal CLK is input, a VST node nVST into which the start signal or the carry signal VST/CAR from the previous stage are input, a first control node nQ, a second control node nQB, an output node nO through which the gate signal GOUT and/or the carry signal are output, a gate-on voltage node (hereinafter referred to as a "VGL node") to which the gate-on voltage VGL is applied, a gate-off voltage node (hereinafter referred to as a "VGH node") to which the gate-off voltage VGH is applied, etc.

The gate-on voltage VGL applied to the VGL node may be a first constant voltage. The gate-on voltage VGL applied to the VGL node may be a voltage swinging between the gate high voltage and the gate low voltage. The gate-off voltage VGH applied to the VGH node may be a second constant voltage.

Hereinafter, "activating" a specific node means that the gate-on voltage or a voltage that is similar thereto may be applied to the node. Hereinafter "deactivating" the specific node means that the gate-off voltage or a voltage that is similar thereto may be applied to the node.

The stage circuit may include a Q control unit, a QB control unit, an output unit, and a first stabilization unit.

The Q control unit may include a first transistor T1. The first transistor T1 may activate a QC node nQC by applying the start signal VST/CAR at the gate-on voltage to the QC node nQC according to the clock signal CLK. The gate electrode of the first transistor T1 may be connected to the CLK node nCLK, and the first and second electrodes of the first transistor T1 may be connected to a VST node nVST and a QC node nQC, respectively.

The QB control unit may activate the second control node nQB opposite to the QC node nQC according to potentials of the clock signal CLK, the start signal VST/CAR, and the QC node nQC. The QB control unit may include a fifth capacitor C5, a second transistor T2, a third transistor T3, a fourth transistor T4, and a fourth capacitor C4.

The fifth capacitor C5 may be connected between the CLK node nCLK and the QD node nQD. The third transistor T3 may supply the clock signal CLK to the second control node nQB according to the potential of the QD node nQD. A gate electrode of the third transistor T3 may be connected to the QD node nQD, and first and second electrodes of the third transistor T3 may be connected to the CLK node nCLK and the second control node nQB, respectively.

The second transistor T2 may supply the gate-off voltage to the QD node nQD according to the start signal VST/CAR. The gate electrode of the second transistor T2 may be connected to the VST node nVST, and first and second electrodes of the second transistor T2 may be connected to the QD node nQD and the VGH node nVGH, respectively. A potential of the QD node nQD may be synchronized to the clock signal CLK while the start signal VST/CAR is maintained at the gate-off voltage. The potential of the QD node nQD may become the gate-off voltage while the start signal VST/CAR is maintained at the gate-on voltage.

The fourth transistor T4 may supply the gate-off voltage to the second control node nQB according to the potential of the QC node nQC. A gate electrode of the fourth transistor T4 may be connected to the QC node nQC, and first and second electrodes of the fourth transistor T4 may be connected to the second control node nQB and the VGH node nVGH, respectively.

The fourth capacitor C4 may be connected between the second control node nQB and the VGH node nVGH to stabilize a potential of the second control node nQB.

The output unit may include a sixth transistor T6, which is a pull-down element, a seventh transistor T7, which is a pull-up element, and a third capacitor C3.

The sixth transistor T6 may supply the gate signal GOUT at the gate-on voltage VGL to the output node nO from when the first control node nQ is bootstrapped in synchronization with the activated timing of the QC node nQC. A gate electrode of the sixth transistor T6 may be connected to the first control node nQ, and first and second electrodes of the sixth transistor T6 may be connected to the VGL node nVGL and the output node nO, respectively.

The third capacitor C3 may be connected between the first control node nQ and the output node nO. The third capacitor C3 serves to bootstrap the first control node nQ by reflecting a change in potential of the output node nO to the potential of the first control node nQ when the gate signal GOUT changes from the gate-off voltage to the gate-on voltage.

The seventh transistor T7 may supply the gate signal GOUT of the gate-off voltage VGH to the output node nO from while the second control node nQB is activated. A gate electrode of the seventh transistor T7 may be connected to the second control node nQB, and first and second electrodes of the seventh transistor T7 may be connected to the output node nO and the VGH node nVGH, respectively.

The first stabilization unit may include a fifth transistor T5. A gate electrode of the fifth transistor T5 may be connected to the VGL node nVGL, and first and second electrodes of the fifth transistor T5 may be connected to the QC node nQC and the first control node nQ, respectively. A channel current between the first and second electrodes of the fifth transistor T5 may become zero when the first control node nQ is bootstrapped. The fifth transistor T5 may be turned off when the first control node nQ is bootstrapped, thereby blocking the electrical connection between the QC node nQC and the first control node nQ. While the first control node nQ is not bootstrapped, the fifth transistor T5 may maintain the turned-on state.

The fifth transistor T5 may maintain the turn-on state and may be turned off only when the first control node nQ is bootstrapped, thereby blocking a current flow between the QC node nQC and the first control node nQ. When the first control node nQ is bootstrapped, the potential of the QC node nQC may differ from the potential of the first control node nQ. Since the potential of the QC node nQC does not change even when the potential of the first control node nQ changes at the moment of bootstrapping, the first and fourth transistors T1 and T4 connected to the QC node nQC can avoid overloading at the moment of bootstrapping.

When the fifth transistor T5 is not present, a drain-source voltage Vds of the first transistor T1 and a gate-source voltage Vgs of the fourth transistor T4 may increase to a critical value or more due to bootstrapping, and when such an overloading phenomenon continuously occurs, an element destruction phenomenon, so called a breakdown phenomenon, may occur. The fifth transistor T5 can prevent the breakdown of the first and fourth transistors T1 and T4 connected to the QC node nQC at the moment of bootstrapping of the first control node nQ.

Figure 13:
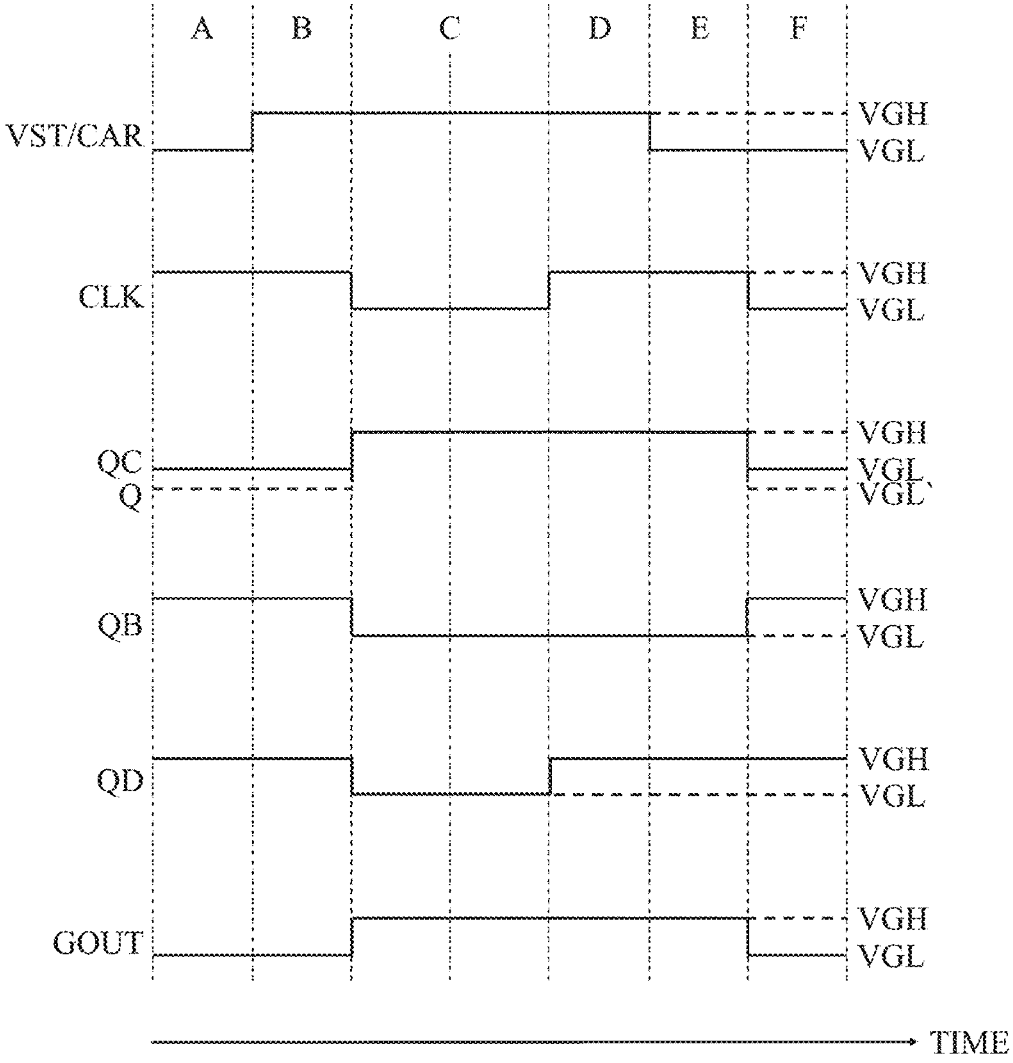
FIG. 13 is a waveform diagram showing input and output waveforms of the circuit shown in FIG. 12.

FIG. 13 is a waveform diagram showing input and output waveforms of the circuit shown in FIG. 12. FIG. 14 is a table showing an operation of a stage corresponding to sections A to F of FIG. 13. FIGS. 15A to 15F are circuit diagrams showing operating states of the stages corresponding to sections A to F of FIG. 13. Hereinafter, the description will be made on the assumption that the stage circuit receives one clock input, but the present specification is not limited thereto, and may be appropriately modified depending on the practitioner within the scope of substantially the same technical spirit.

In FIG. 14, a potential "Low" may refer to the gate-on voltage, a potential "High" may refer to the gate-off voltage, and a potential "Very Low" may refer to boosting voltages VGL'/VEL' lower than the gate-on voltage.

When the QC node nQC is deactivated and the second control node nQB is activated, a gate signal of the gate-off voltage VGH may be output from the corresponding stage.

When the QC node nQC is activated and the second control node nQB is deactivated, a gate signal of the gate-on voltage VGL may be output from the corresponding stage.

The stage may output the gate signal at the gate-on voltage VGL from when the first control node nQ is bootstrapped in synchronization with the activated timing of the QC node nQC.

Figure 15A:
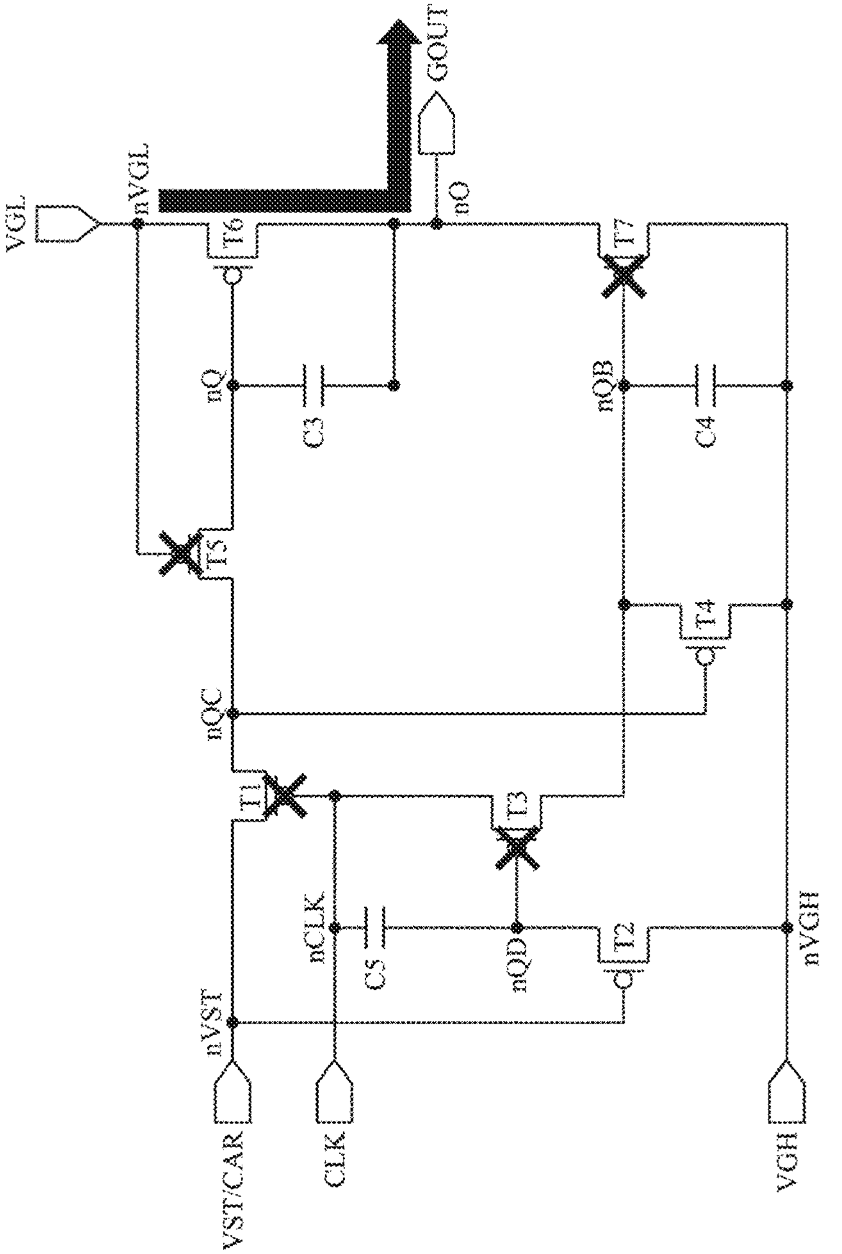
FIGS. 15A to 15F are circuit diagrams showing operating states of the stages corresponding to sections A to F of FIG. 13.

Referring to FIGS. 13, 14, and 15A, in section A, the clock signal CLK at the gate-off voltage may be input, and the start signal VST/CAR at the gate-on voltage may be input.

An operation of section A is the same as section F to be described below, except that the first transistor T1 may be turned off according to the clock signal CLK of the gate-off voltage.

Since the QC node nQC is maintained at the gate-on voltage in section F even when the first transistor T1 is turned off, the gate signal GOUT of the gate-on voltage VGL may be output to the output node nO.

Figure 15B:
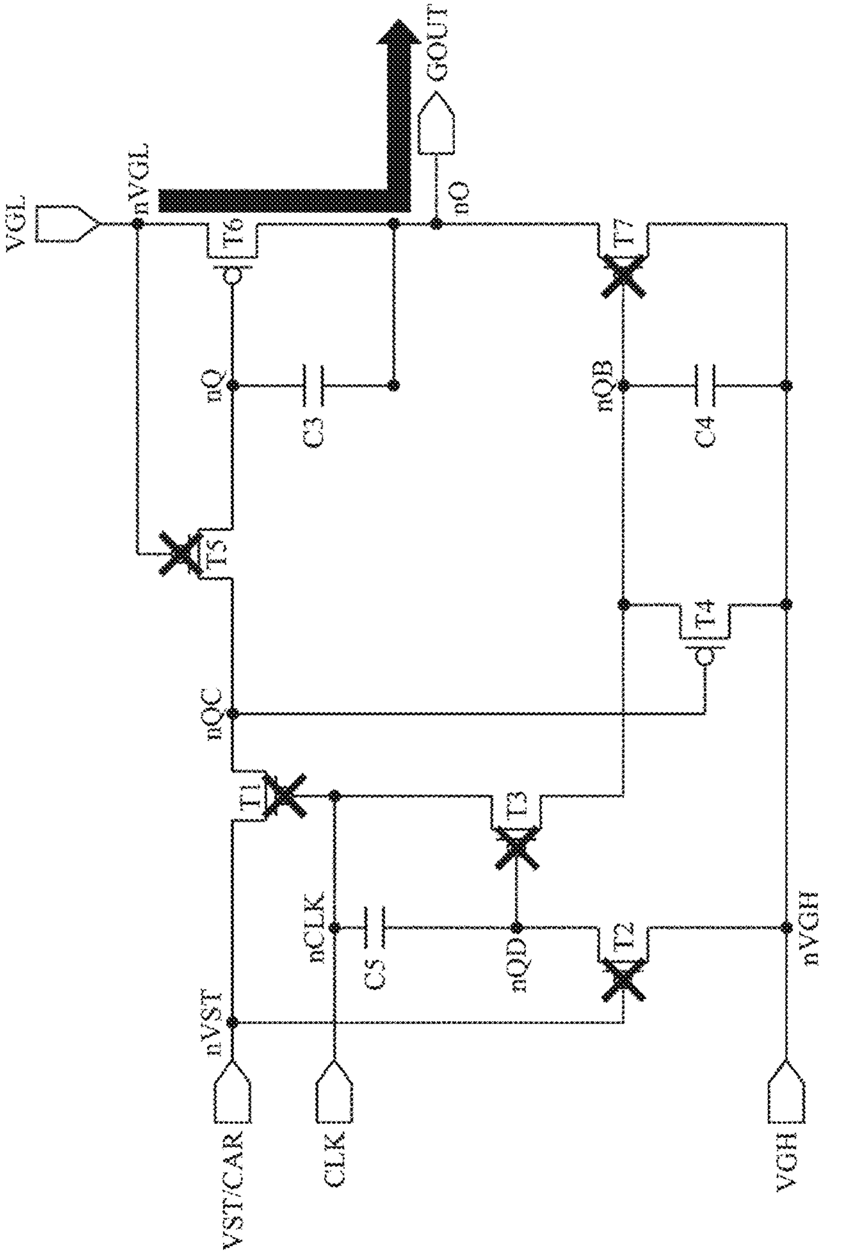

Referring to FIGS. 13, 14, and 15B, in section B, the start signal VST/CAR and the clock signal CLK at the gate-off voltage may be input. The first transistor T1 may be turned off according to the clock signal CLK at the gate-off voltage, and the second transistor T2 may be turned off according to the start signal VST/CAR at the gate-off voltage. The third transistor T3 may be turned off according to the gate-off voltage at the QD node nQD.

The QC node nQC may be maintained at the gate-on voltage of the previous frame, and the first control node nQ may be maintained at the boosting voltage VGL' of the previous frame. The boosting voltages VGL'/VEL' may be lower than the gate-on voltage, but are not limited thereto.

According to the boosting voltages VGL'/VEL' of the first control node nQ, the sixth transistor T6 may be turned on, and the gate signal GOUT of the gate-on voltage VGL may be output to the output node nO.

Due to the bootstrapping of the first control node nQ, no channel current flows through the fifth transistor T5, and the fifth transistor T5 may be substantially turned off.

Figure 15C:
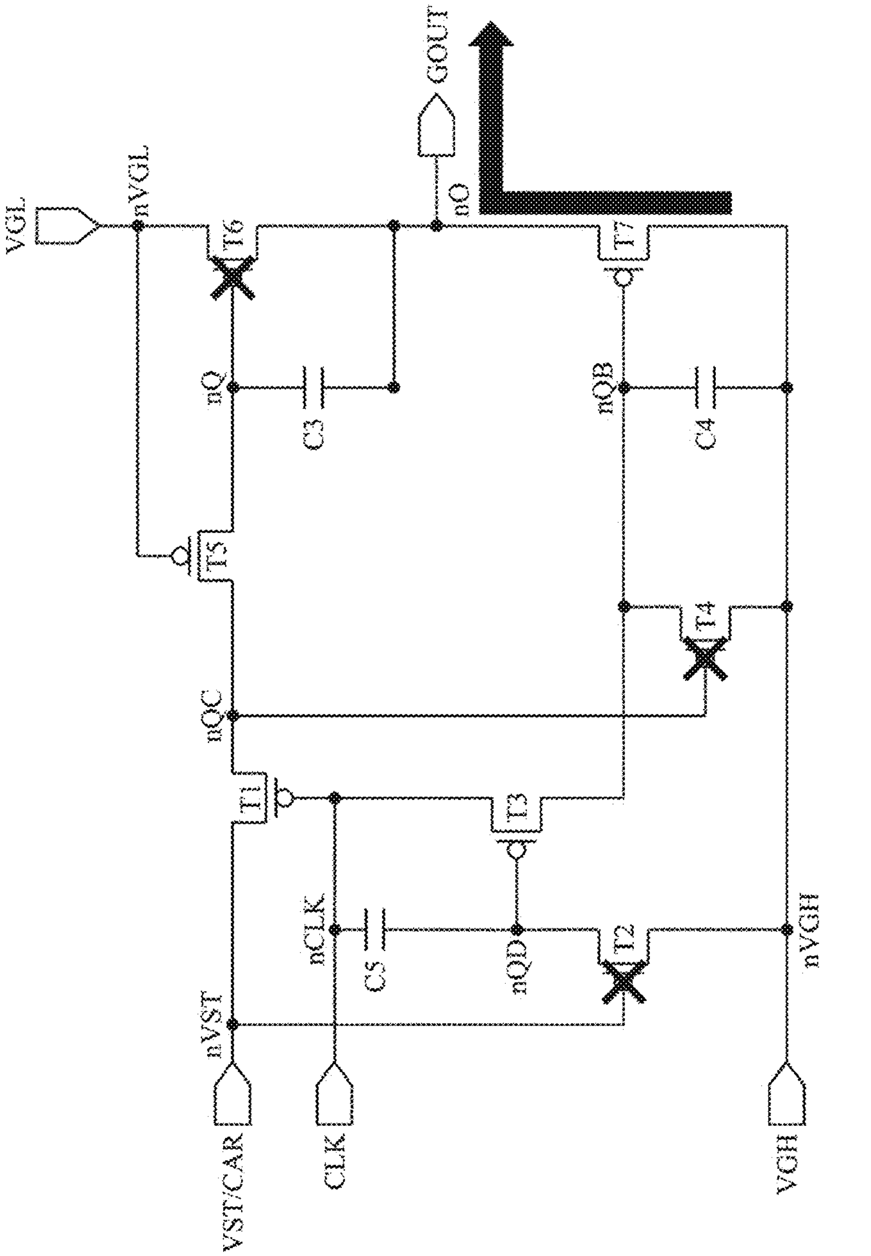

Referring to FIGS. 13, 14, and 15C, in section C, the start signal VST/CAR at the gate-off voltage may be input, and the clock signal CLK at the gate-on voltage may be input for a predetermined time. The first transistor T1 may be turned on according to the clock signal CLK of the gate-on voltage, and the second transistor T2 may maintain the turned-off state according to the start signal VST/CAR at the gate-off voltage.

The QD node nQD may be coupled to the clock signal CLK at the gate-on voltage and changed to the gate-on voltage to turn on the third transistor T3.

The start signal VST/CAR at the gate-off voltage may be applied to the QC node nQC through the first transistor T1. The gate-off voltage at the QC node nQC may be applied to the first control node nQ through the fifth transistor T5 to turn off the sixth transistor T6.

The fourth transistor T4 may be turned off according to the gate-off voltage at the QC node nQC, and the clock signal CLK of the gate-on voltage may be applied to the second control node nQB through the third transistor T3. Therefore, the seventh transistor T7 may be turned on according to the gate-on voltage of the second control node nQB to output the gate signal GOUT of the gate-off voltage VGH to the output node nO.

Figure 15D:
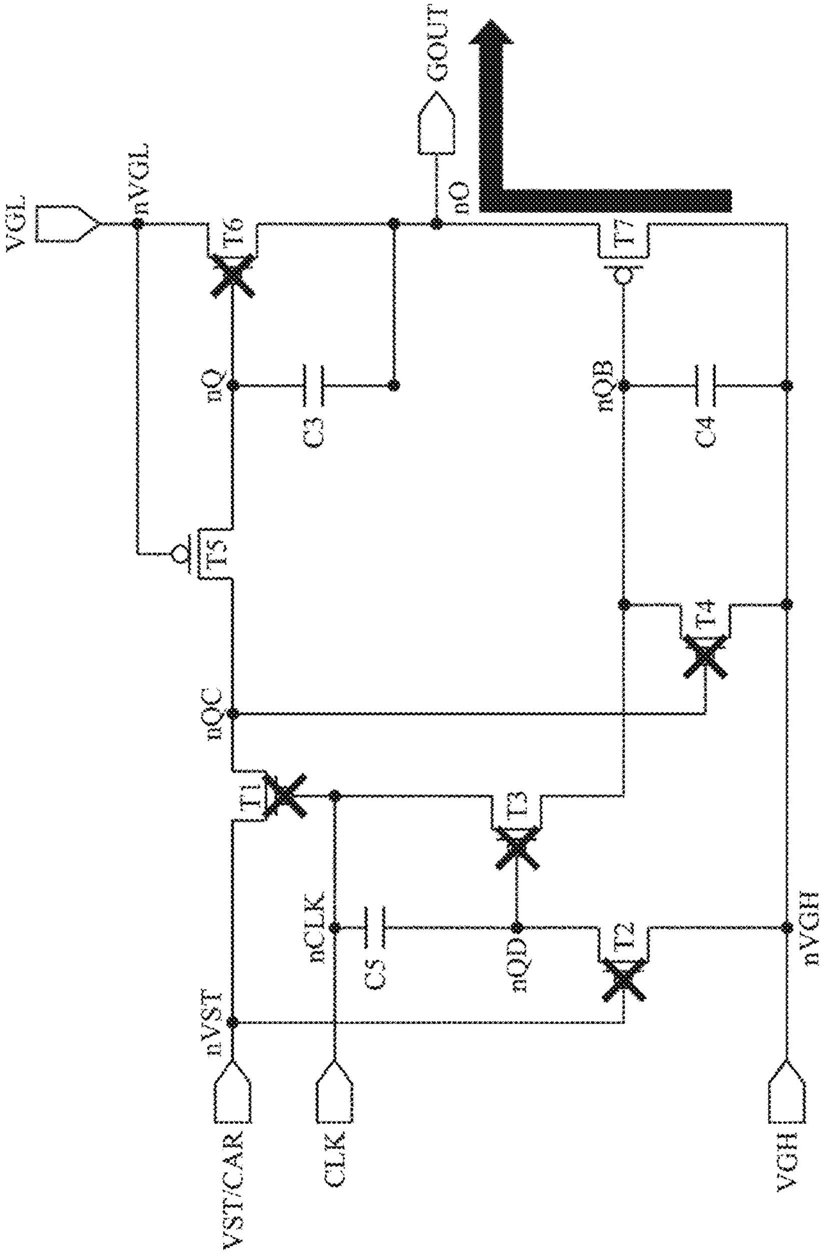

Referring to FIGS. 13, 14, and 15D, in section D, the start signal VST/CAR and the clock signal CLK at the gate-off voltage may be input. The first transistor T1 may be turned off according to the clock signal CLK at the gate-off voltage, and the second transistor T2 may maintain the turned-off state according to the start signal VST/CAR at the gate-off voltage. The QD node nQD may be coupled to the clock signal CLK at the gate-off voltage and changed to the gate-off voltage to turn off the third transistor T3.

The QC node nQC is in a floating state to be maintained at the gate-off voltage of section C. The gate-off voltage at the QC node nQC may be applied to the first control node nQ through the fifth transistor T5 to maintain the sixth transistor T6 in the turned-off state.

The fourth transistor T4 may maintain the turned-off state according to the gate-off voltage of the QC node nQC.

By turning off the third transistor T3, the second control node nQB may be in a floating state to be maintained at the gate-on voltage in section C. The seventh transistor T7 may maintain the turned-on state according to the gate-on voltage of the second control node nQB, and thus the gate signal GOUT at the gate-off voltage VGH may be output to the output node nO.

Figure 15E:
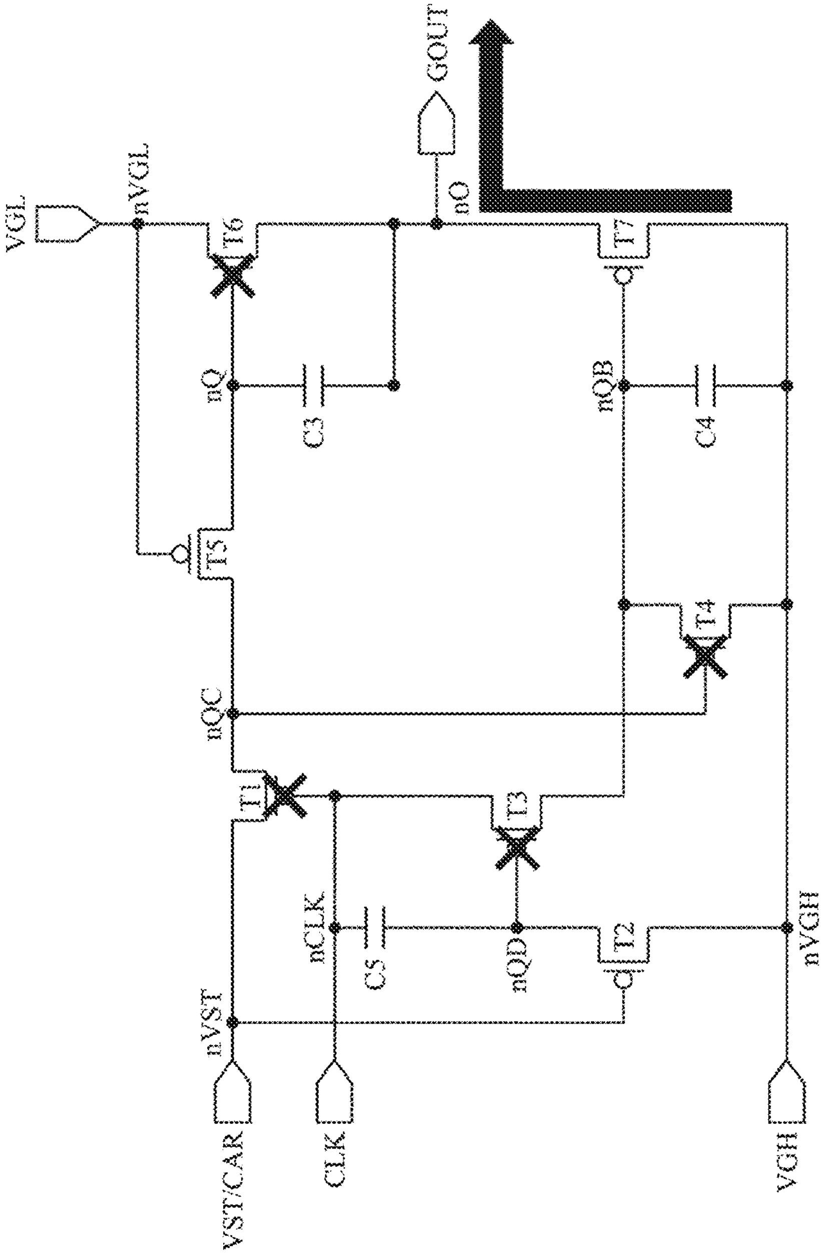

Referring to FIGS. 13, 14, and 15E, in section E, the clock signal CLK at the gate-off voltage may be input, and the start signal VST/CAR at the gate-on voltage may be input. The first transistor T1 may be turned off according to the clock signal CLK at the gate-off voltage, and the second transistor T2 may be turned on according to the start signal VST/CAR at the gate-on voltage to apply the gate-off voltage to the QD node nQD. The third transistor T3 may be turned off according to the gate-off voltage of the QD node nQD.

The QC node nQC may be in a floating state to be maintained at the gate-off voltage. The gate-off voltage at the QC node nQC may be applied to the first control node nQ through the fifth transistor T5 to maintain the sixth transistor T6 in the turned-off state.

The fourth transistor T4 may maintain the turned-off state according to the gate-off voltage of the QC node nQC. By turning off the third transistor T3, the second control node nQB may be in a floating state to be maintained at the gate-on voltage.

The seventh transistor T7 may maintain the turned-on state according to the gate-on voltage of the second control node nQB, and thus the gate signal GOUT at the gate-off voltage VGH may be output to the output node nO.

Figure 15F:
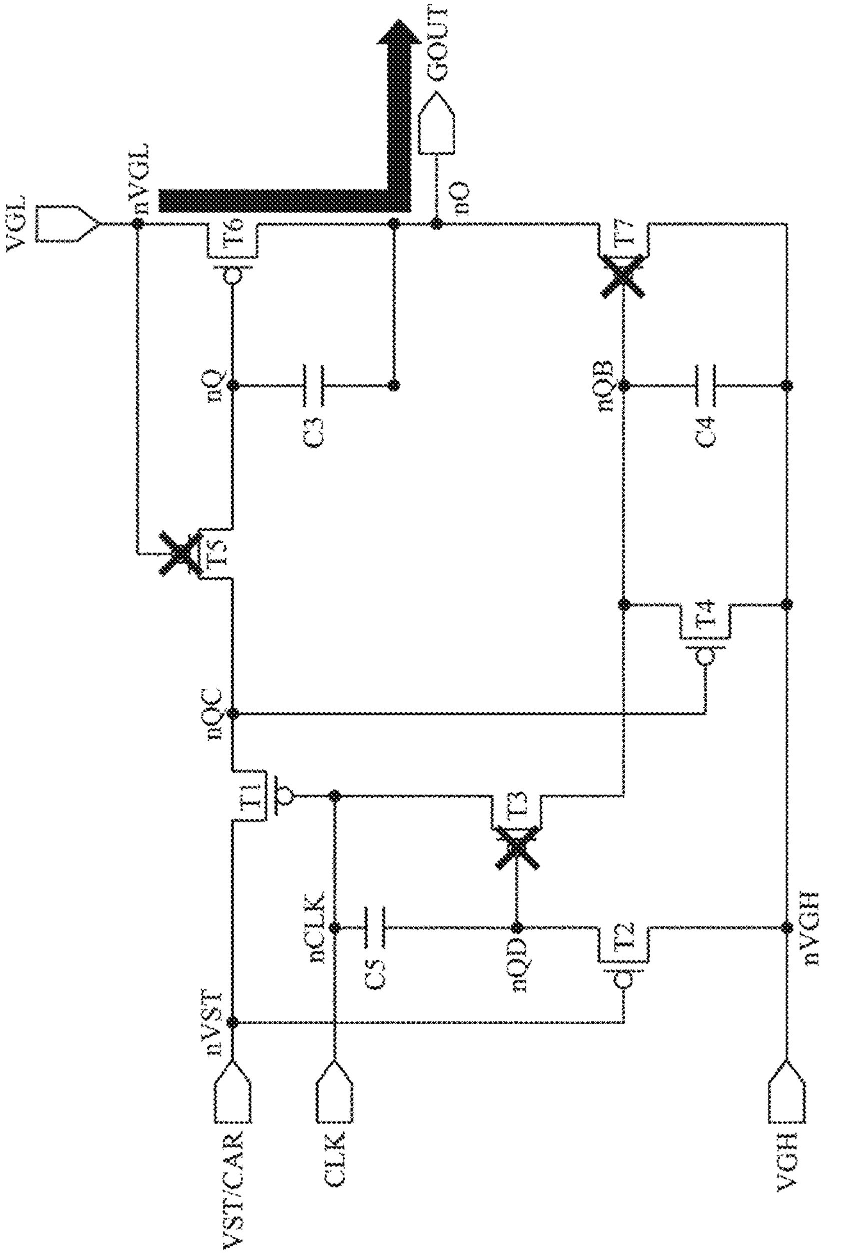

Referring to FIGS. 13, 14, and 15F, in section F, the start signal VST/CAR and the clock signal CLK at the gate-on voltage may be input for a predetermined time. The first transistor T1 may be turned on according to the clock signal CLK at the gate-on voltage to apply the start signal VST/CAR at the gate-on voltage to the QC node nQC.

The gate-on voltage at the QC node nQC may be applied to the first control node nQ through the fifth transistor T5 to turn on the sixth transistor T6. By turning on the sixth transistor T6, the gate signal GOUT at the gate-on voltage VGL may be output to the output node nO to change the potential of the output node nO from the gate-off voltage to the gate-on voltage. In this case, a change in potential of the output node nO may be reflected in the first control node nQ through the third capacitor C3, and the potential of the first control node nQ may be bootstrapped from the gate-on voltage to the boosting voltages VGL'/VEL'. When the first control node nQ is bootstrapped to the boosting voltage VGL', the potential of the output node nO may be changed to the gate-on voltage without delay or distortion. Meanwhile, when the first control node nQ is bootstrapped, no channel current flows through the fifth transistor T5, and the fifth transistor T5 may be substantially turned off.

According to the start signal VST/CAR at the gate-on voltage, the second transistor T2 may maintain the turned-on state to apply the gate-off voltage to the QD node nQD. The third transistor T3 may remain in the turned-off state according to the gate-off voltage of the QD node nQD.

The fourth transistor T4 may be turned on according to the gate-on voltage of the QC node nQC to apply the gate-off voltage to the second control node nQB. The seventh transistor T7 may be turned off according to the gate-off voltage of the second control node nQB.

Figure 16A:
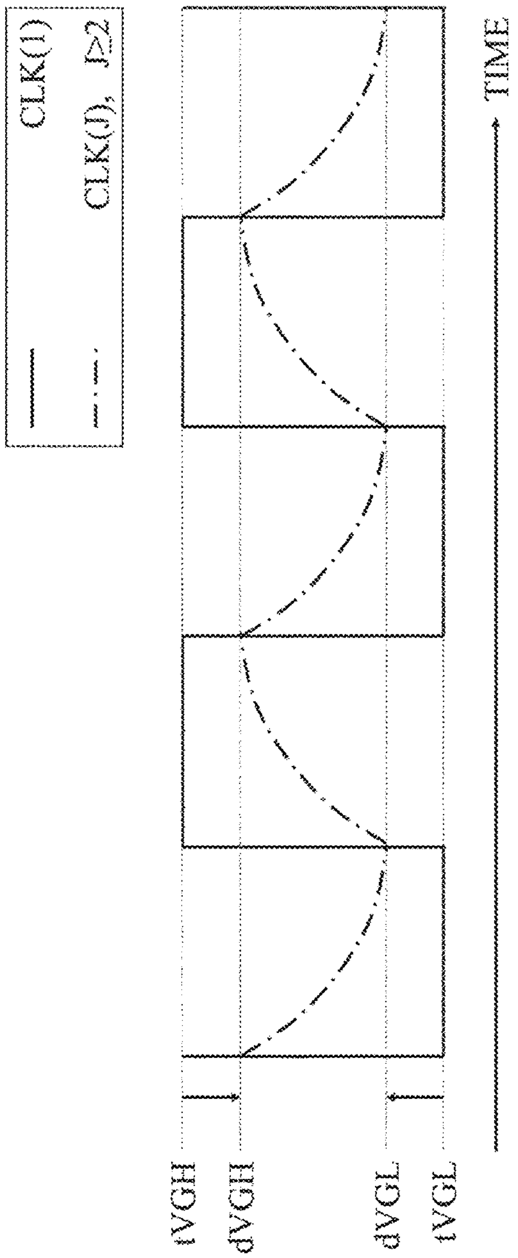
FIGS. 16A and 16B are waveform diagrams showing changes in gate-on and gate-off voltages of a clock signal supplied to a shift register.
Figure 16B:
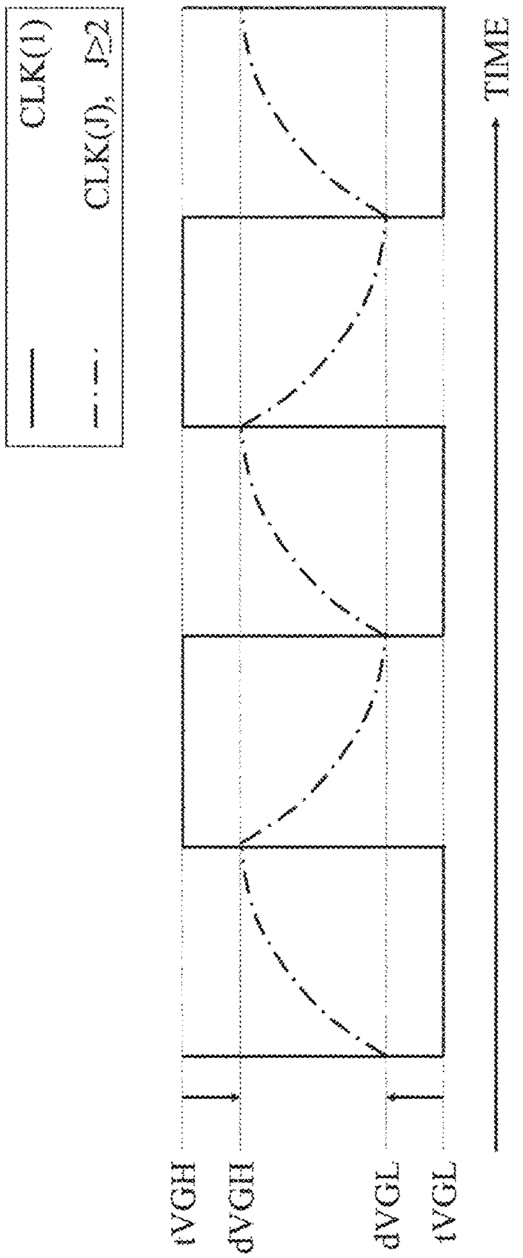

FIGS. 16A and 16B are waveform diagrams showing changes in gate-on and gate-off voltages of a clock signal supplied to a shift register.

Referring to FIGS. 16A and 16B, a first clock signal CLK(1) to be supplied to the uppermost stage (hereinafter referred to as a "first stage") of the shift register may be provided. A $J^{th}$ clock signal CLK(J) to be supplied to the second uppermost stage to an N'h stage (hereinafter referred to as "second stage to $N^{th}$ stage") of the shift register may be provided. J may be a natural number of 2 or more and N or less. The first clock signal CLK(1) and the $J^{th}$ clock signal CLK(J) are supplied through the clock lines.

The first clock signal CLK(1) may swing between a target gate high voltage tVGH and a target gate low voltage tVGL. The target gate high voltage tVGH may be in the range of 6 V to 8 V, but is not limited thereto. The target gate low voltage tVGL may be in the range of −16 V to −11 V, but is not limited thereto.

The $J^{th}$ clock signal CLK(J) is a clock signal supplied to a stage located further away from the first clock signal CLK(1), and a load received by the clock signal is relatively great. Due to an increase in the length of the clock line, an increase in the ambient temperature of the display device, an increase in the resistance of lines of the display panel, or a load due to a floating capacitance or a parasitic resistance, a clock signal at a constant gate high voltage or gate low voltage may not be supplied. RC delay and/or IR drop may occur according to differences in resistance and parasitic capacitance of the clock line.

For example, the gate-on voltage VGL of the clock may not reach the target voltage tVGL of the gate-on voltage due to a great voltage drop caused by the RC delay at a location at which the resistance and parasitic capacity of the clock line are great, and the voltage becomes higher than the target voltage. The gate-on voltage of the $J^{th}$ clock signal CLK(J) may differ from the gate-on voltage of the first clock signal CLK(1).

The gate-off voltage VGH of the clock may not reach the target voltage tVGH of the gate-off voltage due to a great voltage drop caused by the RC delay at the location at which the resistance and parasitic capacity of the clock line are great, and the voltage becomes lower than the target voltage. The gate-off voltage of the $J^{th}$ clock signal CLK(J) may differ from the gate-off voltage of the first clock signal CLK(1).

The above worsens a problem as the cause that increases the number of lines in a manner of distributing the lines in the gate driver in the display area.

The $J^{th}$ clock signal CLK(J) may swing between a drop gate high voltage dVGH and a drop gate low voltage dVGL. The drop gate high voltage dVGH may be in the range of 4 V to 6 V, but is not limited thereto. The drop gate low voltage dVGL may be in the range of −14 V to −10 V, but is not limited thereto.

Figure 17A:
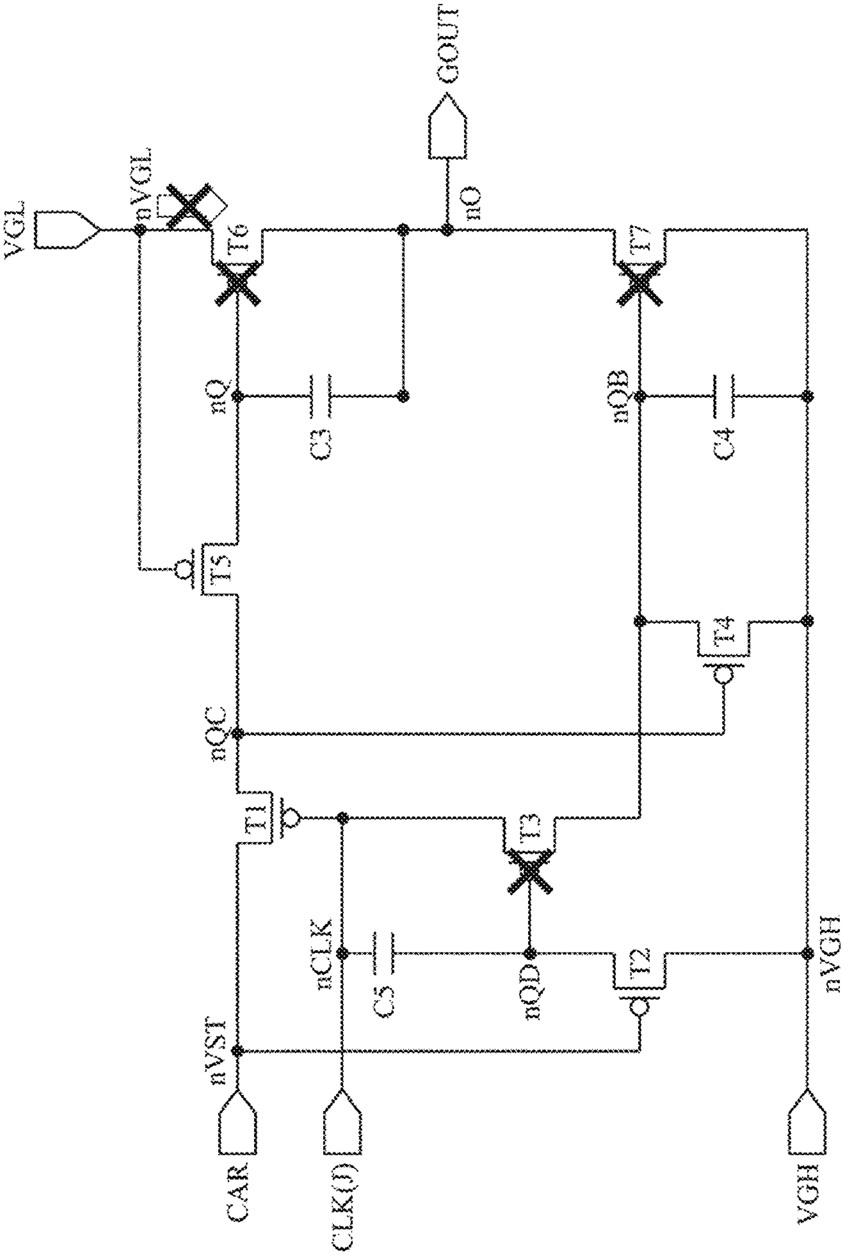
FIG. 17A is a circuit diagram showing an output abnormal operation state that occurs when a shift gate voltage is supplied to a defective stage.
Figure 17B:
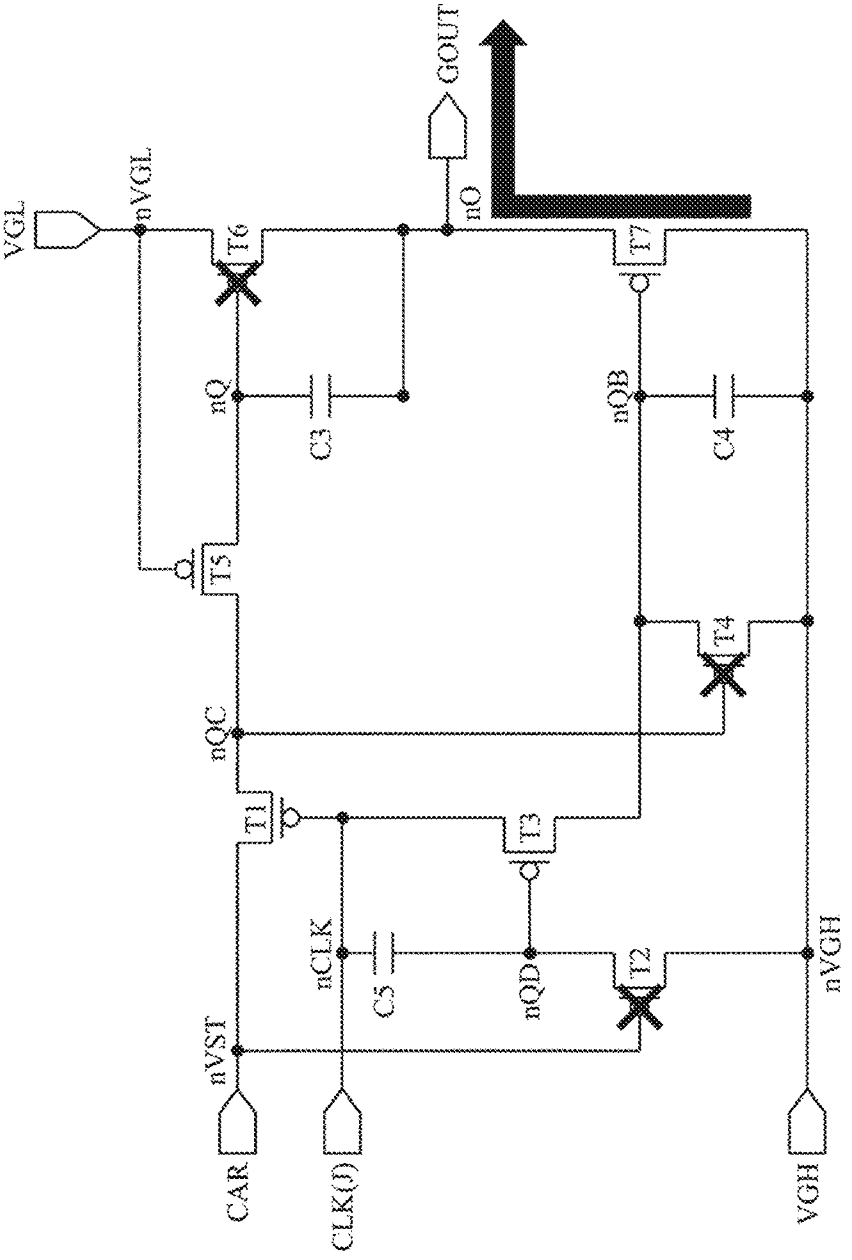
FIG. 17B is a circuit diagram showing an output abnormal operation state of a stage that receives a carry signal from the defective stage.

FIG. 17A is a circuit diagram showing an output abnormal operation state that occurs when a shift gate voltage is supplied to a defective stage. FIG. 17B is a circuit diagram showing an output abnormal operation state of a stage that receives a carry signal from the defective stage.

Referring to FIGS. 17A and 17B, as described above, in section F, the start signal VST/CAR and the clock signal CLK(J) at the gate-on voltage may be input for a predetermined time. The first transistor T1 may be turned on according to the clock signal CLK(J) at the gate-on voltage to apply the start signal VST/CAR at the gate-on voltage to the QC node nQC. A channel current may flow in the fifth transistor T5, and the fifth transistor T5 may be substantially turned on. The gate-on voltage at the QC node nQC may be applied to the first control node nQ through the fifth transistor T5 to turn on the sixth transistor T6.

As described above, when the load of the clock line increases, the VGL level of the $J^{th}$ clock signal CLK(J) supplied through the CLK node nCLK may increase. A defect in which the first control node nQ is not sufficiently charged by an increase in the VGL level of the clock signal supplied to the gate electrode of the first transistor T1 may occur. The sixth transistor T6 may be in a turned-off state. Therefore, the voltage of section E may be maintained, and the gate signal GOUT at the gate-off voltage VGH may be output to the output node nO. In this case, the gate signal GOUT of the gate-on voltage VGL may not be output to the output node nO, the potential of the output node nO does not change, and the potential of the first control node nQ is not bootstrapped.

Since the gate signal GOUT at the gate-off voltage is output from the previous stage, the start signal VST/CAR supplied to the next stage has the gate-off voltage VGH. The start signal VST/CAR at the gate-off voltage is input, and the clock signal CLK(J+1) at the gate-on voltage is input. The first transistor T1 may be turned on according to the clock signal CLK(J+1) at the gate-on voltage, and the second transistor T2 may maintain the turned-off state according to the start signal VST/CAR at the gate-off voltage. The QD node nQD may be coupled to the clock signal CLK at the gate-on voltage and changed to the gate-on voltage to turn on the third transistor T3. The start signal VST/CAR at the gate-off voltage is applied to the QC node nQC through the first transistor T1. The gate-off voltage at the QC node nQC may be applied to the first control node nQ through the fifth transistor T5 to turn off the sixth transistor T6. The fourth transistor T4 may be turned off according to the gate-off voltage at the QC node nQC, and the clock signal CLK at the gate-on voltage may be applied to the second control node nQB through the third transistor T3. Therefore, the seventh transistor T7 may be turned on according to the gate-on voltage at the second control node nQB to output the gate signal GOUT at the gate-off voltage VGH to the output node nO.

As described above, the gate signal at the gate-off voltage is output from the stages that receive the carry signal at the gate-off voltage after the defective stage.

Figure 18:
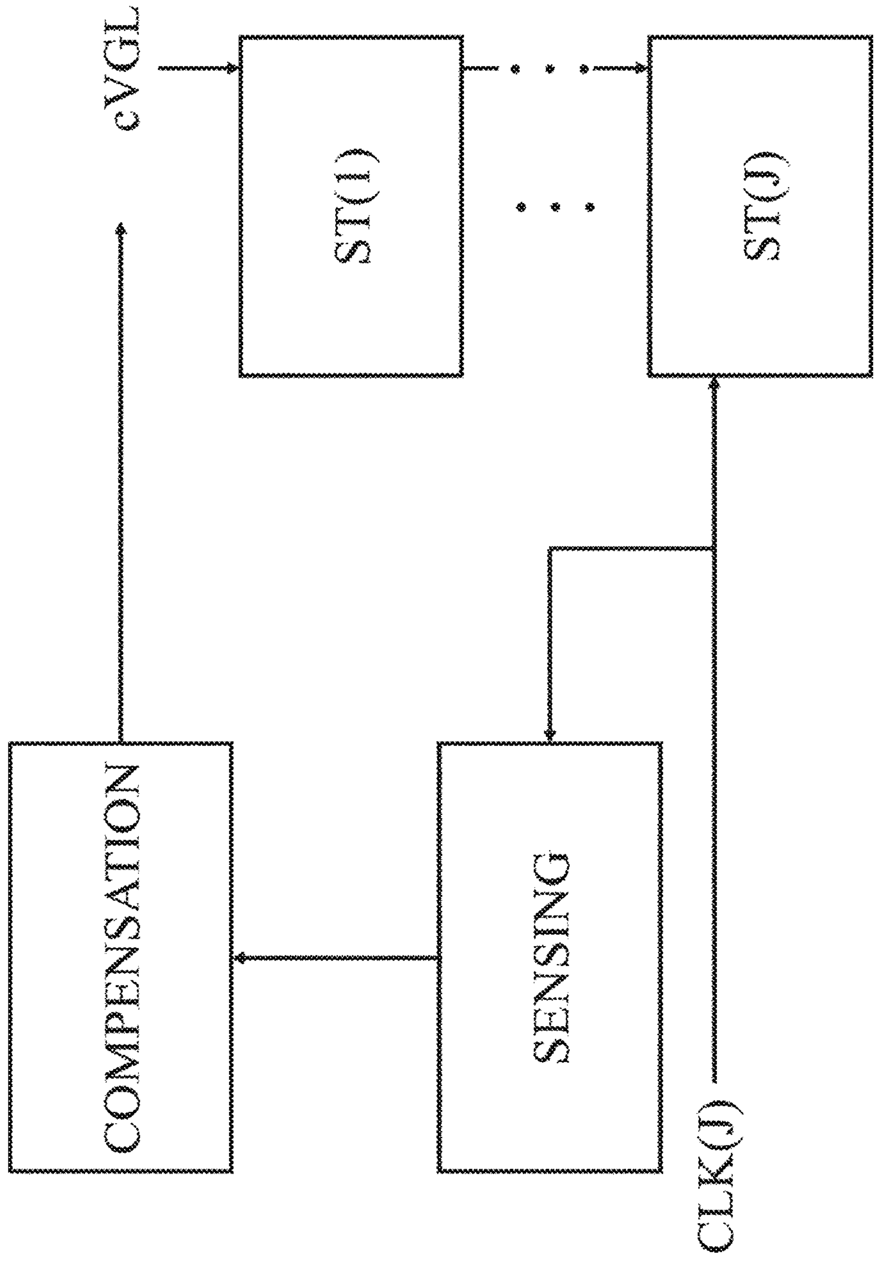
FIG. 18 is a block diagram schematically showing a display device and a gate driver according to an embodiment of the present specification.
Figure 19:
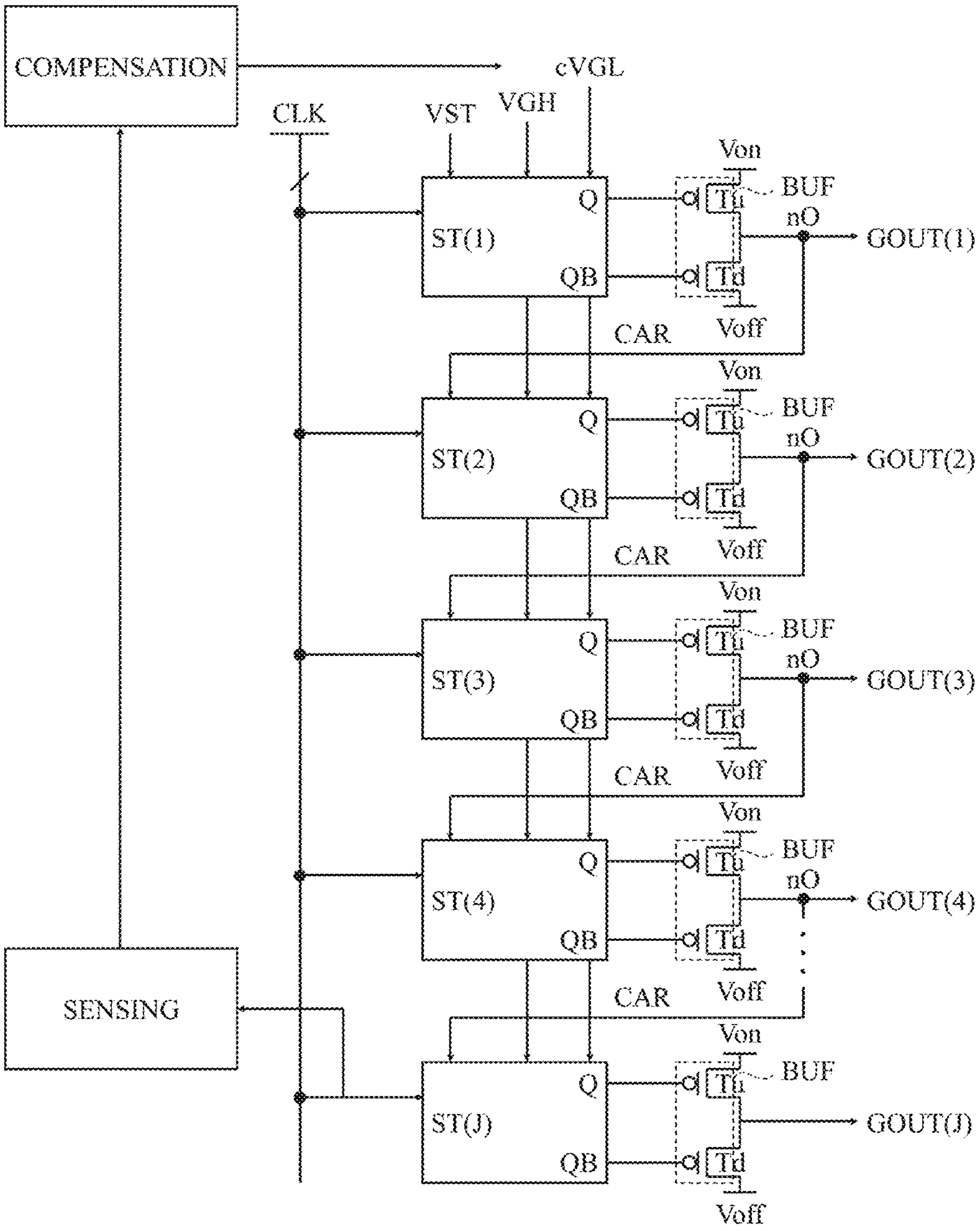
FIG. 19 is a block diagram specifically showing the display device and the gate driver according to the embodiment of the present specification.

FIG. 18 is a block diagram schematically showing a display device and a gate driver according to an embodiment of the present specification. FIG. 19 is a block diagram specifically showing the display device and the gate driver according to the embodiment of the present specification.

Referring to FIGS. 18 and 19, the gate driver may include one or more shift registers. The shift register may include a plurality of stages cascade-connected to each other through a line for the carry signal CAR to receive the clock signal through a line for the clock CLK. The plurality of stages may include a first stage ST(1) to an $N^{th}$ stage ST(N) (N is a constant that is a natural number of 2 or more). The shift register may include a $J^{th}$ stage ST(J). J is a natural number of 2 or more and N or less.

The first stage ST(1) may receive the first clock signal and the start signal VST and output a first gate signal GOUT(1) and a first carry signal CAR(1). The second stage ST(2) may receive the second clock signal and the first carry signal CAR(1) and output a second gate signal GOUT(2) and a second carry signal CAR(2). The third stage ST(3) may receive the third clock signal and the second carry signal CAR(2) and output a third gate signal GOUT(3) and a third carry signal CAR(3). The fourth stage ST(4) may receive the fourth clock signal and the third carry signal CAR(3) and output a fourth gate signal GOUT(4) and a fourth carry signal CAR(4). The $J^{th}$ stage ST(J) may receive a $J^{th}$ clock signal and a $J-1^{th}$ carry signal CAR(J−1) and output a $J^{th}$ gate signal GOUT(J) and a $J^{th}$ carry signal CAR(J). The $N^{th}$ stage ST(N) may receive an $N^{th}$ clock signal and an $N-1^{th}$ carry signal CAR(N−1) and output an $N^{th}$ gate signal GOUT (N) and an $N^{th}$ carry signal CAR(N).

Each of the stages ST(1) to ST(N) may include the CLK node to which the clock signal is input, the VST node to which the start pulse VST or the carry signal CAR from the previous stage is input, the first control node Q, the second control node QB, the output node nO, and the buffer BUF for outputting the pulses of the gate signal by charging/discharging the output node nO in response to the voltages at the control nodes Q and QB.

Each of the stages ST(1) to ST(N) may further include a VGL node to which the gate-on voltage is applied and a VGH node to which the gate-off voltage is applied. The gate-on voltage applied to the VGL node may be the first constant voltage. The gate-on voltage applied to the VGL node may be a voltage swinging between the gate high voltage and the gate low voltage. The gate-off voltage applied to the VGH node may be the second constant voltage.

The gate signal GOUT at the gate-on voltage may be output through the output node nO, which may turn on the switch elements of the pixel circuit connected to the gate driver. In an embodiment, the gate-on voltage may be in the range of −16 V to −11 V.

The first constant voltage may be applied to the VGL node, and the second constant voltage may be applied to the VGH node. A compensation first constant voltage cVGL supplied to each stage may be supplied to the gate driver through one line. The second constant voltage VGH supplied to each of the stage ST(1) to ST(N) may be supplied to the gate driver through one line.

The compensation first constant voltage cVGL may be applied to the gate driver in real time through one line. The compensation first constant voltage cVGL may be a gate-on voltage applied to the VGL node when the gate-on voltage of the clock signal input to at least one of the second stage to the $N^{th}$ stage ST(2) to ST(N) differs from the gate-on voltage applied from the clock generation circuit. The compensation first constant voltage cVGL may be the gate-on voltage applied to the VGL node when the gate-on voltage of the clock signal input to the $J^{th}$ stage ST(J) differs from the gate-on voltage applied from the clock generation circuit.

The clock generation circuit may include the above-described level shifter.

In one exemplary embodiment, the $J^{th}$ stage ST(J) may be the $N^{th}$ stage ST(N), which is the last stage of the corresponding gate driver. Since the same defect occurs in all subsequent stages even when a defect occurs in any one of the second to $N-1^{th}$ stages, the gate-on voltages of the entirety of the gate driver may be compensated even when a clock signal supplied to the last stage having the greatest load of the line for the clock CLK is sensed. In addition, since the gate-on voltage is applied to the overall gate driver through one line, the gate-on voltages of the entirety of the gate driver may be compensated even when the clock signal supplied to the last stage having the greatest load of the line for the clock CLK is sensed.

The gate driver according to the present specification may change the voltage level of the gate-on voltage applied to the gate-on voltage node when the gate-on voltage of the $J^{th}$ clock signal CLK(J) differs from the gate-on voltage of the first clock signal. The compensation first constant voltage cVGL may be a gate-one voltage applied to the VGL node when the gate-on voltage of the clock signal input to at least one of the second stage to the $N^{th}$ stage ST(2) to ST(N) differs from the gate-on voltage applied from the clock generation circuit. The compensation gate-on voltage cVGL may be the gate-on voltage applied to the VGL node when the gate-on voltage of the clock signal input to the $J^{th}$ stage ST(J) differs from the gate-on voltage applied from the clock generation circuit.

The gate driver according to the present specification may compensate a change in gate-on voltage of the clock signal due to RC delay and/or IR drop that occur due to an increase in the lengths and number of lines. Even when the gate-on voltage of the $J^{th}$ clock signal CLK(J) differs from the gate-on voltage of the first clock signal, the gate-source voltage of the sixth transistor may be maintained at the previous voltage. Even when the gate-on voltage of the $J^{th}$ clock signal CLK(J) differs from the gate-on voltage of the first clock signal, the gate-source voltage of the sixth transistor may be substantially constant.

When the gate-on voltage of the $J^{th}$ clock signal CLK(J) is higher than the gate-on voltage of the first clock signal, the voltage level of the gate-on voltage applied to the gate-on voltage node may increase. The compensation gate-on voltage cVGL may be a gate-on voltage with an increased voltage level when the gate-on voltage of the clock signal input to the $J^{th}$ stage ST(J) is higher than the gate-on voltage applied from the clock generation circuit.

The display device according to the present specification may include a sensing unit SENSING for sensing the $J^{th}$ clock signal input to the $J^{th}$ stage ST(J). The display device according to the present specification may include a compensation unit COMPENSATION for comparing the sensed $J^{th}$ clock signal with the gate-on voltage applied from the clock generation circuit and applying the compensation gate-on voltage cVGL to which the difference value is reflected and added to the gate driver. The compensation gate-on voltage cVGL may be the first constant voltage. The compensation gate-on voltage cVGL may be a voltage swinging between the gate high voltage and the gate low voltage. When the compensation gate-on voltage cVGL is the first constant voltage, an appropriate value of the compensation first constant voltage may be in the range of −12V to −8V, but is not limited thereto.

Figure 20:
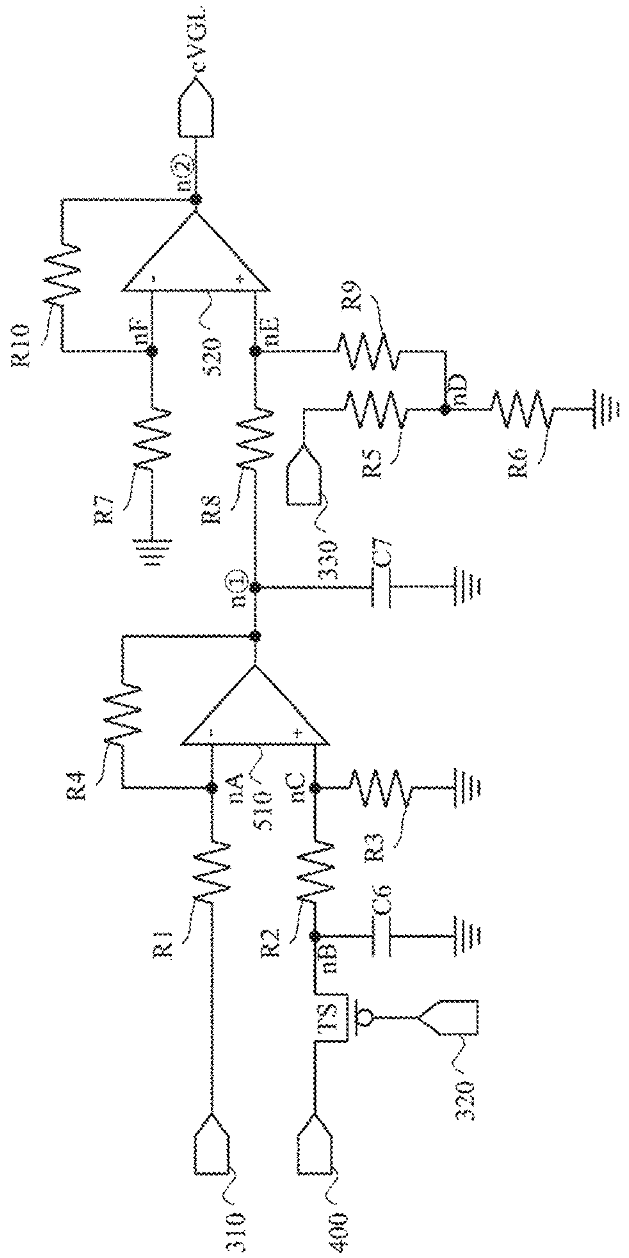
FIG. 20 is a circuit diagram specifically showing a sensing unit and a compensation unit according to the embodiment of the present specification.

FIG. 20 is a circuit diagram specifically showing a sensing unit and a compensation unit according to the embodiment of the present specification.

Referring to FIG. 20, the sensing unit and the compensation unit may include 1-1, 1-2, and 1-3 gate-on voltage input terminals 310, 320, and 330, a second gate-on voltage input terminal 400, a first differential amplifier 510, a second differential amplifier 520, a compensation first constant voltage output terminal cVGL, a sensing transistor TS, a plurality of resistors R1 to R10, and a plurality of ground terminals. A ground voltage applied to the ground terminal may be 0 V.

The 1-1 and 1-3 gate-on voltages in which an increase and/or decrease according to various factors are not reflected may be input from the power supply unit to the 1-1 and 1-3 gate-on voltage input terminals 310 and 330. The 1-1 and 1-3 gate-on voltages may be substantially the same value.

The 1-2 gate-on voltage may be input from the clock generation circuit to the 1-2 gate-on voltage input terminal 320. A second gate-on voltage changed by the above-described causes, problems, etc., may be input to the second gate-on voltage input terminal 400 from the $J^{th}$ stage.

The first and second differential amplifiers 510 and 520 may each include a non-inverting input terminal (+), an inverting input terminal (−), and an output terminal.

The 1-1 gate-on voltage input terminal 310 may be connected to the inverting input terminal (−) of the first differential amplifier 510. A first resistor R1 may be disposed between the inverting input terminal (−) of the first differential amplifier 510 and the 1-1 gate-on voltage input terminal 310.

A gate electrode of the sensing transistor TS may be connected to the 1-2 gate-on voltage input terminals 320. First and second electrodes of the sensing transistor TS may be connected to the second gate-on voltage input terminal 400 and the non-inverting input terminal (+) of the first differential amplifier 510, respectively. A second resistor R2 may be disposed between the sensing transistor TS and the non-inverting input terminal (+) of the first differential amplifier 510. A sixth capacitor C6 may be connected to a B node nB between the sensing transistor TS and the second resistor R2. The sixth capacitor C6 may be connected to a ground terminal. A third resistor R3 may be disposed at a C node nC between the non-inverting input terminal (+) of the first differential amplifier 510 and the second resistor R2. The third resistor R3 may be connected to the ground terminal.

A fourth resistor R4 may be disposed between an A node nA between the inverting input terminal (−) of the first differential amplifier 510 and the first resistor R1 and an output terminal of the first differential amplifier 510.

The output terminal of the first differential amplifier 510 may be connected to the non-inverting input terminal (+) of the second differential amplifier 520. An eighth resistor R8 may be disposed between the output terminal of the first differential amplifier 510 and the non-inverting input terminal (+) of the second differential amplifier 520. The seventh capacitor C7 may be connected to a ① node n① between the output terminal of the first differential amplifier 510 and the eighth resistor R8. The seventh capacitor C7 may be connected to the ground terminal. A ninth resistor R9, a fifth resistor R5, and a 1-3 gate-on input terminal 330 may be connected in series to an E node nE between the non-inverting input terminal (+) of the second differential amplifier and the eighth resistor R8. A sixth resistor may be connected to a D node nD between the ninth resistor R9 and the fifth resistor R5. The sixth resistor may be connected to the ground terminal.

The inverting input terminal (−) of the second differential amplifier may be connected to the ground terminal with the seventh resistor R7 interposed therebetween. The output terminal of the second differential amplifier 520 may be connected to the compensation first constant voltage output terminal cVGL. A tenth resistor R10 may be disposed between an F node nF between the inverting input terminal (−) of the second differential amplifier 520 and the seventh resistor R7 and a ② node n② between the output terminal of the second differential amplifier 520 and the compensation first constant voltage output terminal cVGL.

The first differential amplifier 510 may perform a function of subtracting a voltage input from the 1-1 gate-on voltage input terminal 310 and a voltage input from the second gate-on voltage input terminal 400. The first differential amplifier 510 may compare the voltages and output a value obtained by subtracting the two voltages. The second differential amplifier 520 may perform a function of adding an appropriate value derived from the value output from the first differential amplifier 510 and an appropriate value derived from the voltage input from the 1-3 gate-on voltage input terminal 330. The second differential amplifier 520 may add the values and output an appropriate compensation first constant voltage cVGL value.

The relationship therebetween can be represented by the following relationship:

Magnitude of first resistor=magnitude of second resistor=magnitude of third resistor=magnitude of fourth resistor [Relationship equation 1]

Potential of B node=second gate-on voltage [Relationship equation 2]

Potential of C node=potential of A node=½×second gate-on voltage [Relationship equation 3]

gate-on voltage−b½×second gate-on voltage=½×second gate-on voltage−potential of ①node [Relationship equation 4]

Potential of node=1-1gate-on voltage−second gate-on voltage [Relationship equation 5]

Magnitude of the seventh resistor=magnitude of the eighth resistor=magnitude of the ninth resistor=magnitude of the tenth resistor [Relationship equation 6]

When k=magnitude of the sixth resistor/(magnitude of the fifth resistor+magnitude of the sixth resistor),potential of D node=k×1-3gate-on voltage [Relationship equation 7]

When k=magnitude of the sixth resistor/(magnitude of the fifth resistor+magnitude of the sixth resistor),potential of E node=potential of F node=½×(k×1-3gate-on voltage+potential of ①node) [Relationship equation 8]

When k=magnitude of the sixth resistor/(magnitude of the fifth resistor+magnitude of the sixth resistor),(0−½×(k×1-3gate-on voltage+potential of node))=(½×(k×1-3gate-on voltage+potential of ①node)−potential of ②node) [Relationship equation 9]

Potential of node=k×1-3gate-on voltage+potential of ①node. [Relationship equation 10]

In relationship equations 1 to 10, the magnitudes of the first to tenth resistors represent the magnitude of the first resistor R1, the magnitude of the second resistor R2, the magnitude of the third resistor R3, the magnitude of the fourth resistor R4, the magnitude of the fifth resistor R5, the magnitude of the sixth resistor R6, the magnitude of the seventh resistor R7, the magnitude of the eighth resistor R8, the magnitude of the ninth resistor R9, and the magnitude of the tenth resistor R10. k denotes a parameter for organizing the relationship equation.

Figure 21:
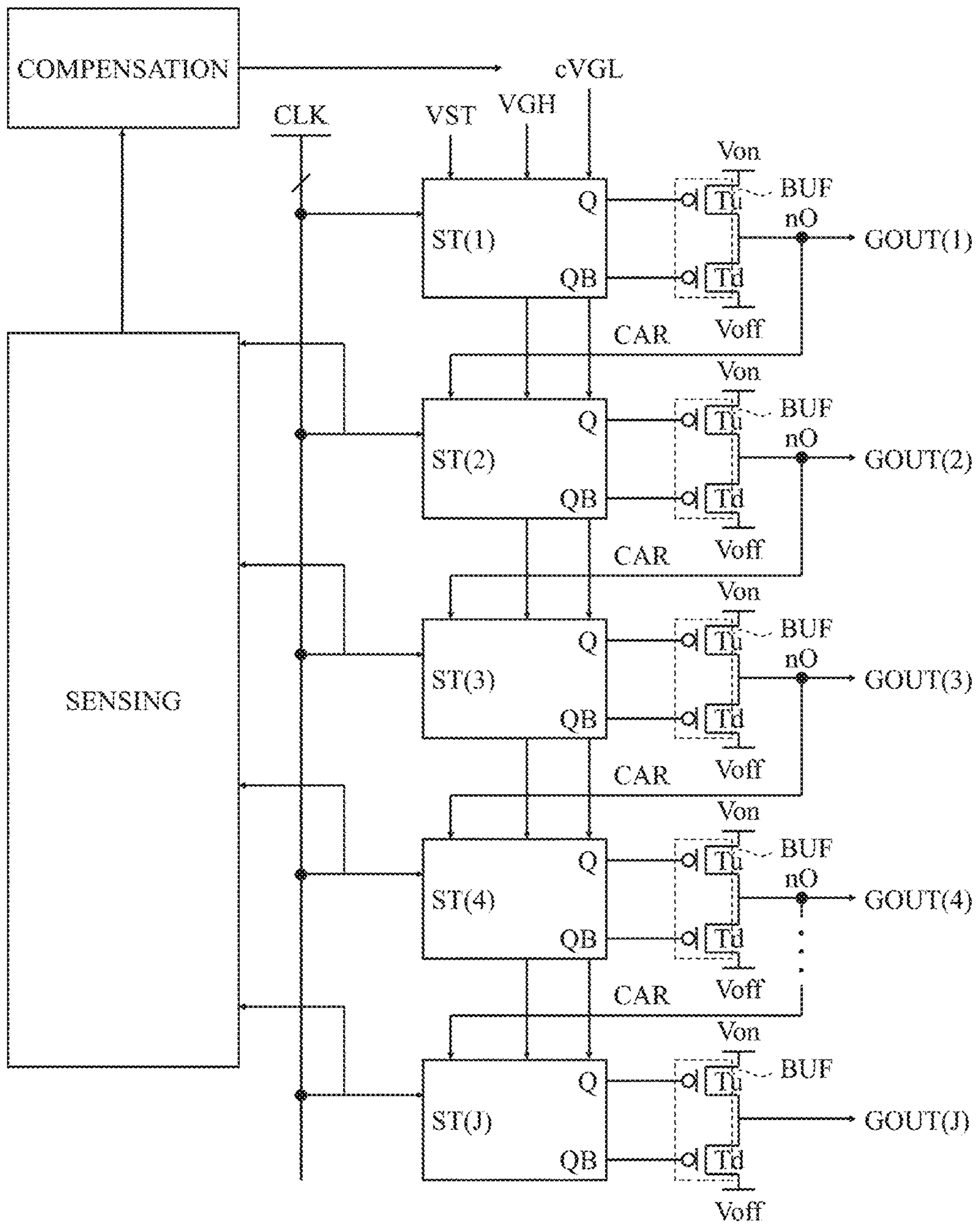
FIG. 21 is a block diagram specifically showing a display device and a gate driver according to another embodiment of the present specification.

FIG. 21 is a block diagram specifically showing a display device and a gate driver according to another embodiment of the present specification. Components that perform substantially the same function between embodiments are denoted by the same reference numerals, and overlapping descriptions thereof will be omitted.

Referring to FIG. 21, the first constant voltage cVGL in which a difference between the gate-on voltage of the clock signal input to at least two or more among the second to Ni stages ST(2) to ST(N) and the gate-on voltage applied from the power supply unit is reflected may be applied to the gate driver in real time through one line.

The gate driver according to the present specification may compensate a change in gate-on voltage due to RC delay and/or IR drop that occur due to an increase in the lengths and number of lines. The display device according to the present specification may include the sensing unit SENSING for sensing the gate-on voltage of the clock signal input to two or more among the second to $N^{th}$ stages ST(2) to ST(N). The display device according to the present specification may include the compensation unit COMPENSATION for comparing the sensed clock signals with the gate-on voltage applied from the power supply unit and applying the compensation gate-on voltage cVGL to which the difference value is reflected and added to the gate driver. The compensation gate-on voltage cVGL may be the first constant voltage. The compensation gate-on voltage cVGL may be a voltage swinging between the gate high voltage and the gate low voltage. When the compensation gate-on voltage cVGL is the first constant voltage, an appropriate value of the compensation first constant voltage may be in the range of −12V to −8V, but is not limited thereto.

Figure 22:
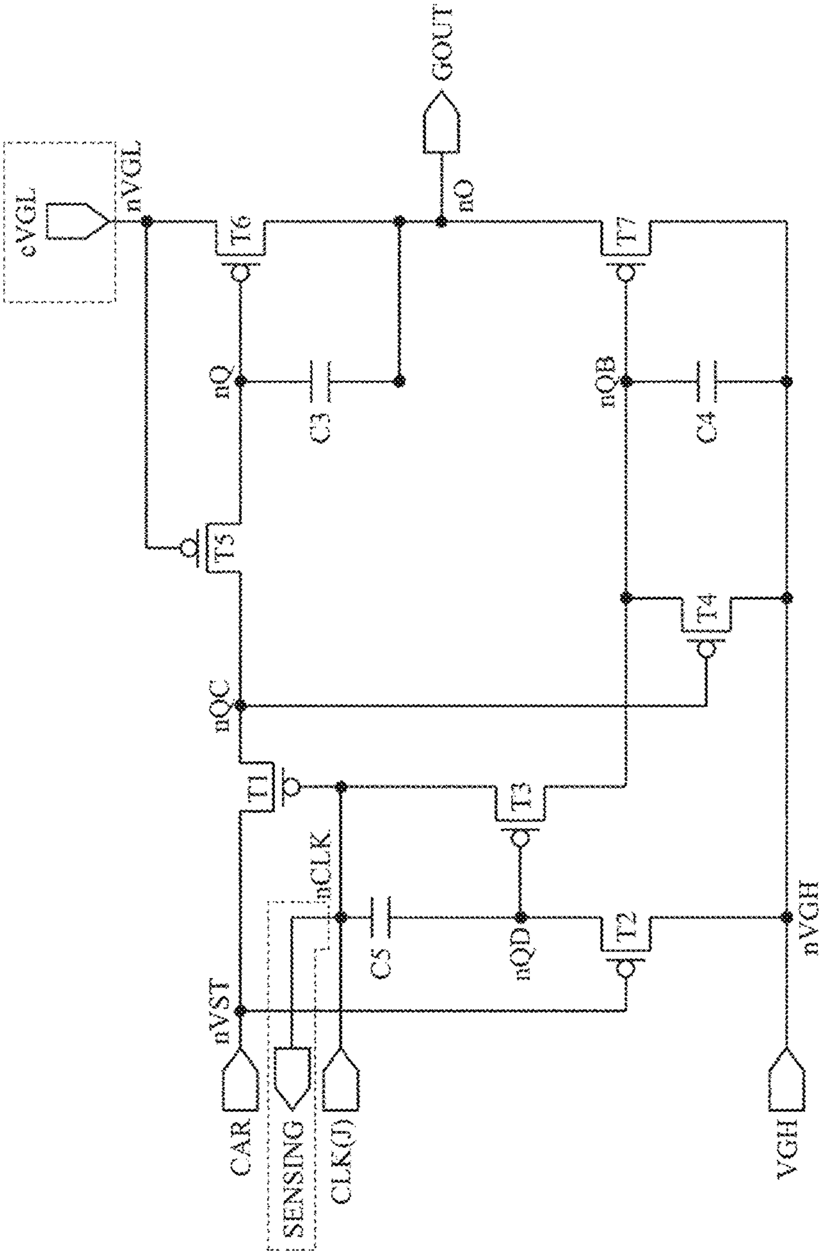
FIG. 22 is a one-stage circuit included in a gate driver according to a first embodiment of the present specification.

FIG. 22 is a one-stage circuit included in a gate driver according to a first embodiment of the present specification. Components that perform substantially the same function as the above-described embodiments are denoted by the same reference numerals, and overlapping descriptions thereof will be omitted.

Referring to FIG. 22, the stage circuit includes the CLK node nCLK to which the $J^{th}$ clock signal CLK(J) is input, the VST node nVST to which the carry signal CAR from the previous stage is input, and the VGL node nVGL to which the gate-on voltage cVGL is applied. In one shift register including the first to $N^{th}$ stages, J is a positive integer of 2 or more and N or less.

In the gate driver according to the first embodiment of the present specification, a difference between the gate-on voltage of the clock signal input to at least one of the second to $N^{th}$ stages and the gate-on voltage applied from the power supply unit may be reflected, and the reflected value may be applied to the gate driver in real time through one line. The sensing unit may be electrically connected to the CLK node nCLK to receive the $J^{th}$ clock signal CLK(J) having the gate-on voltage changed by the above-described causes and problems. The gate-on voltage cVGL compensated by the compensation unit based on the voltage sensed by the sensing unit may be supplied to the VGL node nVGL.

Figure 23:
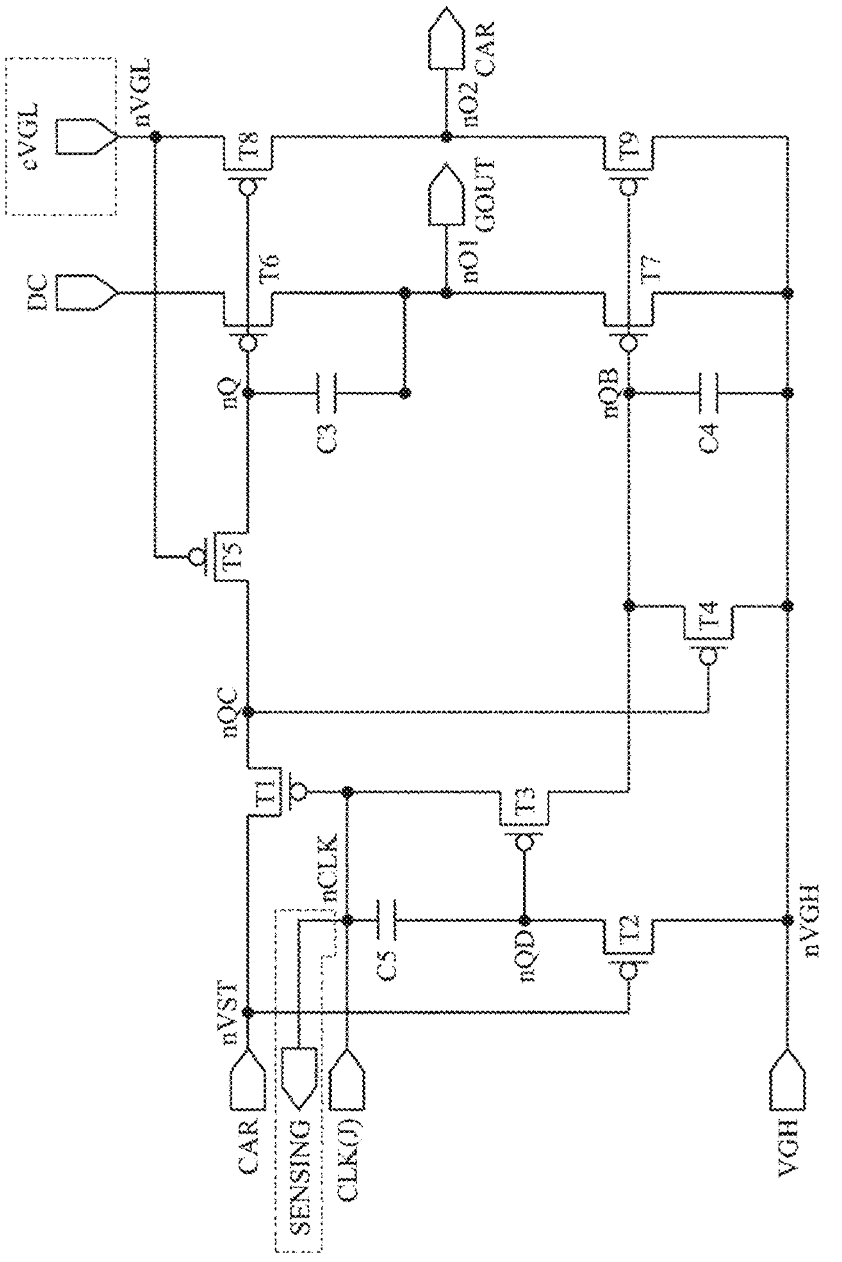
FIG. 23 is a one-stage circuit included in a gate driver according to a second embodiment of the present specification.

FIG. 23 is a one-stage circuit included in a gate driver according to a second embodiment of the present specification. The second embodiment differs from the first embodiment in the number of transistors, locations at which the compensation gate-on voltage is applied, and signals input to the transistor. Components that perform substantially the same function as the above-described embodiments are denoted by the same reference numerals, and overlapping descriptions thereof will be omitted.

Referring to FIG. 23, the stage circuit may include a sixth transistor T6, a seventh transistor T7, an eighth transistor T8, a ninth transistor T9, and nodes connecting the transistors.

The stage circuit may include the CLK node nCLK to which the $J^{th}$ clock signal CLK(J) is input, the VST node nVST to which the carry signal CAR from the previous stage is input, the VGL node nVGL to which the compensation gate-on voltage cVGL is applied, the first output node nO1 through which the pulses of the gate signal GOUT are output, and the second output node nO2 through which the pulses of the carry signal CAR are output. In one shift register including the first to $N^{th}$ stages, J is a positive integer of 2 or more and N or less.

The output unit may include the sixth transistor T6 and the eighth transistor T8 that are pull-down elements, the seventh transistor T7 and the ninth transistor T9 that are pull-up elements, and the third capacitor C3.

The sixth transistor T6 may supply the gate signal GOUT at the gate-on voltage VGL to the first output node nO1 from when the first control node nQ is bootstrapped in synchronization with the activated timing of the QC node nQC. The gate electrode of the sixth transistor T6 may be connected to the first control node nQ, and the first and second electrodes of the sixth transistor T6 may be connected to the DC voltage input terminal DC and the first output node nO1, respectively. The gate-on voltage may be input from the power supply unit to the DC voltage input terminal DC. The gate-on voltage may be in the range of −16 V to −11 V, but is not limited thereto.

The gate electrode of the eighth transistor T8 may be connected to the first control node nQ, and the first and second electrodes of the eighth transistor T8 may be connected to the VGL node nVGL and the second output node nO2 respectively. The eighth transistor T8 may be disposed between the VGL node nVGL and the second output node nO2.

The third capacitor C3 may be connected between the first control node nQ and the first output node nO1. The third capacitor C3 serves to bootstrap the first control node nQ by reflecting a change in potential of the first output node nO1 to the potential of the first control node nQ when the gate signal GOUT changes from the gate-off voltage to the gate-on voltage.

The seventh transistor T7 may supply the gate signal GOUT at the gate-off voltage VGH to the output node nO1 from while the second control node nQB is activated. The gate electrode of the seventh transistor T7 may be connected to the second control node nQB, and the first and second electrodes of the seventh transistor T7 may be connected to the first output node nO1 and the VGH node nVGH, respectively.

The ninth transistor T9 may supply the gate signal GOUT at the gate-off voltage VGH to the second output node nO2 while the second control node nQB is activated. The gate electrode of the ninth transistor T9 may be connected to the second control node nQB, and the first and second electrodes of the ninth transistor T9 may be connected to the second output node nO2 and the VGH node nVGH, respectively. The ninth transistor T9 may be disposed between the VGH node nVGH and the second output node nO2.

The first stabilization unit may include a fifth transistor T5. A gate electrode of the fifth transistor T5 may be connected to the VGL node nVGL, and first and second electrodes of the fifth transistor T5 may be connected to the QC node nQC and the first control node nQ, respectively. The channel current between the first and second electrodes of the fifth transistor T5 may become zero when the first control node nQ is bootstrapped. The fifth transistor T5 may be turned off when the first control node nQ is bootstrapped, thereby blocking the electrical connection between the QC node nQC and the first control node nQ. While the first control node nQ is not bootstrapped, the fifth transistor T5 may maintain the turned-on state.

In the gate driver according to the second embodiment of the present specification, a difference between the gate-on voltage of the clock signal input to at least one of the second to Ni stages and the gate-on voltage applied from the power supply unit may be reflected, and the reflected value may be applied to the gate driver in real time through one line. The sensing unit may be electrically connected to the CLK node nCLK to receive the $J^{th}$ clock signal CLK(J) having the gate-on voltage changed by the above-described causes and problems. The gate-on voltage cVGL compensated by the compensation unit based on the voltage sensed by the sensing unit may be supplied to the VGL node nVGL.

Figure 24:
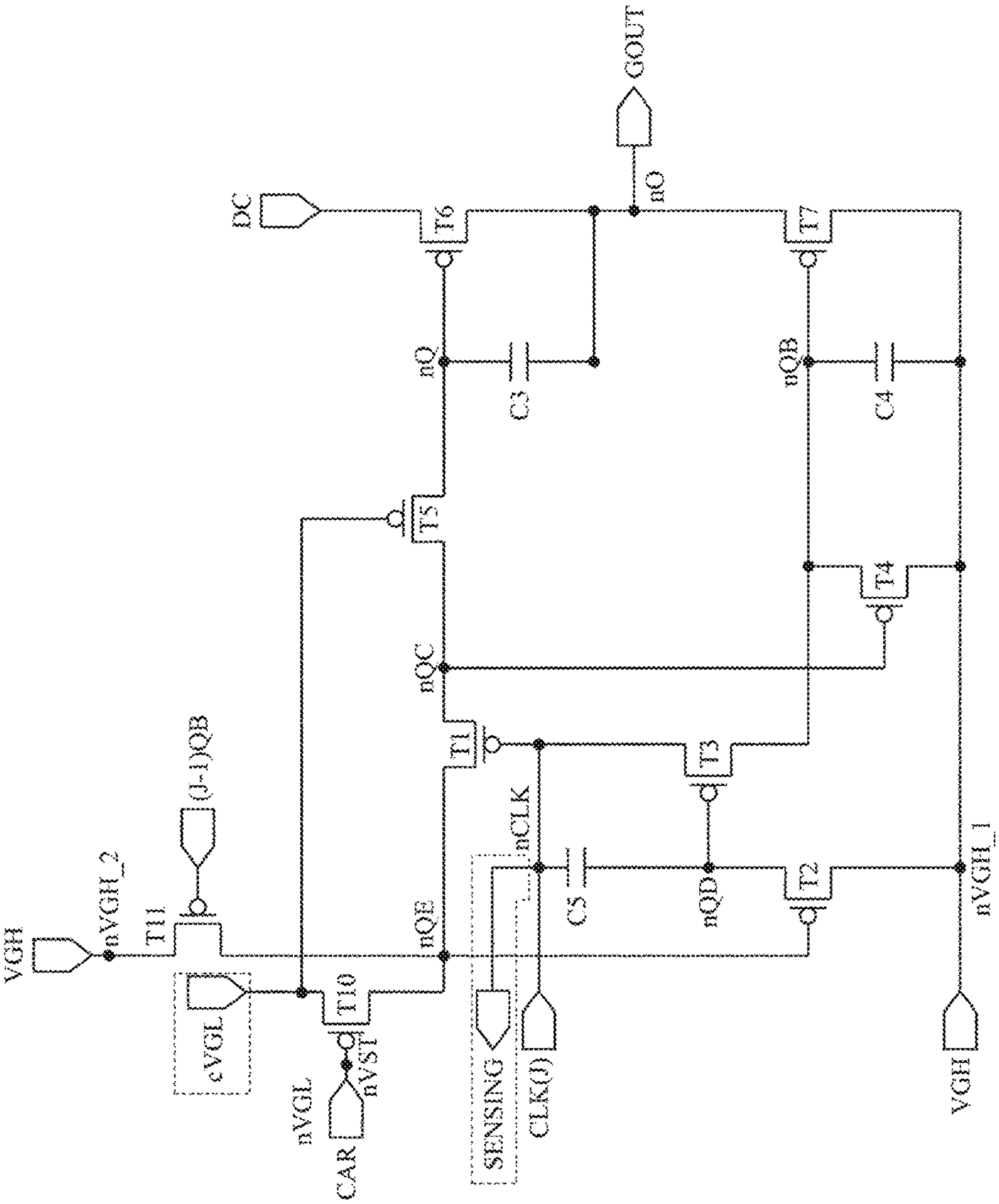
FIG. 24 is a one-stage circuit included in a gate driver according to a third embodiment of the present specification.

FIG. 24 is a one-stage circuit included in a gate driver according to a third embodiment of the present specification. The third embodiment differs from the above-described embodiments in the number of transistors, locations at which the compensation gate-on voltage is applied, and signals input to the transistor. Components that perform substantially the same function as the above-described embodiments are denoted by the same reference numerals, and overlapping descriptions thereof will be omitted.

Referring to FIG. 24, the stage circuit may include a first transistor T1, a second transistor T2, a sixth transistor T6, a tenth transistor T10, an eleventh transistor T11, and nodes connecting the transistors.

The stage circuit may include the CLK node nCLK to which the $J^{th}$ clock signal CLK(J) is input, the VST node nVST to which the carry signal CAR from the previous stage is input, a QE node nQE to which the compensation gate-on voltage cVGL or the second gate-off voltage VGH is applied according to the carry signal CAR and/or a QB node signal (J−1)QB of the previous stage, the VGL node nVGL to which the compensation gate-on voltage cVGL is applied, a first VGH node nVGH_1 to which the first gate-off voltage VGH is applied, and a second VGH node nVGH_2 to which the second gate-off voltage VGH is applied. In one shift register including the first to $N^{th}$ stages, J is a positive integer of 2 or more and N or less.

The Q control unit may include a first transistor T1. The first transistor T1 may activate the QC node nQC by applying the compensation gate-on voltage cVGL or the second gate-off voltage VGH to the QC node nQC according to the $J^{th}$ clock signal CLK(J). The gate electrode of the first transistor T1 may be connected to the CLK node nCLK, and the first and second electrodes of the first transistor T1 may be connected to the QE node nQE and the QC node nQC, respectively.

The QB control unit may activate the second control node nQB opposite to the QC node nQC according to potentials of the clock signal CLK, the start signal VST/CAR, and the QC node nQC. The QB control unit may include a fifth capacitor C5, a second transistor T2, a third transistor T3, a fourth transistor T4, and a fourth capacitor C4.

The fifth capacitor C5 may be connected between the CLK node nCLK and the QD node nQD. The third transistor T3 may supply the clock signal CLK to the second control node nQB according to the potential of the QD node nQD. A gate electrode of the third transistor T3 may be connected to the QD node nQD, and first and second electrodes of the third transistor T3 may be connected to the CLK node nCLK and the second control node nQB, respectively.

The second transistor T2 may supply the gate-off voltage to the QD node nQD according to the compensation gate-on voltage cVGL or the second gate-off voltage VGH. The gate electrode of the second transistor T2 may be connected to the QE node nQE, and the first and second electrodes of the second transistor T2 may be connected to the QD node nQD and the first VGH node nVGH_1, respectively. The potential of the QD node nQD may be synchronized to the clock signal CLK while the QE node nQE be maintained at the gate-off voltage. The potential of the QD node nQD may become the gate-off voltage while the QE node nQE is maintained at the compensation gate-on voltage cVGL.

The fourth transistor T4 may supply the gate-off voltage to the second control node nQB according to the potential of the QC node nQC. The gate electrode of the fourth transistor T4 may be connected to the QC node nQC, and the first and second electrodes of the fourth transistor T4 may be connected to the second control node nQB and the VGH node nVGH, respectively.

The fourth capacitor C4 may be connected between the second control node nQB and the VGH node nVGH to stabilize a potential of the second control node nQB.

The output unit may include the sixth transistor T6, which is the pull-down element, the seventh transistor T7, which is the pull-up element, and the third capacitor C3.

The sixth transistor T6 may supply the gate signal GOUT at the gate-on voltage VGL to the output node nO from when the first control node nQ is bootstrapped in synchronization with the activated timing of the QC node nQC. The gate electrode of the sixth transistor T6 may be connected to the first control node nQ, and the first and second electrodes of the sixth transistor T6 may be connected to the DC voltage input terminal DC and the output node nO, respectively. The gate-on voltage may be input from the power supply unit to the DC voltage input terminal DC. The gate-on voltage may be in the range of −16 V to −11 V, but is not limited thereto.

The third capacitor C3 may be connected between the first control node nQ and the output node nO. The third capacitor C3 serves to bootstrap the first control node nQ by reflecting a change in potential of the output node nO to the potential of the first control node nQ when the gate signal GOUT changes from the gate-off voltage to the gate-on voltage.

The seventh transistor T7 may supply the gate signal GOUT of the gate-off voltage VGH to the output node nO from while the second control node nQB is activated. The gate electrode of the seventh transistor T7 may be connected to the second control node nQB, and the first and second electrodes of the seventh transistor T7 may be connected to the output node nO and the first VGH node nVGH_1, respectively.

The first stabilization unit may include a fifth transistor T5. The gate electrode of the fifth transistor T5 may be connected to the VGL node nVGL, and first and second electrodes of the fifth transistor T5 may be connected to the QC node nQC and the first control node nQ, respectively. The channel current between the first and second electrodes of the fifth transistor T5 may become zero when the first control node nQ is bootstrapped. The fifth transistor T5 may be turned off when the first control node nQ is bootstrapped, thereby blocking the electrical connection between the QC node nQC and the first control node nQ. While the first control node nQ is not bootstrapped, the fifth transistor T5 may maintain the turned-on state.

The gate electrode of the tenth transistor T10 may be connected to the VST node nVST, and the first and second electrodes of the tenth transistor T10 may be connected to the VGL node nVGL and the QE node nQE, respectively.

The gate electrode of the eleventh transistor T11 may be connected to the QB node signal input terminal (J−1)QB of the previous stage, and the first and second electrodes of the eleventh transistor T11 may be connected to the second VGH node nVGH_2 and the QE node nQE, respectively.

In the gate driver according to the third embodiment of the present specification, a difference between the gate-on voltage of the clock signal input to at least one of the second to Ni stages and the gate-on voltage applied from the power supply unit may be reflected, and the reflected value may be applied to the gate driver in real time through one line. The sensing unit may be electrically connected to the CLK node nCLK to receive the $J^{th}$ clock signal CLK(J) having the gate-on voltage changed by the above-described causes and problems. The gate-on voltage cVGL compensated by the compensation unit based on the voltage sensed by the sensing unit may be supplied to the VGL node nVGL.

Figure 25:
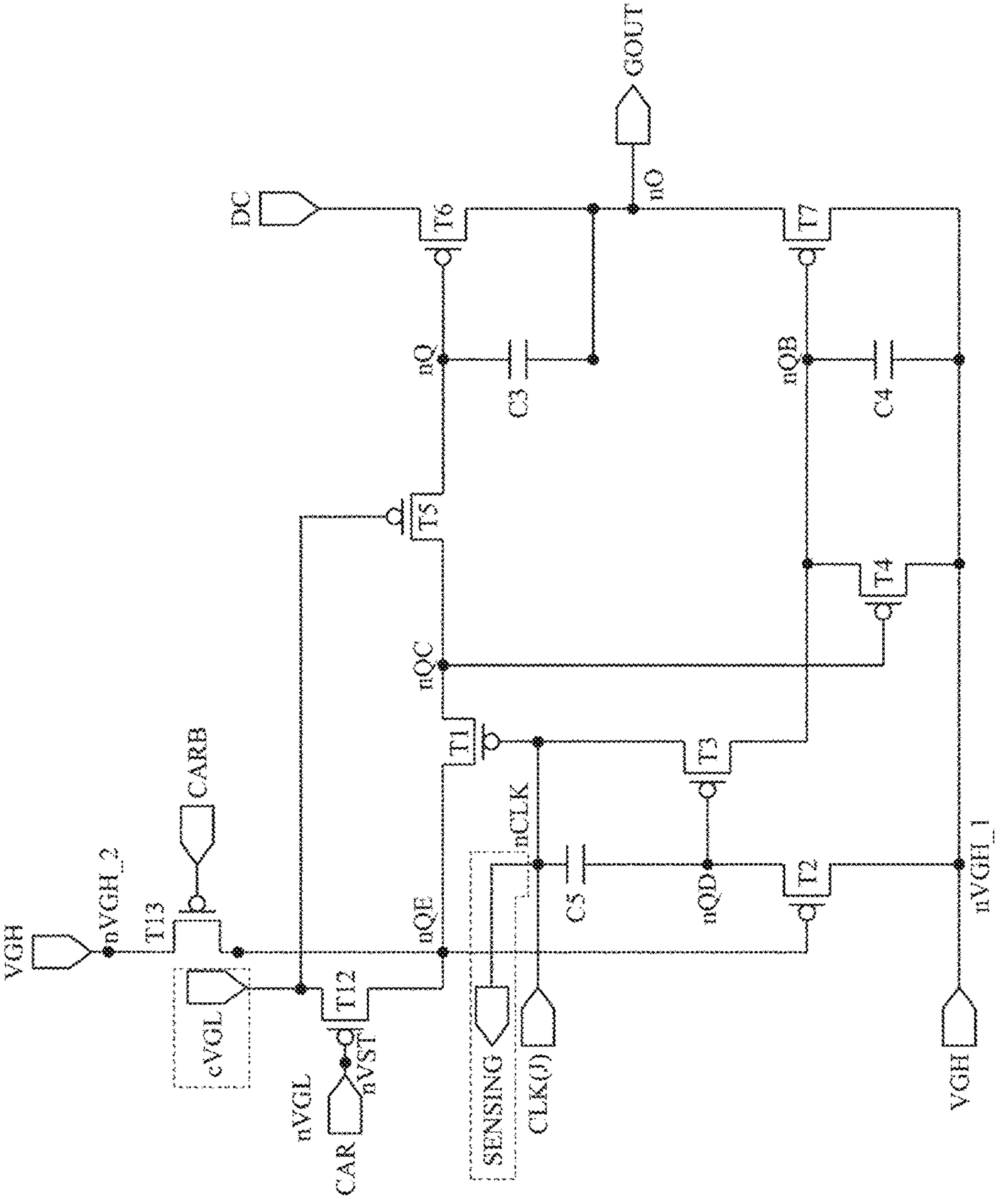
FIG. 25 is a one-stage circuit included in a gate driver according to a fourth embodiment of the present specification.

FIG. 25 is a one-stage circuit included in a gate driver according to a fourth embodiment of the present specification. The fourth embodiment differs from the above-described embodiments in the number of transistors, locations at which the compensation gate-on voltage is applied, and signals input to the transistor. Components that perform substantially the same function as the above-described embodiments are denoted by the same reference numerals, and overlapping descriptions thereof will be omitted.

Referring to FIG. 25, the stage circuit may include a twelfth transistor T12, a thirteenth transistor T13, and nodes connecting the transistors.

The stage circuit may include the CLK node nCLK to which the $J^{th}$ clock signal CLK(J) is input, the VST node nVST to which the carry signal CAR from the previous stage is input, the QE node nQE to which the compensation gate-on voltage cVGL or the second gate-off voltage VGH is applied according to the carry signal CAR and/or an inverting carry signal CARB, the VGL node nVGL to which the compensation gate-on voltage cVGL is applied, the first VGH node nVGH_1 to which the first gate-off voltage VGH is applied, and the second VGH node nVGH_2 to which the second gate-off voltage VGH is applied. In one shift register including the first to $N^{th}$ stages, J is a positive integer of 2 or more and N or less.

The stage circuit may further include an inverting circuit for generating the inverting carry signal CARB. A phase of the inverting carry signal CARB may be substantially the same as a phase of the QB node signal of the previous stage.

The Q control unit may include a first transistor T1. The first transistor T1 may activate the QC node nQC by applying the compensation gate-on voltage cVGL or the second gate-off voltage VGH to the QC node nQC according to the $J^{th}$ clock signal CLK(J). The gate electrode of the first transistor T1 may be connected to the CLK node nCLK, and the first and second electrodes of the first transistor T1 may be connected to the QE node nQE and the QC node nQC, respectively.

The QB control unit may activate the second control node nQB opposite to the QC node nQC according to potentials of the clock signal CLK, the start signal VST/CAR, and the QC node nQC. The QB control unit may include a fifth capacitor C5, a second transistor T2, a third transistor T3, a fourth transistor T4, and a fourth capacitor C4.

The fifth capacitor C5 may be connected between the CLK node nCLK and the QD node nQD. The third transistor T3 may supply the clock signal CLK to the second control node nQB according to the potential of the QD node nQD. A gate electrode of the third transistor T3 may be connected to the QD node nQD, and first and second electrodes of the third transistor T3 may be connected to the CLK node nCLK and the second control node nQB, respectively.

The second transistor T2 may supply the gate-off voltage to the QD node nQD according to the compensation gate-on voltage cVGL or the second gate-off voltage VGH. The gate electrode of the second transistor T2 may be connected to the QE node nQE, and the first and second electrodes of the second transistor T2 may be connected to the QD node nQD and the first VGH node nVGH_1, respectively. The potential of the QD node nQD may be synchronized to the clock signal CLK while the QE node nQE is maintained at the gate-off voltage. The potential of the QD node nQD may become the gate-off voltage while the QE node nQE is maintained at the compensation gate-on voltage cVGL.

The fourth transistor T4 may supply the gate-off voltage to the second control node nQB according to the potential of the QC node nQC. The gate electrode of the fourth transistor T4 may be connected to the QC node nQC, and the first and second electrodes of the fourth transistor T4 may be connected to the second control node nQB and the VGH node nVGH, respectively.

The fourth capacitor C4 may be connected between the second control node nQB and the VGH node nVGH to stabilize the potential of the second control node nQB.

The output unit may include the sixth transistor T6, which is the pull-down element, the seventh transistor T7, which is the pull-up element, and the third capacitor C3.

The sixth transistor T6 may supply the gate signal GOUT at the gate-on voltage VGL to the output node nO from when the first control node nQ is bootstrapped in synchronization with the activated timing of the QC node nQC. The gate electrode of the sixth transistor T6 may be connected to the first control node nQ, and the first and second electrodes of the sixth transistor T6 may be connected to the DC voltage input terminal DC and the output node nO, respectively. The gate-on voltage may be input from the power supply unit to the DC voltage input terminal DC. The gate-on voltage may be in the range of −16 V to −11 V, but is not limited thereto.

The third capacitor C3 may be connected between the first control node nQ and the output node nO. The third capacitor C3 serves to bootstrap the first control node nQ by reflecting a change in potential of the output node nO to the potential of the first control node nQ when the gate signal GOUT changes from the gate-off voltage to the gate-on voltage.

The seventh transistor T7 may supply the gate signal GOUT of the gate-off voltage VGH to the output node nO from while the second control node nQB is activated. The gate electrode of the seventh transistor T7 may be connected to the second control node nQB, and the first and second electrodes of the seventh transistor T7 may be connected to the output node nO and the first VGH node nVGH_1, respectively.

The first stabilization unit may include the fifth transistor T5. The gate electrode of the fifth transistor T5 may be connected to the VGL node nVGL, and the first and second electrodes of the fifth transistor T5 may be connected to the QC node nQC and the first control node nQ, respectively. The channel current between the first and second electrodes of the fifth transistor T5 may become zero when the first control node nQ is bootstrapped. The fifth transistor T5 may be turned off when the first control node nQ is bootstrapped, thereby blocking the electrical connection between the QC node nQC and the first control node nQ. While the first control node nQ is not bootstrapped, the fifth transistor T5 may maintain the turned-on state.

A gate electrode of the twelfth transistor T12 may be connected to the VST node nVST, and first and second electrodes of the twelfth transistor T12 may be connected to the VGL node nVGL and the QE node nQE, respectively. The twelfth transistor T12 may have substantially the same connection relationship as the tenth transistor.

A gate electrode of the thirteenth transistor T13 may be connected to the inverting carry signal input terminal CARB, and first and second electrodes of the thirteenth transistor T13 may be connected to the second VGH node nVGH_2 and the QE node nQE, respectively.

In the gate driver according to the fourth embodiment of the present specification, a difference between the gate-on voltage of the clock signal input to at least one of the second to Ni stages and the gate-on voltage applied from the power supply unit may be reflected, and the reflected value may be applied to the gate driver in real time through one line. The sensing unit may be electrically connected to the CLK node nCLK to receive the $J^{th}$ clock signal CLK(J) having the gate-on voltage changed by the above-described causes and problems. The gate-on voltage cVGL compensated by the compensation unit based on the voltage sensed by the sensing unit may be supplied to the VGL node nVGL.

A deviation can occur according to a difference in resistance and parasitic capacitance of a clock line, thereby causing RC delay and/or IR drop.

A gate driver, a display device including the same, and a method of driving the display device according to the present specification can reduce driving failures caused by the load received by the clock signal supplied to a stage located relatively far away.

The gate driver according to the present specification can normalize an output of a gate signal as a length of the clock line increases.

Although embodiments of the present disclosure have been described in more detail with reference to the accompanying drawings, the present disclosure is not necessarily limited to these embodiments, and various modifications may be carried out without departing from the technical spirit of the present disclosure.

Therefore, the embodiments disclosed in the present disclosure are not intended to limit the technical spirit of the present disclosure, and the scope of the technical spirit of the present disclosure is not limited by these embodiments.

Therefore, it should be understood that the above-described embodiments are illustrative and not restrictive in all respects.

The scope of the present disclosure should be construed according to the appended claims, and all technical spirits within the equivalent range should be construed as being included in the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A gate driver comprising:

a plurality of stages cascade-connected to each other through a carry signal line, wherein the plurality of stages includes:

a first stage configured to receive a first clock signal and a start signal, and output a first gate signal and a first carry signal;

a $J^{th}$ stage configured to receive a $J^{th}$ clock signal and a $J-1^{th}$ carry signal, and output a $J^{th}$ gate signal and a $J^{th}$ carry signal, wherein J is a positive integer that is greater than or equal to 2 and less than or equal to N; and an $N^{th}$ stage configured to receive an $N^{th}$ clock signal and an $N-1^{th}$ carry signal, and output an $N^{th}$ gate signal and an $N^{th}$ carry signal, wherein N is a natural number that is greater than or equal to 2, and wherein each of the first stage, the $J^{th}$ stage, and the $N^{th}$ stage includes:

a clock node to which the first clock signal, the $J^{th}$ clock signal, or the $N^{th}$ clock signal is input;

a gate-on voltage node to which a gate-on voltage is applied; and a gate-off voltage node to which a gate-off voltage is applied, wherein each of the first clock signal and the $J^{th}$ clock signal swings between a gate-on voltage and a gate-off voltage, and wherein, when the gate-on voltage of the $J^{th}$ clock signal differs from the gate-on voltage of the first clock signal, a compensation gate-on voltage at a changed voltage level is applied to the gate-on voltage node of the $J^{th}$ stage.

2. The gate driver of claim 1, wherein the $J^{th}$ stage includes:

a first output node which outputs the $J^{th}$ gate signal including a scan signal and an emission control signal;

a second output node which outputs the $J^{th}$ carry signal;

a start node to which the $J-1^{th}$ carry signal is input;

a first transistor that activates a QC node by applying any one of the compensation gate-on voltage or the gate-off voltage to the QC node according to the $J^{th}$ clock signal;

a sixth transistor that supplies the $J^{th}$ gate signal at the gate-on voltage to the first output node from when a first control node is bootstrapped in synchronization with an activated timing of the QC node;

a QB control unit configured to activate a QB node opposite to the QC node according to potentials of the clock node, the start node, and the QC node; and a seventh transistor that supplies the $J^{th}$ gate signal at the gate-off voltage to the first output node while the QB node is activated before the QC node is activated, wherein the compensation gate-on voltage is applied to the second output node.

3. The gate driver of claim 2, further comprising:

an eighth transistor disposed between the gate-on voltage node and the second output node of the $J^{th}$ stage; and a ninth transistor disposed between the gate-off voltage node and the second output node of the $J^{th}$ stage.

4. The gate driver of claim 3, wherein the gate-on voltage received from a power supply unit is applied to the first output node of the $J^{th}$ stage.

5. The gate driver of claim 1, wherein the $J^{th}$ stage includes:

an output node which outputs the $J^{th}$ gate signal including a scan signal and an emission control signal;

a start node to which the $J-1^{th}$ carry signal is input;

a first transistor that activates a QC node by applying any one of the compensation gate-on voltage and the gate-off voltage to the QC node according to the $J^{th}$ clock signal;

a sixth transistor that supplies the $J^{th}$ gate signal at the gate-on voltage to the output node from when a first control node is bootstrapped in synchronization with an activated timing of the QC node;

a QB control unit configured to activate a QB node opposite to the QC node according to potentials of the clock node, the start node, and the QC node;

a seventh transistor that supplies the $J^{th}$ gate signal at the gate-off voltage to the output node while the QB node is activated before the QC node is activated; and a tenth transistor that applies the compensation gate-on voltage to the first transistor according to the $J-1^{th}$ carry signal, wherein the gate-off voltage node includes a first gate-off voltage node to which a first gate-off voltage is applied, and a second gate-off voltage node to which a second gate-off voltage is applied.

6. The gate driver of claim 5, further comprising an eleventh transistor that applies the second gate-off voltage to the first transistor according to a potential of the QB node of a $J-1^{th}$ stage.

7. The gate driver of claim 5, further comprising a thirteenth transistor that applies the second gate-off voltage to the first transistor according to the $J-1^{th}$ carry signal.

8. The gate driver of claim 7, wherein the thirteenth transistor applies the second gate-off voltage to the first transistor according to the $J-1^{th}$ carry signal inverted.

9. The gate driver of claim 5, wherein the QB control unit includes:

a fifth capacitor connected between an input terminal of the $J^{th}$ clock signal and a QD node;

a third transistor that supplies the $J^{th}$ clock signal to the QB node according to a potential of the QD node;

a second transistor that supplies a first gate-off voltage to the QD node according to the $J-1^{th}$ carry signal; and a fourth transistor that supplies the first gate-off voltage to the QB node according to the potential of the QC node.

10. The gate driver of claim 1, wherein the gate-on voltage applied to the gate-on voltage node is a first constant voltage, and the gate-off voltage applied to the gate-off voltage node is a second constant voltage.

11. The gate driver of claim 10, wherein the $J^{th}$ stage includes:

an output node which outputs the $J^{th}$ gate signal including a scan signal, an emission control signal, and the $J^{th}$ carry signal;

a start node to which the $J-1^{th}$ carry signal is input;

a first transistor that activates a QC node by applying any one of the compensation gate-on voltage and the gate-off voltage to the QC node according to the $J^{th}$ clock signal;

a sixth transistor that supplies the $J^{th}$ gate signal at the gate-on voltage to the output node from when a first control node is bootstrapped in synchronization with an activated timing of the QC node;

a QB control unit configured to activate a QB node opposite to the QC node according to potentials of the clock node, the start node, and the QC node; and a seventh transistor that supplies the $J^{th}$ gate signal at the gate-off voltage to the output node while the QB node is activated before the QC node is activated.

12. The gate driver of claim 11, wherein, when the first control node is bootstrapped, a potential of the QC node differs from a potential of the first control node.

13. The gate driver of claim 12, further comprising a fifth transistor that blocks electrical connection between the QC node and the first control node when the first control node is bootstrapped.

14. The gate driver of claim 13, wherein a gate electrode of the fifth transistor is connected to the gate-on voltage node to which the first constant voltage is applied, a first electrode of the fifth transistor is connected to the QC node, and a second electrode of the fifth transistor is connected to the first control node.

15. The gate driver of claim 14, wherein the QB control unit includes:

a fifth capacitor connected between an input terminal of the $J^{th}$ clock signal and a QD node;

a third transistor that supplies the $J^{th}$ clock signal to the QB node according to a potential of the QD node;

a second transistor that supplies a first gate-off voltage to the QD node according to the $J-1^{th}$ carry signal; and a fourth transistor that supplies the first gate-off voltage to the QB node according to a potential of the QC node.

16. The gate driver of claim 15, wherein the potential of the QD node is changed in synchronization with the $J^{th}$ clock signal while the $J-1^{th}$ carry signal is maintained at the gate-off voltage, and wherein the potential of the QD node becomes the gate-off voltage while the $J-1^{th}$ carry signal is maintained at the gate-on voltage.

17. The gate driver of claim 10, wherein the first constant voltage is applied to the gate-on voltage nodes of the first stage to the $N^{th}$ stage through one line.

18. The gate driver of claim 1, wherein the $J^{th}$ stage is an $N^{th}$ stage.

19. The gate driver of claim 1, wherein, when the gate-on voltage of the $J^{th}$ clock signal is higher than the gate-on voltage of the first clock signal, a voltage level of the gate-on voltage applied to the gate-on voltage node increases.

20. A display device comprising;

a display panel on which a plurality of gate lines, a plurality of power lines, and the gate driver of claim 1 are disposed;

wherein the gate driver receives the first clock signal, the $J^{th}$ clock signal, or the $N^{th}$ clock signal from a clock generation circuit and supplies the first gate signal, the $J^{th}$ gate signal, or the $N^{th}$ gate signal swinging between the gate-on voltage and the gate-off voltage to the plurality of gate lines;

a power supply unit configured to generate power input to the display panel and the gate driver through the plurality of power lines;

a sensing unit configured to sense the first clock signal, the $J^{th}$ clock signal, or the $N^{th}$ clock signal input to the gate driver; and a compensation unit configured to apply a compensation gate-on voltage to the gate driver based on the first clock signal, the $J^{th}$ clock signal, or the $N^{th}$ clock signal sensed by the sensing unit.

21. The display device of claim 20, wherein the sensing unit senses the $J^{th}$ clock signal.

22. The display device of claim 21, wherein the sensing unit senses the $N^{th}$ clock signal.

23. The display device of claim 21, wherein the gate-on voltage of the $J^{th}$ clock signal sensed by the sensing unit differs from the gate-on voltage of the first clock signal.

24. A method of driving a display device including a plurality of stages cascade-connected to each other through a carry signal line, wherein the plurality of stages includes a first stage configured to receive a first clock signal and a start signal, and output a first gate signal and a first carry signal, a $J^{th}$ stage configured to receive a $J^{th}$ clock signal and a $J-1^{th}$ carry signal, and output a $J^{th}$ gate signal and a $J^{th}$ carry signal, wherein J is a positive integer that is greater than or equal to 2 and less than or equal to N, and an $N^{th}$ stage configured to receive an $N^{th}$ clock signal and an $N-1^{th}$ carry signal, and output an $N^{th}$ gate signal and an $N^{th}$ carry signal, wherein N is a natural number that is greater than or equal to 2, and each of the first stage, the $J^{th}$ stage, and the $N^{th}$ stage includes a clock node to which the first clock signal, the $J^{th}$ clock signal, or the $N^{th}$ clock signal is input, a gate-on voltage node to which a gate-on voltage is applied, and a gate-off voltage node to which a gate-off voltage is applied, the method comprising:

sensing the gate-on voltage of the $J^{th}$ clock signal input to the $J^{th}$ stage;

causing a difference between the gate-on voltage of the $J^{th}$ clock signal sensed by the sensing and the gate-on voltage of the first clock signal; and applying a compensation gate-on voltage to the gate-on voltage node of the $J^{th}$ stage, wherein a voltage level of the compensation gate-on voltage is changed based on the gate-on voltage of the $J^{th}$ clock signal and the gate-on voltage of a clock signal input from a clock generation circuit.

* * * * *